(12) United States Patent
Isonaka et al.

(10) Patent No.: US 10,920,097 B2
(45) Date of Patent: Feb. 16, 2021

(54) DISPERSION AND INKJET INK COMPOSITION, LIGHT CONVERSION LAYER, AND LIQUID CRYSTAL DISPLAY ELEMENT USING THE DISPERSION

(71) Applicant: DIC Corporation, Tokyo (JP)

(72) Inventors: Takeshi Isonaka, Saitama (JP); Yasuo Umezu, Saitama (JP); Hidehiko Yamaguchi, Saitama (JP); Yoshio Aoki, Saitama (JP); Hirotomo Sasaki, Sakura (JP); Sunao Yoshihara, Sakura (JP); Takayuki Miki, Sakura (JP); Aya Ishizuka, Sakura (JP); Takeo Kizaki, Sakura (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 16/474,357

(22) PCT Filed: Dec. 21, 2017

(86) PCT No.: PCT/JP2017/045993
§ 371 (c)(1),
(2) Date: Jun. 27, 2019

(87) PCT Pub. No.: WO2018/123821
PCT Pub. Date: Jul. 5, 2018

(65) Prior Publication Data
US 2019/0390076 A1    Dec. 26, 2019

(30) Foreign Application Priority Data

Dec. 28, 2016 (JP) ................................ 2016-255102
Sep. 14, 2017 (JP) ................................ 2017-177108

(51) Int. Cl.
*B41M 5/00*     (2006.01)
*C09K 19/00*    (2006.01)
(Continued)

(52) U.S. Cl.
CPC ............. *C09D 11/38* (2013.01); *B41J 2/2107* (2013.01); *C09D 11/40* (2013.01); *G02B 5/201* (2013.01);
(Continued)

(58) Field of Classification Search
CPC .......... B41J 2/217; C09D 11/38; C09D 11/40; C09D 11/326; G02B 5/20; G02B 5/201;
(Continued)

(56) References Cited

U.S. PATENT DOCUMENTS 5,630,884 A    5/1997  Huth
6,099,835 A    8/2000  Kiczka
(Continued)

FOREIGN PATENT DOCUMENTS

CN    86106181 A       6/1987
CN    101384176 A      3/2009
(Continued)

OTHER PUBLICATIONS

International Search Report dated Apr. 3, 2018, issued in counterpart application No. PCT/JP2017/045993 (2 pages).
(Continued)

*Primary Examiner* — John A McPherson
(74) *Attorney, Agent, or Firm* — Westerman, Hattori, Daniels & Adrian, LLP

(57) ABSTRACT

A dispersion contains, as essential ingredients, light-emitting nanocrystals, a polymeric dispersant having an amine value of 5 mg/KOH g or more, and a stimulation-responsive curable material that cures in response to an external stimulus.

20 Claims, 13 Drawing Sheets

(51) Int. Cl.
*C09D 11/38* (2014.01)
*B41J 2/21* (2006.01)
*C09D 11/40* (2014.01)
*G02F 1/1335* (2006.01)
*G02B 5/20* (2006.01)
*B82Y 20/00* (2011.01)

(52) U.S. Cl.
CPC ........ *G02F 1/133514* (2013.01); *B82Y 20/00* (2013.01)

(58) Field of Classification Search
CPC ............... G02B 5/206; G02F 1/133514; G02F 1/133516; G02F 1/133617; G03F 7/0007
USPC .............................................. 430/7; 349/106
See application file for complete search history.

(56) References Cited

U.S. PATENT DOCUMENTS

| | | |
|---|---|---|
| 2009/0061167 A1 | 3/2009 | Nishida et al. |
| 2011/0216271 A1 | 9/2011 | Suzuki et al. |
| 2015/0166884 A1 | 6/2015 | Hefner, Jr. et al. |
| 2015/0301408 A1 | 10/2015 | Li |
| 2016/0011506 A1 | 1/2016 | Gu et al. |
| 2016/0215212 A1 | 7/2016 | Lee et al. |
| 2017/0352789 A1 | 12/2017 | Miyanaga et al. |
| 2018/0031910 A1* | 2/2018 | Li .................... G02F 1/13394 |
| 2018/0031912 A1* | 2/2018 | Zhang ................ G02F 1/1335 |
| 2018/0081236 A1* | 3/2018 | Chikushi .............. C08L 63/00 |
| 2018/0102449 A1* | 4/2018 | Pschenitzka ...... G02F 1/133617 |

FOREIGN PATENT DOCUMENTS

| | | |
|---|---|---|
| CN | 101730536 A | 6/2010 |
| JP | 8-27027 A | 1/1996 |
| JP | 10-060442 A | 3/1998 |
| JP | 10-60442 A | 3/1998 |
| JP | 2000-033778 A | 2/2000 |
| JP | 2000-33778 A | 2/2000 |
| JP | 2007-312740 A | 12/2007 |
| JP | 2008-187954 A | 8/2008 |
| JP | 2012-502322 A | 1/2012 |
| JP | 2014-77046 A | 5/2014 |
| JP | 2014-077046 A | 5/2014 |
| JP | 2015-120900 A | 7/2015 |
| JP | 2016-526174 A | 9/2016 |
| JP | 2017-21322 A | 1/2017 |
| WO | 02/004011 A1 | 1/2002 |
| WO | 2006/103976 A1 | 10/2006 |
| WO | 2008/001693 A1 | 1/2008 |
| WO | 2016/47588 A1 | 3/2016 |
| WO | 2016/047588 A1 | 3/2016 |
| WO | 2016/104401 A1 | 6/2016 |

OTHER PUBLICATIONS

Ibrahim et al., "A Structural Phase of Heat-Denatured Lysozyme with Novel Antimicrobial Action", J. Agric. Food Chem., vol. 44, Jun. 18, 1996, pp. 1416-1423 (8 pages).

Nohara et al., "Kinetic Study on Thermal Denaturation of Hen Egg-White Lysozyme Involving Precipitation", Journal of Bioscience and Bioengineering, vol. 87, No. 2, Dec. 31, 1999, pp. 199-205 (7 pages).

* cited by examiner

DISPERSION AND INKJET INK COMPOSITION, LIGHT CONVERSION LAYER, AND LIQUID CRYSTAL DISPLAY ELEMENT USING THE DISPERSION

TECHNICAL FIELD

The present invention relates to a dispersion and to an inkjet ink composition, a light conversion layer, and a liquid crystal display element using the dispersion.

BACKGROUND ART

Active-matrix liquid crystal display devices are widespread, for example in applications such as mobile terminals, liquid crystal TVs, projectors, and computers, by virtue of their superior display quality. A color filter for such an active-matrix liquid crystal display device is produced by so-called photolithography. In the photolithographic process, a photosensitive resin composition that contains a pigment is applied to a glass substrate, dried, irradiated with UV through a mask, and, after the removal of any uncured residue by alkali development, fired to give a pigment pattern. This is repeated to form red, green, and blue colorant patterns.

Photolithography, however, is disadvantageous in terms of initial cost. It needs expensive equipment and may even require extra equipment if the existing equipment becomes useless with increasing panel size. Moreover, photolithography involves many steps and is troublesome as it is, and inevitably wastes raw materials because it involves removing some photosensitive material by alkali development.

As a solution to this, production of a color filter by inkjetting has been in focus in recent years as an alternative to photolithography. Inkjetting enhances production efficiency by enabling simultaneous formation of the red, green, and blue colorant patterns and eliminates the aforementioned waste of raw materials because the ejected inks are fully used as colorants. The inkjet approach is also advantageous in terms of cost because it can be scaled to larger sizes of liquid crystal panels by increasing the number of scans and the number of nozzles without requiring extra, larger equipment.

Ink dispersions for such production via the inkjet technology have become increasingly containing a higher concentration of pigment to meet the performance requirements of liquid crystal display elements, such as high definition and high brightness. This increase in pigment content has caused problems such as reduced consistency in the direction in which dispersions are ejected from nozzles and reduced dispersibility of pigments that settle while the inkjet device is left off for a long period of time. Increased concentrations of pigments in a color filter, moreover, affect optical transmittance. The reduced optical transmittance necessitates increasing the amount of light, which causes an increase in power consumption. Increased pigment concentrations have therefore limited the improvement of color reproduction and color purity as well.

In a known technology of a light emitter that improves color reproduction and color purity, an electroluminescent light-emitting layer is made using inkjet inks that contain light-emitting nanocrystals, whose particle diameters are approximately nanometers to tens of nanometers and an examples of which is quantum dots, dispersed therein (see PTL 1 below). By virtue of the quantum size effect and many-electron effect of the light-emitting nanocrystals, such a technology in which light-emitting nanocrystals are used as a light emitter allows the light emitter to emit bright fluorescence with a small half width and different wavelengths depending on the particle diameter, thereby helping improve color reproduction and color purity.

As for methods for curing an inkjet ink, moreover, a known technique that requires no drying step is ultraviolet-curable inks (see PTL 2 below).

As described above, photolithographic production of a light-emitting layer or color filter containing light-emitting nanocrystals is disadvantageous in that resist materials, including the relatively expensive light-emitting nanocrystals, are wasted except in pixel units because of the nature of photolithographic production of a color filter. Under such circumstances, researchers have started to consider forming pixel units of a light conversion substrate using the inkjet technology to eliminate such a waste of resist materials (PTL 3).

CITATION LIST

Patent Literature

PTL 1: Japanese Unexamined Patent Application Publication No. 2014-77046
PTL 2: International Publication No. 2006/103976
PTL 3: International Publication No. 2008/001693

SUMMARY OF INVENTION

Technical Problem

However, there is no precedent for an inkjet ink composition containing light-emitting nanocrystals dispersed therein being used as a color material that corresponds to a color filter of a liquid crystal display element. For example, the use of an organic solvent-based inkjet like that described in the aforementioned PTL 1 to make a color filter for liquid crystal display would be still disadvantageous in terms of productivity because it would require a step of drying the organic solvent. The light-emitting nanocrystals themselves, moreover, are prone to damage from heat, oxygen, and water. Since the light-emitting nanocrystals themselves are exposed to external air while being dried after application to a glass substrate, damage to the light-emitting nanocrystals is likely. The use of an organic solvent therefore results in the problem of reduced brightness or color reproduction.

As for ultraviolet-curable inkjet ink compositions as in PTL 2, the choices of the dispersant used therewith are highly limited in light of compatibility because in such ink compositions contain a polymerizable monomer as a major ingredient. Moreover, it is difficult to choose the best formulation because the dispersant has impact on pigment dispersibility. Thus, if one tried to disperse light-emitting nanocrystals in an ultraviolet-curable inkjet, the nanocrystals would be so reactive that their particles easily aggregate because the nanocrystals, approximately nanometers to tens of nanometers in size, would have a large surface area in comparison with ordinary pigments and would also have surface atoms that potentially become coordination sites. As mentioned above, light-emitting nanocrystals emit light via their quantum size effect. Once their particles aggregate, therefore, a decrease in fluorescent quantum yield caused by quenching affects brightness and color reproduction.

The formation of pixel units of a color filter (hereinafter also referred to simply as "pixel units") using a dispersion or ink composition containing luminescent nanocrystals, moreover, has been found to pose the new problem of light from the light source leaking out of the pixel units instead of being absorbed by the luminescent nanocrystals. Such leakage of light, which affects the color reproduction of the pixel units, needs to be minimized.

The problem to be solved by the present invention is therefore to provide, regarding curable dispersions (curable ink compositions) that cure in response to an external stimulus, such as ultraviolet radiation, light, or any other type of active radiation or heat, a dispersion that helps reduce light leakage, is superior in the dispersibility of light-emitting nanocrystals, and gives high luminescence efficiency and color reproduction to a light converter as a product of printing with the dispersion. An inkjet ink composition using it and a liquid crystal display element that has a light conversion layer formed using the ink composition and is superior in luminescence efficiency and color reproduction are also provided.

Solution to Problem

After extensive research to solve the above problem, the inventors found that the use of a polymeric dispersant having a certain amine value as a dispersant for light-emitting nanocrystals in a dispersion, for example an ink composition for color filter applications, dramatically improves the dispersibility of the light-emitting nanocrystals, reduces light leakage, and ensures excellent color strength when the dispersion is made into a light conversion layer for display panels, such as OLED panels or liquid crystal display elements. Based on these findings, the inventors completed the present invention.

That is, the present invention relates to a dispersion that contains, as essential ingredients, light-emitting nanocrystals, a polymeric dispersant having an amine value of 5 mg/KOH g or more, and a stimulation-responsive curable material, a material that cures in response to an external stimulus.

The present invention further relates to an inkjet ink composition that is formed by stimulation-responsive curable dispersion that cures in response to active radiation, heat, or any other external stimulus.

The present invention further relates to a light conversion layer that includes the above inkjet ink composition applied to a substrate by inkjetting and cured.

The present invention further relates to a liquid crystal display element that includes:
a pair of substrates that are a first substrate and a second substrate facing each other;
a liquid crystal layer sandwiched between the first and second substrates;
a pixel electrode on at least one of the first and second substrates;
a common electrode on at least one of the first and second substrates;
a light source section that includes a light emitter; and
a light conversion layer capable of converting light from the light source section into red, green, or blue light.

The liquid crystal layer contains a liquid crystal composition that contains 10% to 50% by mass a compound represented by general formula (i)

[Chem. 1]

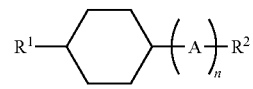

(i)

(where $R^1$ and $R^2$ each independently represent a C1-8 alkyl, C2-8 alkenyl, C1-8 alkoxy, or C2-8 alkenyloxy group, A represents a 1,4-phenylene or trans-1,4-cyclohexylene group, and n represents 0 or 1.).

The light conversion layer, moreover, contains, as essential structural elements, light-emitting nanocrystals, a polymeric dispersant having an amine value of 5 mg/KOH g or more, and a stimulation-responsive curable material, a material that cures in response to an external stimulus.

Advantageous Effects of Invention

According to the present invention, light leakage can be reduced regarding curable dispersions (curable ink compositions) that cure in response to an external stimulus, such as active radiation, which encompasses ultraviolet radiation and other types of light and electron beams, or heat.

According to the present invention, there can be provided, regarding curable dispersions (curable ink compositions) that cure in response to an external stimulus, such as active radiation, which encompasses ultraviolet radiation and other types of light and electron beams, or heat, an active radiation-curable dispersion that is superior in the dispersibility of light-emitting nanocrystals and gives high luminescence efficiency and color reproduction to a light converter as a product of printing with the dispersion. An inkjet ink using it and a liquid crystal display element that has a light conversion layer formed using the ink and is superior in luminescence efficiency and color reproduction can also be provided.

According to the present invention, there can be provided, regarding active radiation-curable, for example ultraviolet-curable, inkjet inks, an active radiation-curable dispersion that is superior in the dispersibility of light-emitting nanocrystals and gives high luminescence efficiency and color reproduction to a light converter as a product of printing with the dispersion. An inkjet ink using it and a liquid crystal display element that has a light conversion layer formed using the ink and is superior in luminescence efficiency and color reproduction can also be provided.

Liquid crystal display elements according to the present invention are superior in transmittance and maintain their color gamut for a long period of time.

DESCRIPTION OF EMBODIMENTS

Figure 1:
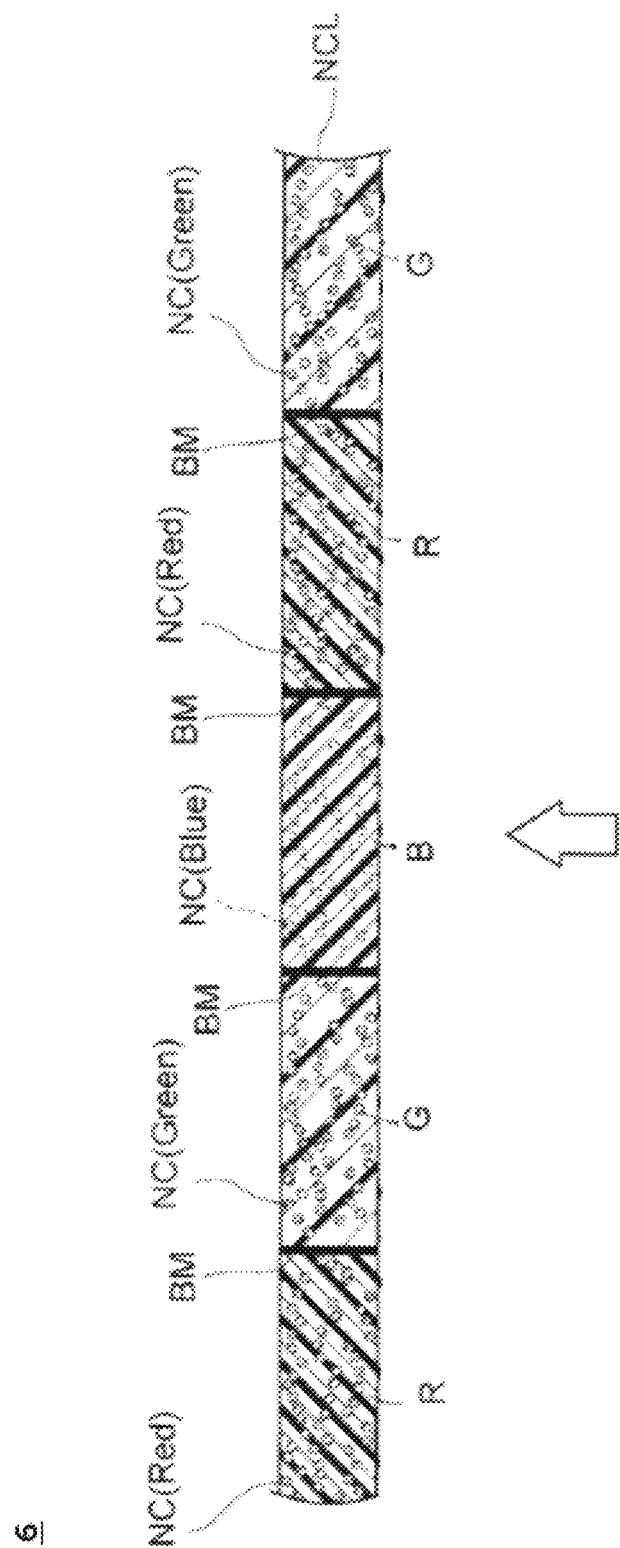
FIG. 1 is a schematic diagram illustrating an example of a light conversion layer 6.

A dispersion according to the present invention contains, as essential ingredients, light-emitting nanocrystals, a polymeric dispersant having an amine value of 5 mg/KOH g or more, and a stimulation-responsive curable material that cures in response to an external stimulus. By virtue of containing a polymeric dispersant having an amine value of 5 mg/KOH g or more, the dispersion according to the present invention helps reduce aggregation or quenching between light-emitting nanocrystals, thereby helping prevent or reduce light leakage. The dispersion is therefore superior in color strength.

A dispersion as mentioned herein refers to one that contains the aforementioned light-emitting nanocrystals, polymeric dispersant, and stimulation-responsive curable material and in which solid-phase "light-emitting nanocrystals" are suspended as a dispersoid in a dispersion medium. It may therefore be that either the stimulation-responsive curable material or polymeric dispersant is in its liquid phase (dispersion medium) or solid phase, and if both polymeric dispersant and stimulation-responsive curable material are in the solid phase, the dispersion may further contain a solvent. A dispersion according to the present invention therefore conceptually encompasses an ink composition and may be used as an ink composition as it is to form a film or layer without dilution with a solvent or the addition of additives.

An ink composition as mentioned herein refers to a colored liquid for writing or printing that contains the aforementioned light-emitting nanocrystals, polymeric dispersant, and stimulation-responsive curable material. It is a generic term for writing inks, printing inks, photocopying inks, those inks that are used with duplicate paper for pressure copying, etc., and also includes compositions used to form a color filter for a display screen. An ink composition according to the present invention is therefore one of the uses of a dispersion according to the present invention.

An active radiation-curable dispersion according to the present invention is one that contains, as essential ingredients, light-emitting nanocrystals, a polymeric dispersant having an amine value of 8 to 50 mg KOH/g, and an active radiation-curable monomer. In the present invention, as mentioned above, the dispersion provides excellently high luminescence efficiency by virtue of its superior dispersibility in polymerizable monomers.

(Light-Emitting Nanocrystals)

To be specific, preferred light-emitting nanocrystals that can be used are particulate ones that have at least one dimension of 100 nm or less. Their shape may be any geometric shape and may be symmetric or asymmetric. Specific examples of shapes of the nanocrystals include round (spherical), ellipsoidal, pyramidal, disk-shaped, branched, mesh-like, and any irregular shapes, but it is particularly preferred that the light-emitting nanocrystals be particulate quantum dots.

Luminescent nanocrystals according to the present invention are nanosized crystals that absorb excitation light and emit fluorescence or phosphorescence. An example is crystals whose maximum particle diameter measured using a transmission electron microscope or scanning electron microscope is 100 nm or less.

The luminescent nanocrystals according to the present invention are capable of, for example, absorbing light with a predetermined wavelength and thereby emitting light (fluorescence or phosphorescence) with a wavelength different from the absorbed wavelength. The luminescent nanocrystals may be red-luminescent nanocrystal particles, which emit light that has a peak emission wavelength between 605 and 665 nm (red light), green-luminescent nanocrystals, which emit light that has a peak emission wavelength between 500 and 560 nm (green light), or blue luminescent nanocrystals, which emit light that has a peak emission wavelength between 420 to 480 nm. In this embodiment, it is preferred that the ink composition contain at least one of these types of light-emitting nanocrystals. The light absorbed by the luminescent nanocrystals may be, for example, light with a wavelength of 400 nm or more and less than 500 nm (blue light) or light with a wavelength between 200 nm and 400 nm (ultraviolet light). The peak emission wavelength of luminescent nanocrystals can be checked in, for example, a fluorescence or phosphorescence spectrum measured using an ultraviolet-visible spectrophotometer.

The light-emitting nanocrystals preferably have a core that contains at least one first semiconductor material and a shell that covers the core and contains a second semiconductor material that is the same as or different than in the core.

The light-emitting nanocrystals may therefore be composed of a core containing at least a first semiconductor material and a shell containing a second semiconductor material, whether the first and second semiconductor materials are the same or different. The core and/or shell may both contain an extra, third semiconductor material besides the first and/or second semiconductor materials. The covering the core as used herein only requires that at least part of the core be covered.

Moreover, the light-emitting nanocrystals preferably have a core that contains at least one first semiconductor material, a first shell that covers the core and contains a second semiconductor material that is the same as or different than in the core, and optionally a second shell that covers the first shell and contains a third semiconductor material that is the same as or different than in the first shell.

The light-emitting nanocrystals according to the present invention therefore, preferably, have at least one of the following three structures: the form in which the nanocrystals have a core that contains first semiconductor material(s) and a shell that covers the core and contains second semiconductor material(s) that is the same as in the core, or the mode in which the nanocrystals are made of one or two or more semiconductor materials (=the structure in which the core is the only component (also referred to as the core structure)); the core/shell structure, such as the form in which the nanocrystals have a core that contains a first semiconductor material and a shell that contains a second semiconductor material different than in the core; and the core/shell/shell structure, i.e., the form in which the nanocrystals have a core that contains a first semiconductor material, a first shell that covers the core and contains a second semiconductor material different than in the core, and a second shell that covers the first shell and contains a third semiconductor material different than in the first shell.

As stated above, light-emitting nanocrystals according to the present invention preferably include the three forms of the core structure, the core/shell structure, and the core/shell/shell structure. In this case, the core may be a mixed crystal that contains two or more semiconductor materials (e.g., CdSe+CdS or CIS+ZnS). The shell(s), too, may be a mixed crystal that contains two or more semiconductor materials.

In a light conversion layer according to the present invention, the light-emitting nanocrystals may be in contact with a molecule that has an affinity for the light-emitting nanocrystals.

The molecule having an affinity is a non-polymer or polymer that has a functional group that has an affinity for the light-emitting nanocrystals. The functional group having an affinity can be of any type, but preferably is a group that contains one element selected from the group consisting of nitrogen, oxygen, sulfur, and phosphor. Examples include organic sulfur, organic phosphoric acid, pyrrolidone, pyridine, amino, amide, isocyanate, carbonyl, and hydroxy groups.

Semiconductor material(s) according to the present invention is preferably one or two or more selected from the group consisting of group II-VI semiconductors, group III-V semiconductors, group I—III-VI semiconductors, group IV semiconductors, and group I—II-IV-VI semiconductors. These semiconductors are also preferred for use as first, first, and third semiconductor materials according to the present invention.

Specifically, semiconductor material(s) according to the present invention is at least one or more selected from the group consisting of CdS, CdSe, CdTe, ZnS, ZnSe, ZnTe, ZnO, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, CdHgZnTe, CdZnSeS, CdZnSeTe, CdZnSTe, CdHgSeS, CdHgSeTe, CdHgSTe, HgZnSeS, HgZnSeTe, HgZnSTe; GaN, GaP, GaAs, GaSb, AlN, AlP, AlAs, AlSb, InN, InP, InAs, InSb, GaNP, GaNAs, GaNSb, GaPAs, GaPSb, AlNP, AlNAs, AlNSb, AlPAs, AlPSb, InNP, InNAs, InNSb, InPAs, InPSb, GaAlNP, GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb; SnS, SnSe, SnTe, PbS, PbSe, PbTe, SnSeS, SnSeTe, SnSTe, PbSeS, PbSeTe, PbSTe, SnPbS, SnPbSe, SnPbTe, SnPbSSe, SnPbSeTe, SnPbSTe; Si, Ge, SiC, SiGe, AgInSe$_2$, CuGaSe$_2$, CuInS$_2$, CuGaS$_2$, CuInSe$_2$, AgInS$_2$, AgGaSe$_2$, AgGaS$_2$, C, Si, and Ge. These compound semiconductors may be used alone or as a mixture of two or more. It is more preferred that at least one or more be selected from the group consisting of CdS, CdSe, CdTe, ZnS, ZnSe, ZnTe, ZnO, HgS, HgSe, HgTe, InP, InAs, InSb, GaP, GaAs, GaSb, AgInS$_2$, AgInSe$_2$, AgInTe$_2$, AgGaS$_2$, AgGaSe$_2$, AgGaTe$_2$, CuInS$_2$, CuInSe$_2$, CuInTe$_2$, CuGaS$_2$, CuGaSe$_2$, CuGaTe$_2$, Si, C, Ge, and Cu$_2$ZnSnS$_4$. These compound semiconductors may be used alone or as a mixture of two or more.

Examples of red-luminescent light-emitting nanocrystals include nanocrystal particles of CdSe, core/shell nanocrystal particles with a CdS shell portion and a CdSe inner, core portion, core/shell nanocrystal particles with a CdS shell portion and a ZnSe inner, core portion, mixed nanocrystal particles of CdSe and ZnS, nanocrystal particles of InP, core/shell nanocrystal particles with a ZnS shell portion and an InP inner, core portion, core/shell nanocrystal particles with a shell portion formed by mixed crystals of ZnS and ZnSeS and an InP inner, core portion, mixed nanocrystal particles of CdSe and CdS, mixed nanocrystal particles of ZnSe and CdS, core/shell/shell nanocrystal particles with a ZnSe first shell portion, a ZnS second shell portion, and an InP inner, core portion, core/shell/shell nanocrystal particles with a first shell portion formed by mixed crystals of ZnS and ZnSe, a ZnS second shell portion, and an InP inner, core portion, core/shell/shell nanocrystal particles with a ZnSeS first shell portion, a ZnS second shell portion, and an InP inner, core portion, and core/shell/shell nanocrystal particles with a ZnS first shell portion, a ZnSeS second shell portion, and an InP inner, core portion.

Examples of green-luminescent light-emitting nanocrystals include nanocrystal particles of CdSe, mixed nanocrystal particles of CdSe and ZnS, core/shell nanocrystal particles with a ZnS shell portion and an InP inner, core portion, core/shell nanocrystal particles with a ZnSe shell portion and an InP inner, core portion, core/shell nanocrystal particles with a shell portion formed by mixed crystals of ZnS and ZnSeS and an InP inner, core portion, core/shell/shell nanocrystal particles with a ZnSe first shell portion, a ZnS second shell portion, and an InP inner, core portion, core/shell/shell nanocrystal particles with a first shell portion formed by mixed crystals of ZnS and ZnSe, a ZnS second shell portion, and an InP inner, core portion, core/shell/shell nanocrystal particles with a ZnSeS first shell portion, a ZnS second shell portion, and an InP inner, core portion, and core/shell/shell nanocrystal particles with a ZnS first shell portion, a ZnSeS second shell portion, and an InP inner, core portion.

Examples of blue-luminescent light-emitting nanocrystals include nanocrystal particles of ZnSe, nanocrystal particles of ZnS, core/shell nanocrystal particles with a ZnSe shell portion and a ZnS inner, core portion, nanocrystal particles of CdS, core/shell nanocrystal particles with a ZnS shell portion and an InP inner, core portion, core/shell nanocrystal particles with a shell portion formed by mixed crystals of ZnS and ZnSeS and an InP inner, core portion, core/shell/shell nanocrystal particles with a ZnS first shell portion, a ZnS second shell portion, and an InP inner, core portion, and core/shell/shell nanocrystal particles with a first shell portion formed by mixed crystals of ZnS and ZnSe, a ZnS second shell portion, and an InP inner, core portion. Even in the same chemical makeup, semiconductor nanocrystal particles can change the color of the light they emit, to red or to green, with varying average diameter of theirs. The semiconductor nanocrystal particles are preferably ones that cause the least possible harm, for example to the human body, as they are. If the light-emitting nanocrystals are semiconductor nanocrystal particles containing cadmium, selenium, or any similar element, it is preferred to select a type of semiconductor nanocrystal particles that contain such elements (cadmium, selenium, etc.) to the least possible extent and use this type of nanocrystal particles alone or to use it in combination with other types of light-emitting nanocrystals so that the percentages of such elements are minimized.

The light-emitting nanocrystals according to the present invention preferably include at least one type of nanocrystals selected from the group consisting of red light-emitting nanocrystals, which emit red light, green light-emitting nanocrystals, which emit green light, and blue light-emitting nanocrystals, which emit blue light. In general, the color of the light emitted by light-emitting nanocrystals depends on the particle diameter, according to the solution of the Schrodinger wave equation of a potential well model, but also depends on the energy gap of the light-emitting nanocrystals. The color of the emitted light is therefore selected by adjusting the light-emitting nanocrystals used and their particle diameter.

In the present invention, the upper limit for the peak wavelength of the fluorescence spectrum of red light-emitting nanocrystals, which emit red light, is preferably 665 nm, 663 nm, 660 nm, 658 nm, 655 nm, 653 nm, 651 nm, 650 nm, 647 nm, 645 nm, 643 nm, 640 nm, 637 nm, 635 nm, 632 nm, or 630 nm. The lower limit for the same peak wavelength is preferably 628 nm, 625 nm, 623 nm, 620 nm, 615 nm, 610 nm, 607 nm, or 605 nm.

In the present invention, the upper limit for the peak wavelength of the fluorescence spectrum of green light-emitting nanocrystals, which emit green light, is preferably 560 nm, 557 nm, 555 nm, 550 nm, 547 nm, 545 nm, 543 nm, 540 nm, 537 nm, 535 nm, 532 nm, or 530 nm. The lower limit for the same peak wavelength is preferably 528 nm, 525 nm, 523 nm, 520 nm, 515 nm, 510 nm, 507 nm, 505 nm, 503 nm, or 500 nm.

In the present invention, the upper limit for the peak wavelength of the fluorescence spectrum of blue light-emitting nanocrystals, which emit blue light, is preferably 480 nm, 477 nm, 475 nm, 470 nm, 467 nm, 465 nm, 463 nm, 460 nm, 457 nm, 455 nm, 452 nm, or 450 nm. The lower limit for the same peak wavelength is preferably 450 nm, 445 nm, 440 nm, 435 nm, 430 nm, 428 nm, 425 nm, 422 nm, or 420 nm.

In the present invention, red light-emitting nanocrystals, which emit red light, desirably use semiconductor material(s) that has a peak emission wavelength in the range of 635 nm±30 nm. Likewise, green light-emitting nanocrystals, which emit green light, desirably use semiconductor material(s) that has a peak emission wavelength in the range of 530 nm±30 nm, and blue light-emitting nanocrystals, which emit blue light, desirably use semiconductor material(s) that has a peak emission wavelength in the range of 450 nm±30 nm.

The lower limit for the fluorescence quantum yield of the light-emitting nanocrystals according to the present invention is preferably 40% or more, 30% or more, 20% or more, or 10% or more, in order of preference.

The upper limit for the half width of the fluorescence spectrum of the light-emitting nanocrystals according to the present invention is preferably 60 nm or less, 55 nm or less, 50 nm or less, or 45 nm or less, in order of preference.

The upper limit for the particle diameter (primary particles) of red light-emitting nanocrystals according to the present invention is preferably 50 nm or less, 40 nm or less, 30 nm or less, or 20 nm or less, in order of preference.

The upper and lower limits for the peak wavelength of red light-emitting nanocrystals according to the present invention are 665 nm and 605 nm, respectively. The compound(s) and its particle diameter are selected so that such a peak wavelength is obtained. Likewise, the upper and lower limits for the peak wavelength of green light-emitting nanocrystals are 560 nm and 500 nm, respectively, and those for the peak wavelength of blue light-emitting nanocrystals are 420 nm and 480 nm, respectively. For each type, the compound(s) and its particle diameter are selected so that such a peak wavelength is obtained.

If a dispersion or ink composition according to the present invention is used to produce a color filter for a liquid crystal display element, the liquid crystal display element includes at least one pixel. The colors constituting the pixel are given by three pixels close to one another, and each pixel contains a different type of nanocrystals that emit red light (e.g., light-emitting nanocrystals of CdSe, rod-shaped light-emitting nanocrystals of CdSe, core-shell rod-shaped light-emitting nanocrystals with a CdS shell portion and a CdSe inner, core portion, core-shell rod-shaped light-emitting nanocrystals with a CdS shell portion and a ZnSe inner, core portion, core-shell light-emitting nanocrystals with a CdS shell portion and a CdSe inner, core portion, core-shell light-emitting nanocrystals with a CdS shell portion and a ZnSe inner, core portion, light-emitting mixed nanocrystals of CdSe and ZnS, rod-shaped light-emitting mixed nanocrystals of CdSe and ZnS, light-emitting nanocrystals of InP, light-emitting nanocrystals of InP, core/shell nanocrystal particles with a ZnS shell portion and an InP inner, core portion, core/shell nanocrystal particles with a ZnSe shell portion and an InP inner, core portion, core/shell/shell nanocrystal particles with an ZnSe outermost shell portion, a ZnS inner shell portion, and an InP inner, core portion, core/shell/shell nanocrystal particles with a ZnS outermost shell portion, a ZnSe inner shell portion, and an InP inner, core portion, rod-shaped light-emitting nanocrystals of InP, light-emitting mixed nanocrystals of CdSe and CdS, rod-shaped light-emitting mixed nanocrystals of CdSe and CdS, light-emitting mixed nanocrystals of ZnSe and CdS, or rod-shaped light-emitting mixed nanocrystals of ZnSe and CdS), green light (e.g., light-emitting nanocrystals of CdSe, rod-shaped light-emitting nanocrystals of CdSe, light-emitting nanocrystals of InP, light-emitting mixed nanocrystals of CdSe and ZnS or rod-shaped light-emitting mixed nanocrystals of CdSe and ZnS, rod-shaped light-emitting nanocrystals of InP, core/shell nanocrystal particles with a ZnS shell portion and an InP inner, core portion, core/shell nanocrystal particles with a ZnSe shell portion and an InP inner, core portion, core/shell/shell nanocrystal particles with an ZnSe outermost shell portion, a ZnS inner shell portion, and an InP inner, core portion, or core/shell/shell nanocrystal particles with a ZnS outermost shell portion, a ZnSe inner shell portion, and an InP inner, core portion), or blue light (light-emitting nanocrystals of ZnTe, light-emitting nanocrystals of ZnSe, rod-shaped light-emitting nanocrystals of ZnSe, light-emitting nanocrystals of ZnS, rod-shaped light-emitting nanocrystals of ZnS, core-shell light-emitting nanocrystals with a ZnSe shell portion and a ZnS inner, core portion, core-shell rod-shaped light-emitting nanocrystals with a ZnSe shell portion and a ZnS—CdS inner, core portion, or rod-shaped light-emitting nanocrystals of CdS). Other colors (e.g., yellow) may also be contained in the light conversion layer, and different colors from four or more pixels close to one another may even be used.

Light-emitting nanocrystals according to the present invention can be a commercially available product.

Examples of commercially available light-emitting nanocrystals include NN-labs's indium phosphide/zinc sulfide, D-dots, and CuInS/ZnS and Aldrich's InP/ZnS.

The quantity of the light-emitting nanocrystals in the dispersion or ink composition according to the present invention may be 5% by mass or more, may be 10% by mass or more, may be 15% or more, may be 20% by mass or more, may be 30% by mass or more, or may be 40% by mass or more of the mass of nonvolatile components of the dispersion or ink composition because this results in more effective reduction of light leakage, thereby further improving the luminescence properties of the dispersion or ink composition. The quantity of the light-emitting nanocrystals may be 70% by mass or less, may be 60% by mass or less, may be 55% by mass or less, or may be 50% by mass or less of the mass of nonvolatile components of the dispersion or ink composition because this ensures highly stable ejection. If the light-emitting nanocrystals are modified with an organic ligand, the total quantity of the light-emitting nanocrystals and organic ligand modifying them may be in the above ranges. The "mass of nonvolatile components of a dispersant or ink composition" as used herein refers to the mass that is left after subtracting the mass of any solvent from the total mass of the dispersion or ink composition or to the total mass of the dispersion or ink composition if the dispersion or ink composition contains no solvent.

The average particle diameter (primary particles) of the light-emitting nanocrystals according to the present invention can be measured by TEM observation. In general, the average particle diameter of nanocrystals is measured by methods such as light scattering, sedimentation particle size analysis, in which solvent is used, and the measurement of the average particle diameter through direct observation of particles under an electronic microscope. Light-emitting nanocrystals are prone to damage, for example from water, so it is appropriate in the present invention to use a method in which any multiple crystals are directly observed under a transmission electron microscope (TEM) or scanning electron microscope (SEM), the diameter of each crystal particle is calculated from the major-to-minor axis ratio as measured on two-dimensional projections, and the diameters are averaged. In the present invention, therefore, this method is used to calculate average particle diameters. More specifically, the average particle diameter (volume-average diameter) of the light-emitting nanocrystals according to the present invention may be 1 nm or more, may be 1.5 nm or more, or may be 2 nm or more because this helps give the desired wavelength to the emitted light and ensures superior dispersibility and storage stability. The average particle diameter may be 40 nm or less, may be 30 nm or less, or may be 20 nm or less because this helps obtain the desired emission wavelength. The average particle diameter (volume average diameter) of the light-emitting nanocrystals can be determined through measurement using a transmission electron microscope or scanning electron microscope and subsequent calculation of the volume average diameter. The primary particles of light-emitting nanocrystals are the single crystals nanometers to tens of nanometers in size or similar crystallites that form the nanocrystals. The size and shape of the primary particles of light-emitting nanocrystals appear to depend on, for example, the chemical makeup and structure of the primary particles and the method and parameters for the production of the primary particles.

The light-emitting nanocrystals detailed above can be used to produce an ink in the form of a colloid of particulate nanocrystals in an organic solution. When the light-emitting nanocrystals are in such a state, being dispersed in an organic solution, it is preferred that the particulate light-emitting nanocrystals be passivated through coordinate bonding to the surface of quantum dots via an organic ligand. Examples of organic ligands that can be used include TOP (trioctylphosphine), TOPO (trioctylphosphine-oxide), oleic acid, oleylamine, octylamine, trioctylamine, hexadecylamine, octanethiol, dodecanethiol, hexylphosphoric acid (HPA), tetradecylphosphonic acid (TDPA), and octylphosphinic acid (OPA).

For other organic ligands, it is preferred that the light-emitting nanocrystals have an aliphatic hydrocarbon that has an ethylene oxide chain and/or a propylene oxide chain as group(s) having an affinity for the nanocrystals because this makes the light-emitting nanocrystals even better in dispersibility and luminescence intensity.

The above preferred organic ligand may be, for example, an organic ligand represented by general formula (1) below.

[Chem. 2]

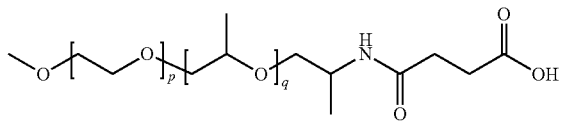

(1)

[In formula (1), p represents an integer of 0 to 50, and q represents an integer of 0 to 50.]

For those organic ligands represented by general formula (1), it is preferred that at least one of p and q be 1 or more, and it is more preferred that both of p and q be 1 or more.

The organic solvent used in the organic solvent solution can be, for example, cyclohexane, hexane, heptane, chloroform, toluene, octane, chlorobenzene, tetralin, diphenyl ether, propylene glycol monomethyl ether acetate, butyl carbitol acetate, or a mixture thereof. The organic solvent may be of the same kind as that used in the dispersion or ink composition, which is described hereinafter. In the present invention, the organic ligand may be removed and replaced with the undermentioned polymeric dispersion, but in light of the dispersion stability of the inkjet ink composition made with the nanocrystals, it is preferred to mix the undermentioned polymeric dispersant with the particles of the light-emitting nanocrystals with the organic ligand coordinated thereto.

The percentage of the light-emitting nanocrystals detailed above in the dispersion or ink composition is not critical, but preferably is in the range of 20% to 70% by mass so that efficiency in light conversion and color reproduction can be ensured. As mentioned above, light-emitting nanocrystals have a large surface area, their particles aggregate easily, and therefore it is usually difficult to mix in a large quantity of light-emitting nanocrystals. In the present invention, however, the nanocrystals remain highly dispersible, are not easily quenched via the aggregation of their particles, and exhibit good brightness and color reproduction even if their percentage in the dispersion is as large as 20% to 70% by mass.

The percentage of the light-emitting nanocrystals detailed above in an active radiation-curable dispersion is not critical, but preferably is in the range of 20% to 70% by mass so that efficiency in light conversion and color reproduction can be ensured. As mentioned above, light-emitting nanocrystals have a large surface area, their particles aggregate easily, and therefore it is usually difficult to mix in a large quantity of light-emitting nanocrystals. In the present invention, however, the nanocrystals remain highly dispersible, are not easily quenched via the aggregation of their particles, and exhibit good brightness and color reproduction even if their percentage in the dispersion is as high as 20% to 70% by mass.

"Polymeric Dispersant"

A polymeric dispersant according to the present invention is a polymeric compound that has an amine value of 5 mg KOH/g or more and at least one basic functional group, and its function is to disperse the light-emitting nanocrystals and an optional light-diffusing agent. With its functional group having an affinity for the light-emitting nanocrystals or the light-diffusing particles, in particular the light-diffusing particles, the polymeric dispersant adsorbs on the light-diffusing particles and disperses them in the ink composition via electrostatic repulsion and/or steric repulsion between its molecules. The polymeric dispersant is preferably adsorbing on the light-diffusing particles by binding to their surface, but it may be adsorbing on the luminescent nanocrystals by binding to the surface of light-emitting nanocrystals or may be free in the ink composition.

The polymeric dispersant used in the present invention has a basic polar group and an amine value of 5 mg KOH/g or more. The lower limit for the amine value of the polymeric dispersant is preferably 6 mg KOH/g or more, more preferably 7 mg KOH/g or more, even more preferably 8 mg KOH/g or more, still more preferably 8 mg KOH/g or more. An amine value of 5 mg KOH/g or more helps make the light-emitting nanocrystals and light-diffusing particles sufficiently dispersible and also helps improve light emission from the light-emitting nanocrystals in the ink composition. The upper limit for the amine value of the polymeric dispersant is preferably 90 mg KOH/g or less, more preferably 70 mg KOH/g or less, even more preferably 60 mg KOH/g or less, in particular 50 mg KOH/g or less. With an amine value of 90 mg KOH/g or less, it is unlikely that the storage stability of the pixel units (cured ink composition) will be low.

If a liquid dispersion according to the present invention is used as an active radiation-curable liquid dispersion, the polymeric dispersant has an amine value in the range of 8 to 50 mg KOH/g. The basic polar group in this case functions as a group that adsorbs on the surface of the light-emitting nanocrystals, so if the amine value is lower than 8 mg KOH/g, low dispersibility of the light-emitting nanocrystals causes low luminescence efficiency. An amine value exceeding 50 mg KOH/g also results in low dispersibility because of an imbalance between the concentration of the functional group and the block polymer segment. In the present invention, in pursuit of better dispersibility, it is particularly preferred that the amine value be in the range of 25 to 45 mg KOH/g.

The amine value of a polymeric dispersant can be measured as follows. x grams of
the polymeric dispersant and 1 mL of bromophenol blue test solution are dissolved
in 50 mL of a 1:1, by volume, mixture of toluene and ethanol to give a sample solution,
and the base is titrated with 0.5 mol/L hydrochloric acid until the sample solution turns green. Then the amine value can be calculated using the following equation.

$$\text{Amine value} = y/x \times 28.05$$

In the equation, y represents the titration volume (mL), the volume of 0.5 mol/L hydrochloric acid required for the titration, and x represents the mass (g) of the polymeric dispersant.

The polymeric dispersant may have at least one extra functional group besides
the basic functional group. The extra functional group can be, for example, one
or more functional groups selected from the group consisting of acidic
functional groups and nonionic functional groups. Of these functional groups,
those having an affinity for the light-diffusing particles are preferred. The acidic functional groups have dissociable proton(s) and may be neutralized with a base, such as an amine or the hydroxide ion. The basic functional group can be, for example, a primary, secondary, or tertiary amino group, an ammonium group, an imino group, or a nitrogen-containing heterocyclic group, such as pyridine, pyrimidine, pyrazine, imidazole, or triazole. The basic functional group is preferably an amino group in light of the dispersion stability of the light-diffusing particles; because the amino group is unlikely to have the side effect of causing the light-emitting nanocrystals to settle down and therefore help improve the luminescence intensity of the light-emitting nanocrystals; for ease of synthesizing the polymeric dispersant; and in light of the stability of the functional group itself. The basic functional group may be partially neutralized with an acid, such as an organic or inorganic acid.

The polymeric dispersant may have at least one extra functional group besides the basic functional group. The extra functional group can be, for example, one or more functional groups selected from the group consisting of acidic functional groups and nonionic functional groups. Of these functional groups, those having an affinity for the light-diffusing particles are preferred. The acidic functional groups have dissociable proton(s) and may be neutralized with a base, such as an amine or the hydroxide ion.

Examples of acidic functional groups include carboxyl (—COOH), sulfo (—SO3H), sulfuric acid (—OSO3H), phosphonic acid (—PO(OH)3), phosphoric acid (—OPO(OH)3), phosphinic acid (—PO(OH)—), and mercapto (—SH) groups.

Examples of nonionic functional groups include hydroxy, ether, thioether, sulfinyl (—SO—), sulfonyl (—SO2-), carbonyl, formyl, ester, carbonate, amide, carbamoyl, ureido, thioamide, thioureido, sulfamoyl, cyano, alkenyl, alkynyl, phosphine oxide, and phosphine sulfide groups.

The extra functional group is preferably at least one acidic functional group in light of the dispersion stability of the light-emitting nanocrystals and light-diffusing particles; because acidic groups are unlikely to have the side effect of causing the light-emitting nanocrystals to settle down and therefore help improve the luminescence intensity of the light-emitting nanocrystals; for ease of synthesizing the polymeric dispersant; and in light of the stability of the functional group(s) itself. More preferably, the acidic functional group is at least one of carboxyl, sulfo, phosphonic acid, and phosphoric acid groups. It is even more preferred that the extra functional group be at least one of carboxyl and phosphonic acid groups in particular.

A polymeric dispersant that has an acidic functional group besides a basic functional group has an acid value besides an amine value. The acid value of a polymeric dispersant that has an acidic functional group is preferably 50 mg KOH/g or less. The upper limit for the acid value of the polymeric dispersant is more preferably 45 mg KOH/g or less, even more preferably 35 mg KOH/g or less, in particular 30 mg KOH/g or less, in more particular 24 mg KOH/g or less.

With an acid value of 50 mg KOH/g or less, it is unlikely that the storage stability of the pixel units (cured ink composition) will be low.

The acid value of a polymeric dispersant can be measured as follows. p grams of the polymeric dispersant and 1 mL of phenolphthalein test solution are dissolved in 50 mL of a 1:1, by volume, mixture of toluene and ethanol to give a sample solution, and the acid is titrated with a 0.1 mol/L solution of potassium hydroxide in ethanol (obtained by dissolving 7.0 g of potassium hydroxide in 5.0 mL of distilled water and adding 95 vol % ethanol to adjust the volume to 1000 mL) until the sample solution turns light red. Then the acid value can be calculated using the following equation.

$$\text{Acid value} = q \times r \times 5.611/p$$

In the equation, q represents the titration volume (mL), the volume of the 0.1 mol/L solution of potassium hydroxide in ethanol required for the titration, r represents the titer of the 0.1 mol/L solution of potassium hydroxide in ethanol required for the titration, and p represents the mass (g) of the polymeric dispersant.

The polymeric dispersant may be a homopolymer (polymer obtained by polymerizing a single kind of monomer) or may be a copolymer (polymer obtained by copolymerizing multiple kinds of monomers). The polymeric dispersant, moreover, may be any of a random copolymer, a block copolymer, and a graft copolymer. If the polymeric dispersant is a graft copolymer, it may be a comb-shaped graft copolymer or may be a star-shaped graft copolymer. The polymeric dispersant can be, for example, an acrylic resin, polyester resin, polyurethane resin, polyamide resin, polyether, phenolic resin, silicone resin, polyurea resin, amino resin, polyamine, such as a polyethylene imine or polyallylamine, epoxy resin, or polyimide.

The amount of the polymeric dispersant may be 0.5 parts by mass or more, may be 2 parts by mass or more, or may be 5 parts by mass of more per 100 parts by mass of light-diffusing particles in light of the dispersibility of the light-emitting nanocrystals and light-diffusing particles. The amount of the polymer dispersion may be 50 parts by mass or less, may be 30 parts by mass or less, or may be 10 parts by mass or less per 100 parts by mass of light-diffusing particles in light of the wet-heat stability of the pixel units (cured ink composition).

Incidentally, forming pixel units of a color filter by inkjetting using a known ink composition can suffer from low stability in the ejection from inkjet nozzles, for example because of the aggregation of light-emitting nanocrystals and light-diffusing particles. Improving ejection stability, for example by making the light-emitting nanocrystals and light-diffusing particles finer or reducing the quantity of light-emitting nanocrystals and light-diffusing particles, often results in less effective reduction of light leakage. This has made it difficult to combine sufficient ejection stability with effective reduction of leakage light. With an ink composition containing a polymeric dispersant according to this embodiment, by contrast, light leakage can be reduced to a greater extent while ensuring sufficient ejection stability. The reason why such an advantage is obtained is unclear, but a possible reason is that the polymeric dispersant according to this embodiment reduces the aggregation of the light-emitting nanocrystals and light-diffusing particles (in particular, light-diffusing particles) significantly.

As for the polymer backbone segment of this polymeric dispersant having a polar group, examples include a block copolymer formed by acrylate polymer blocks and ethylene glycol moieties and a block copolymer formed by a polyethylene imine, a higher fatty acid ester of an aliphatic polyester, or a polyacrylamine and a polyester or polyamide.

Specific examples of such polymeric dispersions having a polar group include Ajinomoto Fine-Techno's "AJISPER PB821," "PB822," and "PB817,", Lubrizol's "Solsperse 24000GR," "S32000," "S33000," and "S39000," Kusumoto Chemicals's "DISPARLON DA-703-50," "DA-705," and "DA-725," and BASF's "EFKA PX-4701."

The amount of the polymeric dispersant is preferably in the range of 2% to 15% by mass, in particular 3% to 10% by mass, in the dispersion according to the present invention. Too little polymeric dispersant is not preferred because it often results in insufficient dispersibility, and too much polymeric dispersant is not preferred because it often affects ejection stability. The polymeric dispersant is usually used with a solvent that dissolves it because if not dissolved, the polymeric dispersant keeps its site for adsorbing on the light-emitting nanocrystals unexposed.

The weight-average molecular weight of the polymeric dispersant according to the present invention may be 750 or more, may be 1000 or more, may be 2000 or more, or may be 3000 or more because this helps disperse the light-emitting nanocrystals and light-diffusing particles well and results in more effective reduction of light leakage, thereby improving the luminescence properties of the ink composition. The weight-average molecular weight of the polymeric dispersant may be 100000 or less, may be 50000 or less, or may be 30000 or less because this helps disperse the light-emitting nanocrystals and light-diffusing particles well and results in effective reduction of light leakage, thereby improving the luminescence properties of the ink composition, and because this ensures the viscosity of the inkjet ink is such that the ink is ejectable and suitable for stable ejection. A weight-average molecular weight herein is a polystyrene-equivalent weight-average molecular weight measured by GPC (Gel Permeation Chromatography).

The amount of the polymeric dispersant in the liquid dispersion or ink composition may be 0.5 parts by mass or more, may be 2 parts by mass or more, or may be 5 parts by mass of more per 100 parts by mass of light-diffusing particles in light of the dispersibility of the light-emitting nanocrystals and light-diffusing particles. The amount of the polymer dispersion may be 50 parts by mass or less, may be 30 parts by mass or less, or may be 10 parts by mass or less per 100 parts by mass of light-diffusing particles in light of the wet-heat stability of the pixel units (cured liquid dispersion or ink composition).

"Light-Diffusing Particles"

A dispersion according to the present invention preferably contains light-diffusing particles besides the light-emitting nanocrystals because this helps further improve efficiency in light conversion by increasing the chance of collision between light from the light source and the light-emitting nanocrystals in each pixel of the light conversion layer, and also helps obtain a display element superior in color reproduction by ensuring uniform distribution of converted light in each pixel.

Such light-diffusing particles only need to be optically inert inorganic fine particles that are submicron or smaller in size, but preferably are fine particles whose longest particle diameter is 200 nm or less in light of ejection stability of the dispersion when it is used as inkjet. Specific examples include pure metals, such as tungsten, zirconium, titanium, platinum, bismuth, rhodium, palladium, silver, tin, platinum, and gold; metal oxides, such as silica, barium sulfate, barium carbonate, calcium carbonate, talc, titanium oxide, clay, kaolin, barium sulfate, barium carbonate, barium carbonate, calcium carbonate, alumina white, titanium oxide, magnesium oxide, barium oxide, aluminum oxide, bismuth oxide, zirconium oxide, and zinc oxide; metal carbonates, such as magnesium carbonate, barium carbonate, bismuth subcarbonate, and calcium carbonate; metal hydroxides, such as aluminum hydroxide; composite oxides, such as barium zirconate, calcium zirconate, calcium titanate, barium titanate, and strontium titanate; and metal salts, such as bismuth subnitrate.

Among these, titanium oxide, barium sulfate, and calcium carbonate are particularly preferred, especially in light of stable dispersion.

The light-diffusing particles are, for example, optically inert inorganic fine particles. The light-diffusing particles are capable of scattering light emitted from the light source to the pixel units of the color filter.

The shape of the light-diffusing particles can be, for example, spherical, filament-like, or indefinite and preferably is particulate because this ensures highly efficient diffusion of light. For use as the light-diffusing particles, however, particles in a shape that has little directionality (e.g., spherical particles or particles in the shape of regular tetrahedrons) are preferred because such particles help further improve the uniformity, fluidity, and light-scattering properties of the dispersion or ink composition.

The average particle diameter (volume-average diameter) of the light-diffusing particles in a dispersion or ink composition may be 0.05 µm or more, may be 0.1 µm or more, or may be 0.2 µm or more because this results in more effective reduction of light leakage, thereby further improving the luminescence properties of the dispersion or ink composition. The average particle diameter (volume-average diameter) of the light-diffusing particles in a dispersion or ink composition may be 1.0 µm or less, may be 0.6 µm or less, or may be 0.4 µm or less because this ensures highly stable ejection. The average particle diameter (volume average diameter) of the light-diffusing particles in a dispersion or ink composition may be between 0.05 and 1.0 µm, between 0.05 and 0.6 µm, between 0.05 and 0.4 µm, between 0.1 and 1.0 µm, between 0.1 and 0.6 µm, between 0.1 and 0.4 µm, between 0.2 and 1.0 µm, between 0.2 and 0.6 µm, or between 0.2 and 0.4 µm. To help obtain such an average particle diameter (volume average diameter), the average particle diameter (volume average diameter) of the light-diffusing particles before use may be 50 nm or more and may be 1000 nm or less. The average particle diameter (volume average diameter) of the light-diffusing particles in a dispersion or ink composition can be determined by measuring the diameter and calculating the volume average diameter using Nanotrac dynamic light scattering particle size analyzer. The average particle diameter (volume average diameter) of the light-diffusing particles before use can be determined by, for example, measuring the diameter of each particle using a transmission electron microscope or scanning electron microscope and calculating the volume average diameter.

The quantity of the light-diffusing particles may be 0.1% by mass or more, may be 1% by mass or more, may be 5% by mass or more, may be 7% by mass or more, may be 10% by mass or more, or may be 12% by mass or more of the mass of nonvolatile components of the ink composition because this results in more effective reduction of light leakage, thereby further improving the luminescence properties of the dispersion or ink composition. The quantity of the light-diffusing particles may be 60% by mass or less, may be 50% by mass or less, may be 40% by mass or less, may be 30% by mass or less, may be 25% by mass or less, may be 20% by mass or less, or may be 15% by mass or less of the mass of nonvolatile components of the dispersion or ink composition because this results in more effective reduction of light leakage, thereby further improving the luminescence properties of the dispersion or ink composition, and also ensures highly stable ejection. In this embodiment, the polymeric dispersant contained in the dispersion or ink composition ensures good dispersibility of the light-diffusing particles even if the quantity of the light-diffusing particles is in the above ranges.

The ratio by mass of the quantity of the light-diffusing particles to that of the light-emitting nanocrystals (light-diffusing particles/light-emitting nanocrystals) may be 0.1 or more, may be 0.2 or more, or may be 0.5 or more because this results in more effective reduction of light leakage, thereby further improving the luminescence properties of the dispersion or ink composition. The mass ratio (light-diffusing particles/light-emitting nanocrystals) may be 5.0 or less, may be 2.0 or less, or may be 1.5 or less because this results in more effective reduction of light leakage, thereby further improving the luminescence properties of the dispersion or ink composition, and also ensures smooth continuous ejection in inkjet printing. The inventors believe that the light-diffusing particles reduce light leakage through the following mechanism. That is, if there are no light-diffusing particles, the backlight only passes substantially straight through the inside of the pixel units; there is little chance of the backlight being absorbed by the light-emitting nanocrystals. If there are light-diffusing particles in the same pixel units as the light-emitting nanocrystals, the backlight is scattered in all directions in the pixel units, and the scattered light is available to the light-emitting nanocrystals. Even though the same backlight unit is used, the amount of light absorbed in the pixel units increases, and this leads to a further improvement in the luminescence intensity of the light-emitting nanocrystals. Such a mechanism, as a result, helps prevent the leakage of light and further improve the luminescence properties of the dispersion or ink composition.

The light-diffusing particles can be dispersed well in the dispersion by virtue of the aforementioned polymeric dispersant. The quantity of the light-diffusing particles is preferably in the range of 10% to 50% by mass, in particular 15% to 30% by mass, in the dispersion according to the present invention.

A light conversion layer according to the prevent invention may further contain a pigment of the same color as the emitted light besides the aforementioned light-emitting nanocrystals. That is, if the light conversion layer of a liquid crystal display element is a layer containing light-emitting nanocrystals dispersed therein, the light from the light source is blue light or quasi-white light that has a peak at 450 nm. If the concentration of the light-emitting nanocrystals is not sufficiently high when the liquid crystal display element is driven, however, the light from the light source passes through the light conversion layer, and the transmitted light from the light source (blue light) and the light emitted by the light-emitting nanocrystals blend together. To prevent this, a pigment may be added to the light conversion layer.

"Curable Material"

A dispersion or ink composition according to the present invention must contain a stimulation-responsive curable material cures in response to an external stimulus. By virtue of this, the curable material functions as a binder once the dispersion or ink composition is cured.

The external stimulus can be, for example, active radiation (light, such as iUV (ultraviolet radiation), or an EB (electron beam)) or heat. A stimulation-responsive curable material according to the present invention therefore refers to a material that polymerizes and cures in response to light, an electron beam, or heat.

Examples of such curable materials include active radiation-curable monomers (including photopolymerizable compounds), photocurable resins, thermosetting resins, and electron beam-curable resins.

The stimulation-responsive curable material according to the present invention is preferably an active radiation-curable monomer, photocurable resin, or thermosetting resin, preferably an active radiation-curable monomer or thermosetting resin.

In the present invention, the stimulation-responsive curable material may be insoluble in alkalis because this helps obtain highly reliable pixel units of a color filter.

Examples of photocurable resins include epoxy resins, acrylic resins, urethane acrylic resins, and polyene-thiol resins.

Examples of electron beam-curable resins include acrylic resins, methacrylic resins, urethane resins, polyester resins, polyether resins, and silicone resins.

Next, an active radiation-curable monomer used in the present invention can be selected from various monofunctional (meth)acrylates and multifunctional (meth)acrylates. One (meth)acrylate from a category may be used alone, or multiple (meth)acrylates from a category may be used. In the present invention, however, it is particularly preferred to use monofunctional (meth)acrylate(s) and multifunctional (meth)acrylate(s) in combination so that the dispersion or ink composition will be balanced between the fluidity and ease of ejection from nozzles when used as an ink and the smoothness issue that occurs when the dispersion or ink composition shrinks while being cured in the production of a color filter.

Examples of monofunctional (meth)acrylates that can be used include (meth)acrylates such as methyl (meth)acrylate, ethyl (meth)acrylate, propyl (meth)acrylate, butyl (meth)acrylate, amyl (meth)acrylate, 2-ethylhexyl (meth)acrylate, octyl (meth)acrylate, nonyl (meth)acrylate, dodecyl (meth)acrylate, hexadecyl (meth)acrylate, octadecyl (meth)acrylate, cyclohexyl (meth)acrylate, methoxyethyl (meth)acrylate, butoxyethyl (meth)acrylate, phenoxyethyl (meth)acrylate, nonylphenoxyethyl (meth)acrylate, glycidyl (meth)acrylate, dimethylaminoethyl (meth)acrylate, diethylaminoethyl (meth)acrylate, isobornyl (meth)acrylate, dicyclopentanyl (meth)acrylate, dicyclopentenyl (meth)acrylate, dicyclopentenyloxyethyl (meth)acrylate, 2-hydroxy-3-phenoxypropyl (meth)acrylate, tetrahydrofurfuryl (meth)acrylate, 2-hydroxyethyl (meth)acrylate, and benzyl (meth)acrylate.

For multifunctional (meth)acrylates, examples include di(meth)acrylates of 1,3-butylene glycol, 1,4-butanediol, 1,5-pentanediol, 3-methyl-1,5-pentanediol, 1,6-hexanediol, neopentyl glycol, 1,8-octanediol, 1,9-nonanediol, tricyclodecane dimethanol, ethylene glycol, polyethylene glycol, propylene glycol, dipropylene glycol, tripropylene glycol, polypropylene glycol, etc., the di(meth)acrylate of tris(2-hydroxyethyl)isocyanurate, di(meth)acrylates of diols obtained by adding ethylene oxide or propylene oxide to neopentyl glycol with 4 moles or more oxide per mole of neopentyl glycol, di(meth)acrylates of diols obtained by adding ethylene oxide of propylene oxide to bisphenol A with 2 moles of oxide per mole of bisphenol A, di- or tri(meth)acrylates of triols obtained by adding ethylene oxide or propylene oxide to trimethylolpropane with 3 moles or more oxide per mole of trimethylolpropane, di(meth)acrylates of diols obtained by adding ethylene oxide or propylene oxide to bisphenol A with 4 moles or more oxide per mole of bisphenol A, trimethylolpropane tri(meth)acrylate, pentaerythritol tri(meth)acrylate, poly(meth)acrylates of dipentaerythritol, ethylene oxide-modified (meth)acrylate phosphate, and ethylene oxide-modified (meth)acrylate alkyl phosphates.

Among these, phenoxyethyl acrylate and dipropylene glycol diacrylate are particularly preferred because they markedly reduce the viscosity of the ink and in light of the strength of the cured film.

Specific examples of radically photopolymerizable compounds used in the present invention include epoxy compounds and vinyl ether compounds.

Specific examples of epoxy compounds include bisphenol-A epoxy compounds, bisphenol-F epoxy compounds, and phenol-novolac epoxy compounds, aliphatic epoxy compounds, such as trimethylolpropane polyglycidyl ethers and neopentyl glycol diglycidyl ether, and alicyclic epoxy compounds, such as Daicel Chemical Industries, Ltd.'s CELLOXIDE 2000, 3000, and 4000.

Specific examples of vinyl ether compounds include 2-hydroxyethyl vinyl ether, triethylene glycol vinyl monoether, tetraethylene glycol divinyl ether, and trimethylolpropane trivinyl ether.

The active radiation-curable monomer is desirably one that dissolves the polymeric dispersant. Specifically, it is preferred that the dispersion or ink composition contain a photopolymerizable compound in which the solubility of the polymeric dispersant is 30% by mass or more because this makes the dispersion or ink composition superior in the dispersibility of the light-emitting nanocrystals.

For use as such a monomer in which the polymeric dispersant is soluble, preferred monofunctional (meth)acrylates in particular include 2-hydroxy-3-phenoxypropyl (meth)acrylate, tetrahydrofurfuryl (meth)acrylate, 2-hydroxyethyl (meth)acrylate, benzyl (meth)acrylate, and phenoxyethyl (meth)acrylate. As for multifunctional (meth)acrylates, neopentyl glycol di(meth)acrylate dipropylene glycol di(meth)acrylate are preferred for use.

Among these, phenoxyethyl acrylate is particularly preferred, and it is easily available because it is on the market, for example as Kyoeisha Chemical's trade name "PO-A." Dipropylene glycol diacrylate is also preferred, and it is easily available because Miwon's "M-222," for example, is on the market.

The amount of such a (meth)acrylate that dissolves the polymeric dispersant is preferably equal to or greater than that of the polymeric dispersant in the ink.

As for cationically polymerizable compounds that dissolve the polymeric dispersant, it is preferred to use a low-viscosity alicyclic epoxy compound. A specific example is "CELLOXIDE 3000."

For the active radiation-curable dispersion according to the present invention to give an ink that has low viscosity and cures and dries quickly, it is preferred to use a (meth)acrylate, which is a compound that undergoes radical polymerization, as a photopolymerizable compound.

Moreover, to give excellent curability to the ink composition according to the present invention and to give resistance, for example to wear and solvents, to coatings formed by curing the composition, it is preferred that an active radiation-curable composition formed by a radically photopolymerizable compound contain a binder resin. The binder resin can be, for example, polyurethane (meth)acrylate, epoxy (meth)acrylate, polyether (meth)acrylate, or polyester (meth)acrylate, but preferably is polyurethane (meth)acrylate in light of the toughness of the coatings, compatibility with the polymeric dispersant, and curability.

The reason why an active radiation-curable dispersion that contains polyurethane (meth)acrylate exhibits superior curability is presumably that the terminal double bonds of polyurethane (meth)acrylate break easily in comparison with those of ordinary (meth)acrylates by virtue of the nearby urethane linkages.

A polyurethane (meth)acrylate for use in inkjet applications preferably has low viscosity or can be easily thinned by dilution with a (meth)acrylate even if the polyurethane (meth)acrylate itself has high viscosity, for example because it is crystalline. Specifically, polyurethane (meth)acrylates that have a melt viscosity at 60° C. or 1 to 10 Pa·s are preferred, and for this to be achieved, it is desirable to use a polyurethane (meth)acrylate obtained by reacting a polyisocyanate with a monohydroxy (meth)acrylate rather than a polyol, such as a long-chain polyether or polyester.

The amount of the polyurethane (meth)acrylate is preferably between 3% and 10% by mass of the total amount of the dispersion in light of the viscosity, curability, solvent resistance, and wear resistance of the inkjet composition.

A radical photoinitiator used in the present invention can be any known and commonly used one with which the active radiation-curable monomer used can be cured. Molecular cleavage or hydrogen abstraction type photoinitiators are suitable to the present invention.

For use as a molecular-cleavage radical photoinitiator in the present invention, compounds such as benzoin isobutyl ether, 2,4-diethylthioxanthone, 2-isopropylthioxanthone, benzil, 2,4,6-trimethylbenzoyl diphenylphosphine oxide 6-trimethylbenzoyl diphenylphosphine oxide, 2-benzyl-2-dimethylamino-1-(4-morpholinophenyl)-butan-1-one, and bis(2,6-dimethoxybenzoyl)-2,4,4-trimethyl pentylphosphine oxide are suitable. These may be used in combination with other molecular-cleavage radical photoinitiators, such as 1-hydroxycyclohexyl phenyl ketone, benzoin ethyl ether, benzyl dimethyl ketal, 2-hydroxy-2-methyl-1-phenylpropan-1-one, 1-(4-isopropylphenyl)-2-hydroxy-2-methylpropan-1-one, and 2-methyl-1-(4-methylthiophenyl)-2-morpholinopropan-1-one. Hydrogen-abstraction photoinitiators such as benzophenone, 4-phenylbenzophenone, isophthalphenone, and 4-benzoyl-4'-methyl-diphenyl sulfide may also be used. It is also possible to use molecular-cleavage and hydrogen-abstraction photoinitiators in combination.

The radical photoinitiator, moreover, may be used in combination with a sensitizer that is, for example, an amine that does not undergo addition reaction with the polymerizable component described above. Examples of such amines include trimethylamine, methyldimethanolamine, triethanolamine, p-diethylaminoacetophenone, ethyl p-dimethylaminobenzoate, isoamyl p-dimethylaminobenzoate, N,N-dimethylbenzylamine, and 4,4'-bis(diethylamino) benzophenone. Naturally, the photoinitiator and sensitizer are preferably ones that are highly soluble in the active radiation-curable monomer and do not inhibit the transmission of ultraviolet radiation.

The amount of the radical photoinitiator and sensitizer is between 0.1% and 20% by mass, preferably 4% and 12% by mass, of the total amount of the active radiation-curable dispersion.

A cationic photoinitiator used in the present invention can be any known and commonly used one with which the active radiation-curable monomer used can be cured. Specific examples include polyarylsulfonium salts, such as triphenylsulfonium hexafluoroantimonate and triphenylsulfonium hexafluorophosphate, and polyaryliodonium salts, diphenyliodonium hexafluoroantimonate and P-nonylphenyliodonium hexafluoroantimonate. Two or more of these cationic photoinitiators can be used in combination.

The amount of the cationic photoinitiator is between 0.1% and 20% by mass, preferably 1% and 10% by mass, of the active radiation-curable dispersion.

In the present invention, the cured form of the active radiation monomer may be insoluble in alkalis because this helps obtain highly reliable pixel units of a color filter.

A dispersion or ink composition according to the present invention, moreover, may contain a resin, additives, etc., for example for adjusting the surface tension and rendering the dispersion or ink composition adhesive to the material to which it is applied.

A thermosetting resin according to the present invention is a resin that crosslinks and cures in response to heat and functions as a binder once the dispersion or ink composition is cured. A thermosetting resin has a curable group. The curable group can be, for example, an epoxy, oxetane, isocyanate, amino, carboxyl, or methylol group, and the epoxy group is preferred because it makes the cured dispersion or ink composition superior in heat resistance and storage stability and because it also ensures excellent adhesion to the light shield (e.g., a black matrix) and the substrate. The thermosetting resin may have one kind of curable group or may have two or more kinds of curable groups.

The thermosetting resin may be a monomeric thermosetting resin (e.g., monomeric epoxy resin) or may be a polymeric thermosetting resin (e.g., polymeric epoxy resin). A polymeric thermosetting resin may be a polymer obtained by polymerizing a single kind of monomer (homopolymer) or may be a polymer obtained by copolymerizing multiple kinds of monomers (copolymer). The thermosetting resin, moreover, may be any of a random copolymer, a block copolymer, and a graft copolymer.

The thermosetting resin is a compound having two or more thermosetting functional groups per molecule and usually is used in combination with a curing agent. If a thermosetting resin is used, a catalyst capable of promoting the thermosetting reaction (curing accelerator) may be added. In other words, the ink composition may contain a thermosetting component that includes a thermosetting resin (and optionally a curing agent and a curing accelerator). A polymer that does not undergo further polymerization itself may be used besides these.

An example of a compound that has two or more thermosetting functional groups per molecule is an epoxy resin that has two or more epoxy groups per molecule (hereinafter also referred to as a "multifunctional epoxy resin"). "Epoxy resins" include monomeric and polymeric epoxy resins. A multifunctional epoxy resin preferably has 2 to 50, more preferably 2 to 20, epoxy groups per molecule. The epoxy groups only need to be structures that have an oxirane ring structure, and can be, for example, glycidyl, oxyethylene, or epoxycyclohexyl groups. Examples of epoxy resins include known polyepoxy resins that can be cured with carboxylic acid. A wide range of sources, such as "Epokisi Jusi Handobukku" (Epoxy Resins Handbook), ed. Masaki Shinbo, Nikkan Kogyo Shimbun (1987), disclose such epoxy resins, and these epoxy resins can be used.

Examples of thermosetting resins that have an epoxy group (including multifunctional epoxy resins) include polymers of a monomer that has an oxirane ring structure and copolymers of a monomer that has an oxirane ring structure with another monomer. Specific examples of multifunctional epoxy resins include polyglycidyl methacrylate, methyl methacrylate-glycidyl methacrylate copolymers, benzyl methacrylate-glycidyl methacrylate copolymers, n-butyl methacrylate-glycidyl methacrylate copolymers, 2-hydroxyethyl methacrylate-glycidyl methacrylate copolymers, (3-ethyl-3-oxetanyl)methyl methacrylate-glycidyl methacrylate copolymers, and styrene-glycidyl methacrylate copolymers. The compounds described in paragraphs 0044 to 0066 of Japanese Unexamined Patent Application Publication No. 2014-56248 can also be used as thermosetting resins according to this embodiment.

The multifunctional epoxy resin can also be, for example, a bisphenol-A epoxy resin, bisphenol-F epoxy resin, brominated-bisphenol-A epoxy resin, bisphenol-S epoxy resin, diphenyl-ether epoxy resin, hydroquinone epoxy resin, naphthalene epoxy resin, biphenyl epoxy resin, fluorene epoxy resin, phenol-novolac epoxy resin, ortho-cresol-novolac epoxy resin, tris-hydroxyphenyl-methane epoxy resin, trifunctional epoxy resin, tetraphenylolethane epoxy resin, dicyclopentadiene-phenol epoxy resin, hydrogenated-bisphenol-A epoxy resin, polyol epoxy resins containing the bisphenol A nucleus, polypropylene-glycol epoxy resin, glycidyl-ester epoxy resin, glyoxal epoxy resin, alicyclic epoxy resin, or heterocyclic epoxy resin.

More specific examples include bisphenol-A epoxy resins such as trade name "Epikote 828" (Japan Epoxy Resin), bisphenol-F epoxy resins such as trade name "YDF-175S" (Tohto Kasei), brominated-bisphenol-A epoxy resins such as trade name "YDB-715" (Tohto Kasei), bisphenol-S epoxy resins such as trade name "EPICLON EXA1514" (DIC Corporation), hydroquinone epoxy resins such as trade name "YDC-1312" (Tohto Kasei), naphthalene epoxy resins such as trade names "EPICLON EXA4032," "HP-4770," "HP-4700," and "HP-5000" (DIC Corporation), biphenyl epoxy resins such as trade name "Epikote YX4000H" (Japan Epoxy Resin), bisphenol-A novolac epoxy resins such as trade name "Epikote 157S70" (Japan Epoxy Resin), phenol-novolac epoxy resins such as trade name "Epikote 154" (Japan Epoxy Resin) and trade name "YDPN-638" (Tohto Kasei), cresol-novolac epoxy resins such as trade name "YDCN-701" (Tohto Kasei), dicyclopentadiene-phenol epoxy resins such as trade names "EPICLON HP-7200" and "HP-7200H" (DIC Corporation), tris-hydroxyphenyl-methane epoxy resins such as trade name "Epikote 1032H60" (Japan Epoxy Resin), trifunctional epoxy resins such as trade name "VG3101M80" (Mitsui Chemicals), tetraphenylolethane epoxy resins such as trade name "Epikote 1031S" (Japan Epoxy Resin), tetrafunctional epoxy resins such as trade name "Denacol EX-411" (Nagase Chemicals), hydrogenated-bisphenol-A epoxy resins such as trade name "ST-3000" (Tohto Kasei), glycidyl-ester epoxy resins such as trade name "Epikote 190P" (Japan Epoxy Resin), glycidyl-amine epoxy resins such as trade name "YH-434" (Tohto Kasei), glyoxal epoxy resins such as trade name "YDG-414" (Tohto Kasei), alicyclic multifunctional epoxy resins such as trade name "EPOLEAD GT-401" (Daicel Chemical), and heterocyclic epoxy resins such as triglycidyl isocyanate (TGIC). If necessary, trade name "Neotohto E" (Tohto Kasei), for example, may be mixed in as an epoxy-reactive diluent.

The multifunctional epoxy resin, moreover, can be DIC Corporation's "FINEDIC A-247S," "FINEDIC A-254," "FINEDIC A-253," "FINEDIC A-229-30A," "FINEDIC A-261," "FINEDIC A249," "FINEDIC A-266," "FINEDIC A-241" "FINEDIC M-8020," "EPICLON N-740," "EPICLON N-770," "EPICLON N-865" (trade names), etc.

The use of a multifunctional epoxy resin having a relatively small molecular weight as a thermosetting resin results in an ink composition (inkjet ink) with a supply of epoxy groups therein. The epoxies are highly concentrated when they react, ensuring that the crosslink density is high.

Among multifunctional epoxy resins, epoxy resins that have four or more epoxy groups per molecule (multifunctional epoxy resin that is tetrafunctional or has more epoxy groups) are particularly preferred because this ensures high crosslink density. It should be noted that if a thermosetting resin having a weight-average molecular weight of 10000 or less is used to improve the stability of ejection from an ejection head in inkjetting, the strength and hardness of the pixel units (cured ink composition) tend to be low. So especially in such a case, it is preferred to add a tetrafunctional epoxy resin or multifunctional epoxy resin having more epoxy groups to the ink composition (inkjet ink) to ensure a sufficiently high crosslink density.

Examples of curing agents and curing accelerators used to cure a thermosetting resin include 4-methylhexahydrophthalic anhydride, triethylenetetramine, diaminodiphenylmethane, phenol novolac resins, tris(dimethylaminomethyl) phenol, N,N-dimethylbenzylamine, 2-ethyl-4-methylimidazole, triphenylphosphine, and 3-phenyl-1,1-dimethylurea.

The thermosetting resin may be insoluble in alkalis because this helps obtain highly reliable pixel units of a color filter. A thermosetting resin being alkali-insoluble means that the solubility of the thermosetting resin in a 1% by mass aqueous solution of potassium hydroxide at 25° C. is 30% by mass or less of the total mass of the thermosetting resin. This solubility of the thermosetting resin is preferably 10% by mass or less, more preferably 3% by mass or less.

The weight-average molecular weight of the thermosetting resin may be 750 or more, may be 1000 or more, or may be 2000 or more because this helps obtain viscosity appropriate for use as an inkjet ink, ensures good curability of the ink composition, and improves the solvent resistance and wear resistance of the pixel units (cured ink composition). The weight-average molecular weight of the thermosetting resin may be 500000 or less, may be 300000 or less, or may be 200000 or less because this ensures viscosity appropriate for use as an inkjet ink. This, however, may not be true for the molecular weight of a crosslinked resin.

The amount of the thermosetting resin may be 10% by mass or more, may be 15% by mass or more, or 20% by mass or more of the mass of nonvolatile components of the ink composition because this helps obtain viscosity appropriate for use as an inkjet ink, ensures good curability of the ink composition, and improves the solvent resistance and wear resistance of the pixel units (cured dispersion or ink composition). The amount of the thermosetting resin may be 90% by mass or less, may be 80% by mass or less, may be 70% by mass or less, may be 60% by mass or less, or may be 50% by mass or less of the mass of nonvolatile components of the ink composition so that the viscosity of the inkjet ink will not be too high and that the pixel units will not be too thick for their light conversion capability.

In this embodiment, a dispersion or ink composition contains a thermosetting resin, and this makes the dispersion or ink composition, which contains light-emitting nanocrystals (e.g., quantum dots), superior in storage stability and also makes the pixel units (cured dispersion or ink composition) superior in durability (e.g., wet-heat stability).

The amount of the thermosetting resin in the dispersion or ink composition may be 3% by mass or more, may be 5% by mass or more, may be 10% by mass or more, may be 15% by mass or more, or may be 20% by mass or more of the mass of nonvolatile components of the ink composition because this helps obtain viscosity appropriate for use as an inkjet ink, ensures good curability of the ink composition, and improves the luminescence intensity, solvent resistance, and wear resistance of the pixel units (cured ink composition). The amount of the thermosetting resin, moreover, may be 80% by mass or less, may be 60% by mass or less, or 50% by mass or less of the mass of nonvolatile components of the ink composition so that the viscosity of the inkjet ink will not be too high and that the pixel units will not be too thick for their light conversion capability.

A dispersion or ink composition according to the present invention must contain light-emitting nanocrystals, a polymeric dispersant, and a stimulation-responsive curable material (thermosetting resin or active radiation monomer) and preferably contains light-emitting nanocrystals, a polymeric dispersant, light-diffusing particles, a stimulation-responsive curable material (thermosetting resin or active radiation monomer), and an organic ligand.

A dispersion or ink composition according to the present invention, moreover, may contain extra ingredients, other than light-emitting nanocrystals, light-diffusing particles, a polymeric dispersant, a stimulation-responsive curable material (thermosetting resin or active radiation monomer), and an organic ligand, unless they compromise the advantages of the present invention.

A dispersion or ink composition according to the present invention may optionally contain a solvent. The solvent may be of the same kind as or different from the dispersion medium (solvent) for the light-emitting nanocrystals. The solvent can be, for example, a monoacetate compound, such a diethylene glycol monoether acetate, ethylene glycol monoethyl ether acetate, diethylene glycol monobutyl ether acetate, or dipropylene glycol methyl ether acetate, a diacetate compound, such as 1,4-butanediol diacetate or propylene glycol diacetate, or a triacetate compound, such as glyceryl triacetate.

Other solvents can also be used, such as diethylene glycol dibutyl ether, propylene glycol dimethyl ether, tripropylene glycol dimethyl ether, diethyl adipate, dibutyl oxalate, diethyl malonate, dimethyl succinate, and dimethyl succinate.

The boiling point of the solvent is preferably 180° C. or higher in light of the stability of continuous ejection of the inkjet ink. It should be noted that the formation of pixel units involves removing the solvent from the ink composition before curing the ink composition. It is therefore preferred that the boiling point of the solvent be 300° C. or lower so that the solvent can be removed easily.

It is preferred to use a solvent so that the dispersion or ink composition according to the present invention can be prepared uniform and because the solvent increases, for example, the fluidity of the ink composition and thereby helps form pixel units of a color filter (light conversion layer) with little unevenness. Since the light-emitting nanocrystals are labile to water and easily lose their luminescent properties when exposed to water, the dispersion or ink composition is preferably used by inkjetting.

The viscosity of a dispersion or ink composition according to the present invention may be 2 mPa·s or more, may be 5 mPa·s or more, or may be 7 mPa·s or more, for example in light of ejection stability in inkjet printing. The viscosity of the ink composition may be 20 mPa·s or less, may be 15 mPa·s or less, or may be 12 mPa·s or less. A viscosity of the ink composition of 2 mPa·s or more ensures a stable meniscus shape of the ink composition at the tip of the ink nozzles of an ejection head, thereby helping control the ejection of the ink composition (e.g., control the ejection volume and the timing of ejection). A viscosity of 20 mPa·s or less allows the ink composition to be ejected through ink nozzles smoothly. The viscosity of the ink composition may be between 2 and 20 mPa·s, between 2 and 15 mPa·s, between 2 and 12 mPa·s, between 5 and 20 mPa·s, between 5 and 15 mPa· between 2 and 20 mPa·s, between 7 and 15 mPa·s, between 7 and 12 mPa·s, or between 7 and 12 mPa·s. The viscosity of the ink composition is measured using, for example, a cone-plate rheometer. The viscosity of the ink composition can be adjusted to the desired range, for example by changing parameters such as the weight-average molecular weight of the thermosetting resin, a curing agent, a curing accelerator, etc., and the amount of the solvent.

The surface tension of a dispersion or ink composition according to the present invention is preferably suitable for inkjetting. Specifically, it is preferred that the surface tension be in the range of 20 to 40 mN/m, more preferably 25 to 35 mN/m. A surface tension in these ranges helps reduce deflections. A deflection refers to a situation in which an ink composition ejected from ink nozzles lands at a point 30 μm or farther away from the target point. A surface tension of 40 mN/m or less ensures a stable meniscus shape of the ink composition at the tip of the ink nozzles of an ejection head, thereby helping control the ejection of the ink composition (e.g., control the ejection volume and the timing of ejection). A surface tension of 20 mN/m or less helps reduces deflections, i.e., ensures that no pixel unit is formed with an insufficient amount of ink composition therein as a result of the ink composition fails to land accurately in the regions where it should, i.e., the planned regions for pixel units, and that there is no decrease in color reproduction caused by the ink composition landing in a planned region for a pixel unit (or on a pixel unit) next to the planned region for a pixel unit where it should. The surface tension of the ink composition can be adjusted to the desired range, for example by using a silicone surfactant, fluorosurfactant, acetylene surfactant, etc., in combination with the ink composition.

A dispersion, such as an active radiation-curable dispersion or ink composition, according to the present invention can be adjusted by blending the ingredients described above, and this dispersion can be used as an ink for inkjet applications. A specific method for adjusting an inkjet ink composition is by dispersing the aforementioned light-emitting nanocrystals and polymeric dispersion in an organic solvent, removing the organic solvent to prepare a mill base, mixing the mill base into a polymerizable monomer component containing an active radiation-curable monomer and a photoinitiator, and stirring and mixing the materials using a bead mill. If light-diffusing particles are used, the ink composition can be adjusted by preparing a separate mill base by dispersing the light-diffusing particles and the aforementioned polymeric dispersion in an organic solvent and then removing the organic solvent, mixing the mill base and the aforementioned light-emitting nanocrystals with a polymerizable monomer component, and stirring and mixing the materials using a bead mill.

Next is described how to produce a dispersion or ink composition according to the present invention. The ink composition is obtained by, for example, mixing and dispersing the ingredients of an ink composition described above. In the following, a method for producing an ink composition that further contains a polymeric dispersant is described as an example of how to produce the ink composition.

An example of a method for producing an ink composition according to the present invention includes, for example, a first step in which a dispersion of light-diffusing particles is prepared that contains light-diffusing particles and a polymeric dispersant, and a second step in which the dispersion of light-diffusing particles is mixed with light-emitting nanocrystals. In this method, the dispersion of light-diffusing particles may further contain a photopolymerizable compound and/or a thermosetting resin, and the second step may include mixing in the photopolymerizable compound and/or the thermosetting resin. By ensuring that light-diffusing particles are fully dispersed, this method helps reduce light leakage from pixel units and provides an easy way to obtain an ink composition superior in ejection stability.

In the step of preparing a dispersion of light-diffusing particles, the dispersion of light-diffusing particles may be prepared by mixing and dispersing light-diffusing particles, a polymeric dispersant, and optionally a photopolymerizable compound and/or a thermosetting resin. The mixing and dispersing operations may be performed using a disperser, such as a bead mill, a paint shaker, or a planetary mixer. It is preferred to use a bead mill or paint shaker because it ensures good dispersibility of the light-diffusing particles and helps adjust the average particle diameter of the light-diffusing particles to the desired range.

The method for producing an ink composition may include, before the second step, a step of preparing a dispersion of light-emitting nanocrystals that contains light-emitting nanocrystals and a photopolymerizable compound and/or a thermosetting resin. In this case, the second step is to mix the dispersion of light-diffusing particles and the dispersion of light-emitting nanocrystals. By ensuring that the light-emitting nanocrystals are fully dispersed, this method helps reduce light leakage from pixel units and provides an easy way to obtain an ink composition superior in ejection stability. In the step of preparing a dispersion of light-emitting nanocrystals, a disperser like those enumerated for the step of preparing a dispersion of light-diffusing particles may be used to mix and disperse the light-emitting nanocrystals and the photopolymerizable compound and/or thermosetting resin.

If an ink composition according to this embodiment is used as an ink composition for inkjet applications, the ink composition is preferably used with a piezo-jet inkjet recorder, which operates via a mechanical ejection mechanism that uses piezoelectric elements. The piezo-jet technology involves no sudden exposure of the ink composition to high temperatures before ejection, is unlikely to cause the light-emitting nanocrystals to denature, and is an easier way to give the pixel units of a color filter (light conversion layer) expected luminescence properties.

(Production of a Light Conversion Layer)

To produce a light conversion layer that corresponds to a color filter of an ordinary display device from inkjet inks as detailed above, a possible method is to attach inkjet ink compositions containing light-emitting nanocrystals that produce the desired colors, such as R, G, and B, selectively to predetermined regions of a transparent substrate by inkjetting and then cure the coatings by irradiation with active radiation to form colored cured layers, such as pixel units and a light-shielding layer.

Specifically, the light conversion layer can be obtained by forming a light shield, called a black matrix, on a transparent substrate, then applying inkjet inks according to the present invention by inkjetting to pixel areas, i.e., the areas divided by the light shield, and then forming a protective layer.

The inkjetting technology can be, for example, the Bubble Jet® technology, which uses electrothermal converters as energy generators, or the piezo-jet technology, in which piezoelectric elements are used.

The transparent substrate can be, for example, a transparent glass substrate, such as a plate of quartz glass, Pyrex®@ glass, or synthetic quartz, or a transparent flexible material, such as a transparent resin film or an optical-grade resin plate. Among these, Corning's "7059 glass" is particularly preferred because this material with a small coefficient of thermal expansion is superior in dimensional stability and ease of operations in heating at high temperatures and because it is alkali-free glass, a type of glass that contains no alkali component.

Next, the light shield, which functions as a black matrix between pixels, can be formed by, for example, forming a thin metal film, for example of chromium, to a thickness of approximately 1000 to 2000 angstroms by sputtering, vacuum deposition, etc., on one side of the transparent substrate in the region that will be the boundaries between pixel units, and then patterning this thin film.

Instead of a thin metal film, the light shield may be a layer of a resin binder that contains light-shielding particles, such as fine particles of carbon, a metal oxide, an inorganic pigment, or an organic pigment. The resin binder can be, for example, a resin such as a polyimide resin, an acrylic resin, an epoxy resin, polyacrylamide, polyvinyl alcohol, gelatin, casein, or cellulose, a mixture of two or more of them, a photosensitive resin, or even an O/W emulsion resin composition, such as an emulsion of a reactive silicone. The thickness of such a resin-made light shield can be selected in the range of 0.5 to 10 µm. Examples of techniques for patterning using such a resin containing particles dispersed therein include photolithography and printing.

Then, desirably, a layer of an ink-repellent material narrower than the light shield is formed on the pattern of the light shield to form an ink-repellent layer.

The ink-repellent material can be an aqueous resin such as polyacrylamide, polyvinyl alcohol, gelatin, casein, or cellulose, a composition obtained by mixing two or more of aqueous resins, or an O/W emulsion resin composition, such as an emulsion of a reactive silicone. In the present invention, photocurable resins are preferred for reasons such as their ease of handling and that they are easy to cure. The stronger its ink repellency is, the more preferred this ink-repellent projection is. This ink-repellent projection may therefore have a surface treated with an ink-repellent agent, such as a silicone compound or fluorinated compound.

In the present invention, inkjet inks can then be ejected toward the pixel areas by inkjetting and fixed there, but prior to this, a general-purpose receiving layer, for example of hydroxypropyl cellulose, may be formed in the pixel areas as an ink-receiving layer. However, hydroxypropyl cellulose and other known ink-receiving layers require a baking step, and the light-emitting nanocrystals easily lose their activity when heated. It is therefore preferred to avoid using a receiving layer or use the undermentioned photocatalyst-containing layer to define a region of an ink-repellent layer on the light shield and form regions of a new-ink layer on in the pixel areas through irradiation with light, In another possible method, instead of the ink-repellent layer on the light shield, a layer that contains a photocatalyst may be formed as a layer to provide varying wettability. The photocatalyst-containing layer is formed as a continuous coating over a region including the planned regions for pixel units. In this state, the surface of the coated area repels inks. Then the photocatalyst-containing layer is irradiated with light through a photomask to increase compatibility with inks selectively in the planned regions for pixel units.

If the exposure is performed using a photomask, it is preferred to make the exposed areas broader than the planned regions for pixel units while leaving some unexposed area on the light shield. Exposure from the side opposite the surface of the transparent substrate on which printing is performed eliminates the need for a photomask because in this case the light shield functions as a photomask.

The light with which the photocatalyst-containing layer is irradiated may be visible light or invisible light as long as it activates the photocatalyst, but usually is light that includes ultraviolet light. Examples of such light sources that include ultraviolet light include a mercury lamp, a metal halide lamp, and a xenon lamp. The wavelength of this light for exposure can be selected from the range of 400 nm or less, preferably the range of 380 nm or less, and the amount of light to which the layer is exposed is The aforementioned layer for varying wettability can be formed of, for example, a material obtained by preparing a liquid coating by dispersing a photocatalyst and a binder in a solvent optionally with additives, applying this liquid coating, and then immobilizing the photocatalyst in the binder by allowing hydrolysis and polycondensation to proceed.

Those photocatalysts that activate, when irradiated with light, the function of the material itself to increase its surface free energy can be used. Examples include titanium oxide (TiO2), zinc oxide (ZnO), tin oxide (SnO2), strontium titanate (SrTiO3), tungsten oxide (WO3), bismuth oxide (Bi2O3), and iron oxide ($Fe_2O_3$).

The binder used in the photocatalyst-containing layer, moreover, preferably has a binding energy high enough that its backbone is not decomposed by the light-induced excitation of the photocatalyst. Examples include (1) organopolysiloxanes that are highly strong by virtue of hydrolysis and polycondensation of chlorosilane, an alkoxysilane, etc., for example through sol-gel reactions and (2) organopolysiloxanes obtained by crosslinking a reactive silicone excellent in water repellency and oil repellency.

The amount of the photocatalyst in the photocatalyst-containing layer can be selected in the range of 5% to 60% by weight, preferably in the range of 20% to 40% by weight. The thickness of the photocatalyst-containing layer is preferably in the range of 0.05 to 10 µm.

The solvent in which these ingredients are dissolved or dispersed is preferably an organic solvent that is an alcohol, such as ethanol or isopropanol. The dispersion can be applied by known coating methods, such as spin coating, spray coating, dip coating, roll coating, and bead coating. If the dispersion contains an ultraviolet-curable ingredient as a binder, curing it by irradiation with ultraviolet radiation gives a photocatalyst-containing layer.

A liquid dispersion or ink composition according to the present invention may be made into a color filter by photolithography, but in this case, it is preferred to apply the ink composition to a substrate and optionally dry the applied composition to form a coating film and then pattern the coating film by treating it with an alkaline developer. However, even without treatment with an alkaline developer as in the above inkjet production of a light conversion layer or color filter, the coating film made from the ink composition readily absorbs atmospheric moisture if the ink composition is soluble in alkalis. The capability of emitting light (e.g., fluorescence) of the light-emitting nanocrystals (e.g., quantum dots) is therefore lost over time. In this light, it is preferred in this embodiment that coating films made from the dispersion or ink composition be insoluble in alkalis.

That is, the dispersion or ink composition in this embodiment is preferably a dispersion or ink composition capable of forming a coating film insoluble in alkalis. Such a dispersion or ink composition can be obtained by using an alkali-insoluble active radiation monomer and/or an alkali-insoluble thermosetting resin. A coating film made from a dispersion or ink composition being insoluble in alkalis means that the solubility of the coating film made from the dispersion or ink composition soluble in a 1% by mass aqueous solution of potassium hydroxide at 25° C. is 30% by mass or less of the total mass of the coating film made from the dispersion or ink composition. This solubility of the coating film made from the dispersion or ink composition is preferably 10% by mass or less, more preferably 3% by mass or less. The capability of a dispersion or ink composition to form a coating film insoluble in alkalis can be confirmed by measuring the above solubility of a 1-µm thick coating film obtained by applying the dispersion or ink composition to a substrate. If the dispersion or ink composition contains a solvent, the applied coating is dried under the conditions of 80° C. and 3 minutes to give a 1-µm thick film.

(Step of Forming a Protective Layer)

A method for producing a light conversion layer in the present invention may include a step of forming a protective layer, in which a protective layer is formed on the pixel units. The protective layer is intended to planarize the color filter and to prevent the substances contained in the pixel units or those in the pixel units and in a photocatalyst-containing layer from dissolving in the liquid crystal layer.

The protective layer can be made of any known material that is used as a protective layer for a color filter. An epoxy-based thermosetting or acrylic photocurable material is suitable for use, but since the former, an epoxy-based protecting material, requires baking at high temperatures to cure, an acrylic protective material, which is photocurable, is preferred. Such an acrylic protective material can be a combination of the aforementioned monofunctional or multifunctional (meth)acryloyl monomers selected as needed for the desired characteristics.

The thickness of the protective layer can be determined considering, for example, the surface condition of the light conversion layer. For example, it can be selected within the range of 0.1 to 2.0 µm.

A light conversion layer obtained in such a way can be, for example, one that has the cross-sectional structure illustrated in FIG. 1. Whereas an ordinary liquid crystal display element produces different colors by selecting certain wavelengths and absorbing part of light coming from a white light source in its color filter, a light conversion layer according to the present invention uses, as an alternative to a color filter, a light conversion layer that contains light-emitting nanocrystals. A light conversion layer 6 in the present invention therefore includes pixels in the three primary colors of red (R), green (G), and blue (B) and serves the same role as a so-called color filter.

The following describes a light conversion layer according to the present invention in further detail on the basis of FIG. 1. In the light conversion layer 6, pixel units in red (R) (portions of the color layers in red) include a light-converting pixel layer (NC-Red) that contains red light-emitting nanocrystals, pixel units in green (R) (portions of the color layers in green) include a light-converting pixel layer (NC-Green) that contains green light-emitting nanocrystals, and pixel units in blue (R) (portions of color layers in blue) include a light-converting pixel layer (NC-Blue) that contains blue light-emitting nanocrystals.

That is, the light conversion layer 6, if the light source for it is light that has its primary peak near 450 nm, such as from a blue LED, can use blue light emitted by a blue LED as the color blue. If the light source section emits blue light, therefore, the light-converting pixel layers (NC-Blue) of the above light-converting pixel layers in different colors (NC-Red, NC-Green, and NC-Blue) may be omitted, and the color blue may be the backlight as it is. In this case, the color layers that produce blue can be, for example, transparent resin layers or colorant layers that contain a blue colorant (so-called blue color filters). In FIG. 1, the blue light-emitting nanocrystals are indicated by dash dot lines because the blue light-emitting nanocrystals can be optional.

The light-emitting nanocrystals NC according to the present invention are preferably represented by at least one type selected from the group consisting of blue light-emitting nanocrystals NC that absorb light emitted by a light source section (e.g., blue light) and emit blue light, green light-emitting nanocrystals NC that absorb light emitted by a light source section (e.g., blue light) and emit green light, and red light-emitting nanocrystals NC that absorb light emitted by a light source section (e.g., blue light) and emit red light, more preferably by two types of light-emitting nanocrystals NC selected from the group consisting of blue light-emitting nanocrystals NC that absorb light emitted by a light source section (e.g., blue light) and emit blue light, green light-emitting nanocrystals NC that absorb light emitted by a light source section (e.g., blue light) and emit green light, and red light-emitting nanocrystals NC that absorb light emitted by a light source section (e.g., blue light) and emit red light. It is particularly preferred that the light conversion layer according to the present invention include layers that contain red light-emitting nanocrystals (NC-Red) and layers that contain green light-emitting nanocrystals (NC-Green).

The light conversion layer detailed above has a conversion efficiency excellent for use as a light conversion layer, is superior in color reproduction, and provides a useful alternative to a color filter of a liquid crystal display element or an organic EL display element.

The light conversion layer, moreover, requires a light source that emits short-wavelength or ultraviolet visible light to excite the quantum dots. Since the liquid crystal layer of a liquid crystal display element is easily decomposed by high-energy light in the short-wavelength spectrum, the amount of light from the light source cannot be increased if the light source emits short-wavelength or ultraviolet visible light. The present invention, by virtue of the high light conversion efficiency of the light conversion layer, allows the manufacturer to build a display device that is practical even with relatively weak light from its light source. In this regard, the present invention is extremely advantageous when it is applied to a liquid crystal display element. It is, furthermore, of particular note that a liquid crystal display element constructed as a combination of a liquid crystal layer that has a predetermined liquid crystal composition with the above light conversion layer, like that according to the present invention detailed hereinafter, offers unprecedentedly high brightness and unprecedentedly long service life and is superior in color strength and color reproduction because the liquid crystal layer itself is strong enough that it can withstand prolonged exposure to high-energy light in the short-wavelength spectrum.

Figure 2:
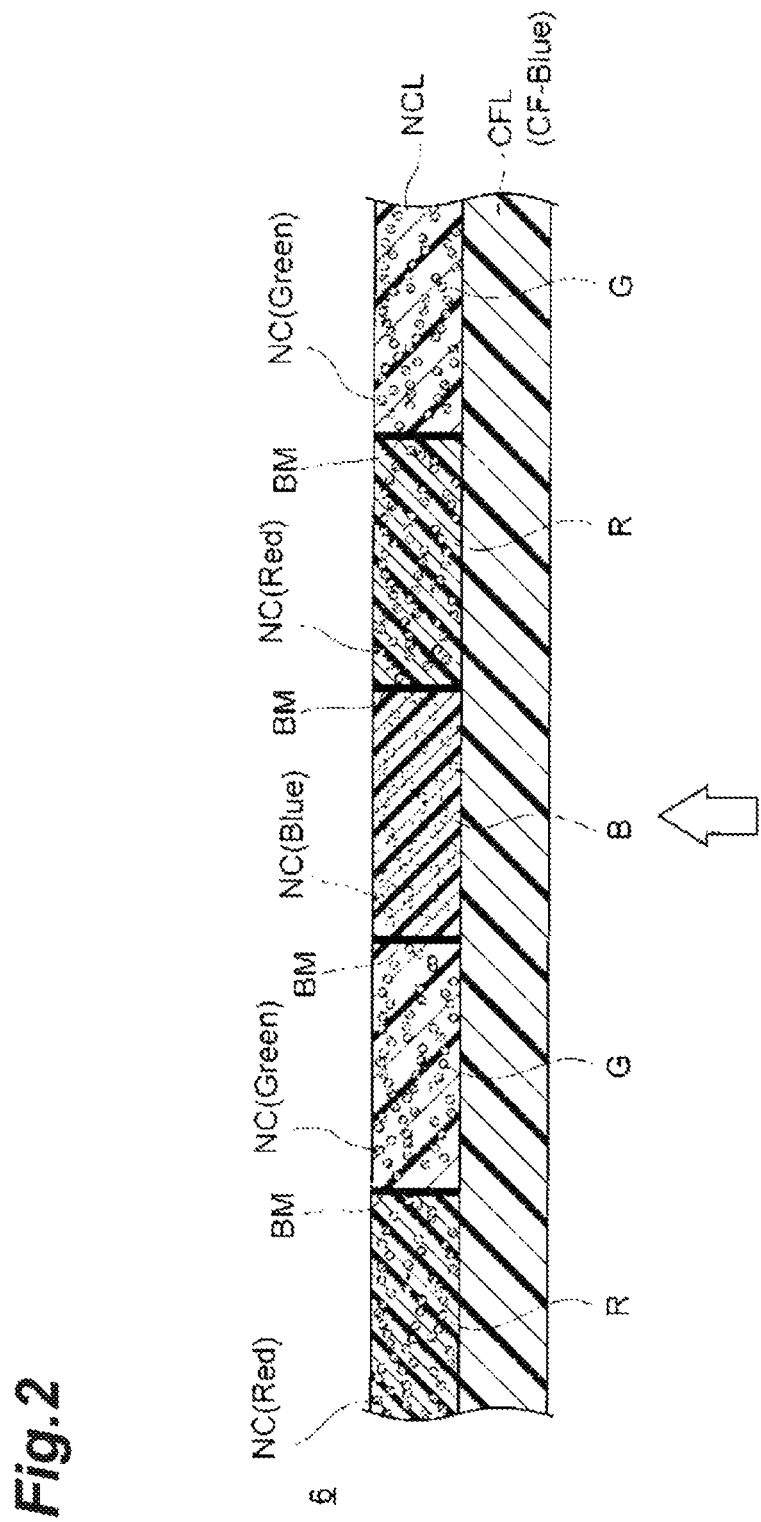
FIG. 2 is a schematic diagram illustrating an example of a light conversion layer 6.

The light conversion layer detailed above may further have, depending on the type of light source used (a blue LED as a light emitter), a color layer that contains a blue colorant (so-called "blue color filter") on the entire surface of the light conversion layer closer to the light source, or between the light conversion layer and the light source throughout as illustrated in FIG. 2. Forming such a blue color filter is preferred because it blocks any unwanted external light and limits the associated loss of image quality.

FIG. 2 illustrates an example of an enlarged schematic view of a light conversion layer 6 according to the present invention. The light conversion layer 6 has color layers R in red, color layers G in green, and color layers B in blue.

Figure 3:
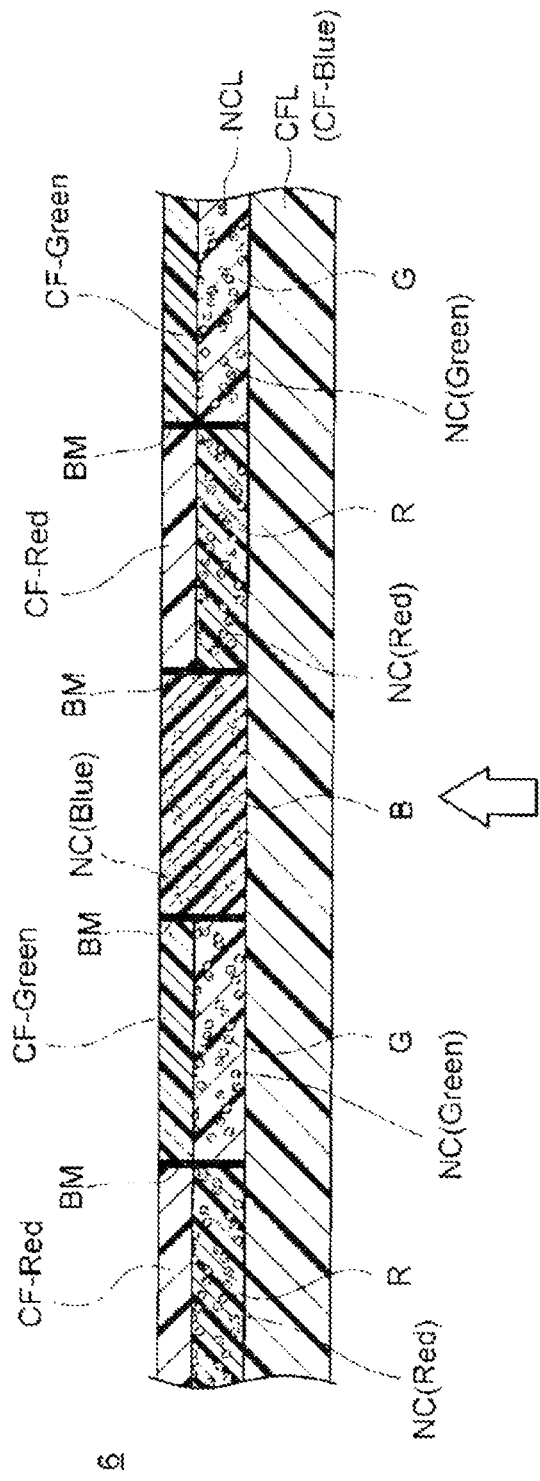
FIG. 3 is a schematic diagram illustrating an example of a light conversion layer 6.

A light conversion layer according to the present invention may have, for example as in FIG. 3, a stack of a nanocrystal layer NCL and a colorant layer (so-called color filter) CFL, which contains a colorant, in the pixel layers in each color.

A light conversion layer according to the present invention is highly efficient in light conversion, but occasionally fails to convert all light from the light source (excitation light; e.g., blue light) allows part of it to pass through. In such a case, the unwanted transmitted light can be absorbed by stacking each light-emitting nanocrystal-containing layer (NC) with a color layer (so-called color filter) CFL that contains a colorant of the same color as the color of the light emitted by the nanocrystal layer. The colorant layers that contain a green colorant (so-called green color filters) CF-Green may be replaced with colorant layers that contain a yellow colorant (so-called yellow color filters) for color adjustment purposes.

For the pixel layers in blue, as mentioned above, the color blue may be the color of the backlight itself. In this case, the color layers that produce blue can be, for example, transparent resin layers or colorant layers that contain a blue colorant (so-called blue color filters). In FIG. 3, the color layers R in red, color layers G in green, and color layers B in blue may optionally contain a colorant. Furthermore, the layers containing light-emitting nanocrystals NC (NCL) may contain colorants in the colors of the light from the nanocrystals.

Next are described a light conversion layer and a color filter in detail with reference to drawings. These light conversion layer and color filter use ink compositions according to preferred embodiments of the present invention.

Figure 13:
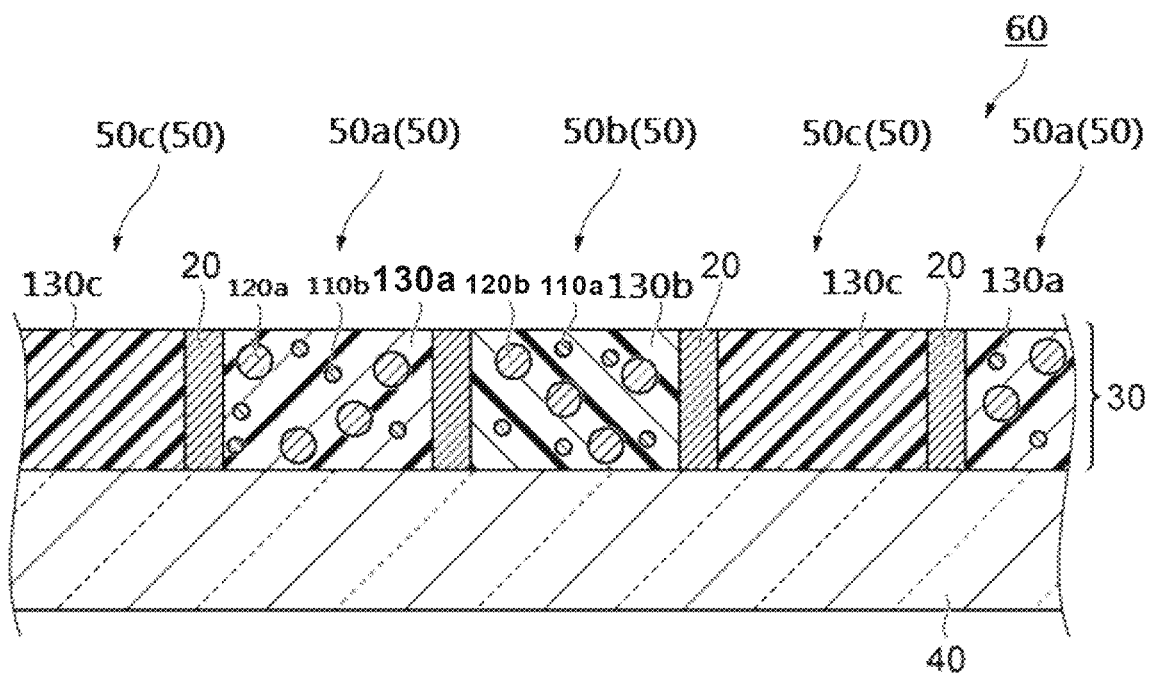
FIG. 13 is a schematic diagram illustrating an example of a color filter layer 60.

FIG. 13 is a schematic cross-sectional view of a color filter according to an embodiment. As illustrated in FIG. 13, the color filter 60 includes a substrate 40 and a light conversion layer 6 on the substrate 40. The light conversion layer 6 has multiple pixel units 50 and a light shield 20.

The light conversion layer 30 has, as the pixel units 50, first pixel units 50a, second pixel units 50b, and third pixel units 50c. The first, second, and third pixel units 50a, 50b, and 50c are arranged in an array in which first, second, and third pixel units repeat in this order. The light shield 20 extends between adjacent pixel units, i.e., between first and second pixel units 50a and 50b, between second and third pixel units 50b and 50c, and between third and first pixel units 50c and 50a. In other words, these adjacent pairs of pixel units are spaced apart by the light shield 20.

The first and second pixel units 50a and 50b each include the cured form of an ink composition according to the embodiment described above. The cured ink composition contains light-emitting nanocrystals, light-diffusing particles, and a binding component. The binding component is the cured form of a photopolymerizable compound and/or a thermosetting resin, specifically a hard substance obtained by polymerizing a photopolymerizable compound and/or crosslinking a thermosetting resin. That is, the first pixel units 50a contain a first binding component 130a and first light-emitting nanocrystals 110a and first light-diffusing particles 120a dispersed in the first binding component 130a. Likewise, the second pixel units 50b contain a second binding component 130b and second light-emitting nanocrystals 110b and second light-diffusing particles 120b dispersed in the second binding component 130b. The first and second binding components 130a and 130b, of the first and second pixel units 50a and 50b, respectively, may be the same or different, and the first and second light-diffusing particles 120a and 120b may be the same or different.

The first light-emitting nanocrystals 110a are red-luminescent nanocrystal particles that absorb light with a wavelength between 420 and 480 nm and emit light that has a peak emission wavelength in the range of 605 and 665 nm. The first pixel units 50a can therefore be expressed also as red pixel units for converting blue light into red light. The second light-emitting nanocrystals 110b are green-luminescent nanocrystal particles that absorb light with a wavelength between 420 and 480 nm and emit light that has a peak emission wavelength in the range of 500 and 560 nm. The second pixel units 50b can therefore be expressed also as green pixel units for converting blue light into green light.

The quantity of the light-emitting nanocrystals in the pixel units that include a cured ink composition may be 5% by mass or more, may be 10% by mass or more, may be 15% by mass or more, may be 20% by mass or more, may be 30% by mass or more, or may be 40% by mass or more of the mass of the cured ink composition because this results in more effective reduction of light leakage. The quantity of the light-emitting nanocrystals may be 70% by mass or less, may be 60% by mass or less, may be 55% by mass or less, or may be 50% by mass or less of the total mass of the cured ink composition because this makes the pixel units highly reliable.

The quantity of the light-diffusing particles in the pixel units that include a cured ink composition may be 0.1% by mass or more, may be 1% by mass or more, may be 5% by mass or more, may be 7% by mass or more, may be 10% by mass or more, or may be 12% by mass or more of the mass of the cured ink composition because this results in more effective reduction of light leakage. The percentage of light-diffusing particles may be 60% by mass or less, may be 50% by mass or less, may be 40% by mass or less, may be 30% by mass or less, may be 25% by mass or less, may be 20% by mass or less, or may be 15% by mass or less of the total mass of the cured ink composition because this results in more effective reduction of light leakage and also makes the pixel units highly reliable.

The third pixel units 50c transmit 30% or more of light with a wavelength between 420 and 480 nm. The third pixel units 50c therefore function as blue pixel units if the light source emits light with a wavelength between 420 and 480 nm. The third pixel units 50c include, for example, the cured form of a composition that contains the aforementioned photopolymerizable compound and/or thermosetting resin. The cured composition contains a third binding component 13c. The third binding component 13c is the cured form of a photopolymerizable compound and/or a thermosetting resin, specifically a hard substance obtained by polymerizing a photopolymerizable compound and/or crosslinking a thermosetting resin. The third pixel units 50c therefore contain the third binding component 13c. If the third pixel units 50c include the above cured composition, the composition that contains a photopolymerizable compound and/or a thermosetting resin may further contain any of the ingredients of an ink composition described above, excluding photopolymerizable compounds and thermosetting resins, as long as 30% or more of light with a wavelength between 420 and 480 nm can be transmitted. The transmittance of the third pixel units 50c can be measured using a microspectroscopic system.

The thickness of the pixel units (first, second, and third pixel units 50a, 50b, and 50c) may be 1 µm or more, may be 2 µm or more, or may be 3 µm or more. The thickness of the pixel units (first, second, and third pixel units 50a, 50b, and 50c) may be 30 µm or less, may be 20 µm or less, or may be 15 µm or less.

The light shield 20 is a so-called black matrix, a component used to space apart adjacent pixel units and thereby prevent color crosstalk and also to prevent the light from the light source from leaking. The material for the light shield 20 is not critical. Besides chromium and other metals, materials such as the cured form of a resin composition composed of a binder polymer and light-shielding particles, such as fine particles of carbon, a metal oxide, an inorganic pigment, or an organic pigment, contained therein, can be used. The binder polymer(s) can be, for example, a resin such as a polyimide resin, an acrylic resin, an epoxy resin, polyacrylamide, polyvinyl alcohol, gelatin, casein, or cellulose, a mixture of two or more of them, a photosensitive resin, or an O/W emulsion resin composition (e.g., an emulsion of a reactive silicone). The thickness of the light shield 20 may be 0.5 µm or more and may be 10 µm or less, for example.

The substrate 40 is an optically transparent substrate and can be, for example a transparent glass substrate, such as a plate of quartz glass, Pyrex® glass, or synthetic quartz, or a transparent flexible substrate, such as a transparent resin film or a resin film for optical purposes. Among these, glass substrates made of alkali-free glass, a type of glass that contains no alkali component, are particularly preferred. Specific examples of suitable types of glass include Corning's "7059 glass," "1737 glass," "Eagle 200," and "Eagle XG," Asahi Glass's "AN100," and Nippon Electric Glass's "OA-10G" and "OA-11." These materials with a small coefficient of thermal expansion are superior in dimensional stability and ease of operations in heating at high temperatures.

With this light conversion layer 30, the color filter 100 is suitable for use with a light source that emits light with a wavelength between 420 and 480 nm.

The color filter 100 can be produced by, for example, forming the light shield 20 on the substrate 40 as a pattern, then attaching ink compositions (inkjet inks) according to the embodiment described above to the planned regions for pixel units, divided by the light shield 20 on the substrate 40, and curing the ink compositions by irradiation with active radiation or heating.

The formation of the light shield 20 can be accomplished by, for example, forming a thin metal film, such as of chromium, or a thin film of a resin composition containing light-shielding particles on one side of the substrate 40 in the region that will be the boundaries between multiple pixel units and then patterning this thin film. The thin metal film can be formed by sputtering, vacuum deposition, etc., and the thin film of a resin composition containing light-shielding particles can be formed by coating, printing, etc. The patterning method can be, for example, photolithography.

The inkjetting technology can be, for example, the Bubble Jet® technology, which uses electrothermal converters as energy generators, or the piezo-jet technology, in which piezoelectric elements are used.

If the ink compositions are cured by irradiation with active radiation (e.g., ultraviolet radiation), the light source may be, for example, a mercury lamp, a metal halide lamp, a xenon lamp, or LEDs. The wavelength of the irradiating light may be 200 nm or more and may be 440 nm or less, for example. The exposure dose may be 10 mJ/cm² or more and may be 4000 mJ/cm² or less, for example.

If the ink compositions are cured by heating, the heating temperature may be 110° C. or more and may be 250° C. or less, for example. The duration of heating may be 10 minutes or more and may be 120 minutes or less, for example.

While a color filter, a light conversion layer, and a method for producing them in an embodiment have been described above, the present invention is not limited to these embodiments.

For example, the light conversion layer may have pixel units that include the cured form of an ink composition that contains blue-luminescent nanocrystal particles (blue pixel units) instead of the third pixel units 50c or besides the third pixel units 50c. The light conversion layer may even have pixel units that include the cured form of an ink composition that contains nanocrystal particles that emit light in a color other than red, green, or blue (e.g., yellow pixel units). In these cases, it is preferred that the peak absorption wavelengths of the different types of light-emitting nanocrystals contained in the pixel units of the light conversion layer be in the same wavelength band.

It may be that at least a subset of the pixel units of the light conversion layer includes the cured form of a composition that contains a pigment rather than light-emitting nanocrystals.

The color filter may have, on the pattern of the light shield, an ink-repellent layer narrower than the light shield and made of a material that repels inks. Instead of an ink-repellent layer, a layer that contains a photocatalyst may be formed as a layer to provide varying wettability. The photocatalyst-containing layer is formed as a continuous coating over a region including the planned regions for pixel units and then is irradiated with light through a photomask to increase compatibility with inks selectively in the planned regions for pixel units. The photocatalyst can be, for example, titanium oxide.

The color filter may have an ink-receiving layer, for example containing hydroxypropyl cellulose, between the substrate and the pixel units.

The color filter may have a protective layer on the pixel units. The protective layer is intended to planarize the color filter and to prevent the substances contained in the pixel units or the substances contained in the pixel units and those in a photocatalyst-containing layer from dissolving in the liquid crystal layer. The protective layer can be made of any known material that is used as a protective layer for a color filter.

In the production of the color filter and that of the light conversion layer, moreover, the pixel units may be formed by photolithography instead of inkjetting. In this case, the ink compositions are applied in layers to the substrate, forming ink composition layers. Then the ink composition layers are patterned by exposure to light and then developed using a developer. This gives pixel units formed by cured ink compositions. Since the developer is usually alkaline, the binder polymer in this case is a polymer soluble in alkalis. In light of efficiency in the use of materials, however, inkjetting is better than photolithography; photolithography involves a waste of materials because it requires removing almost ⅔ or more of materials as part of its principle. In this embodiment, therefore, it is preferred to form the pixel units by inkjetting using inkjet inks.

The pixel units of a light conversion layer according to this embodiment may further contain, besides light-emitting nanocrystals, a pigment substantially of the same color as the light emitted by the light-emitting nanocrystals. For example, if the pixel units of a liquid crystal display element are ones that contain light-emitting nanocrystals that absorb blue light and emit light, the light from the light source is blue light or quasi-white light that has a peak at 450 nm. If the concentration of the light-emitting nanocrystals in the pixel units is not sufficiently high when the liquid crystal display element is driven, however, the light from the light source passes through the light conversion layer, and the transmitted light from the light source (blue, leaking light) and the light emitted by the light-emitting nanocrystals blend together. To prevent the loss of color reproduction caused by such a color crosstalk, the pixel units of the light conversion layer may contain a pigment. In order that the pixel units contain a pigment, the ink compositions may contain a pigment.

It may be that one or two types of the red pixel units (R), green pixel units (G), and blue pixel units (B) of the light conversion layer according to this embodiment contain a colorant instead of light-emitting nanocrystals. The colorant(s) used in the red pixel units (R) can be, for example, a diketopyrrolopyrrole pigment and/or an anionic organic red dye. The colorant(s) used in the green pixel units (G) can be, for example, at least one selected from the group consisting of halogenated copper phthalocyanine pigments, phthalocyanine green dyes, and mixtures of a phthalocyanine blue dye and an organic azo yellow dye. The colorant(s) used in the blue pixel units (B) can be, for example, an ε-copper phthalocyanine pigment and/or a cationic organic blue dye. The amount of such colorant(s), if contained in the light conversion layer, is preferably between 1% and 5% by mass of the total mass of the pixel units (cured ink composition) so that the transmittance will not be reduced.

The following describes a preferred liquid crystal display element according to the present invention in detail.

Figure 4:
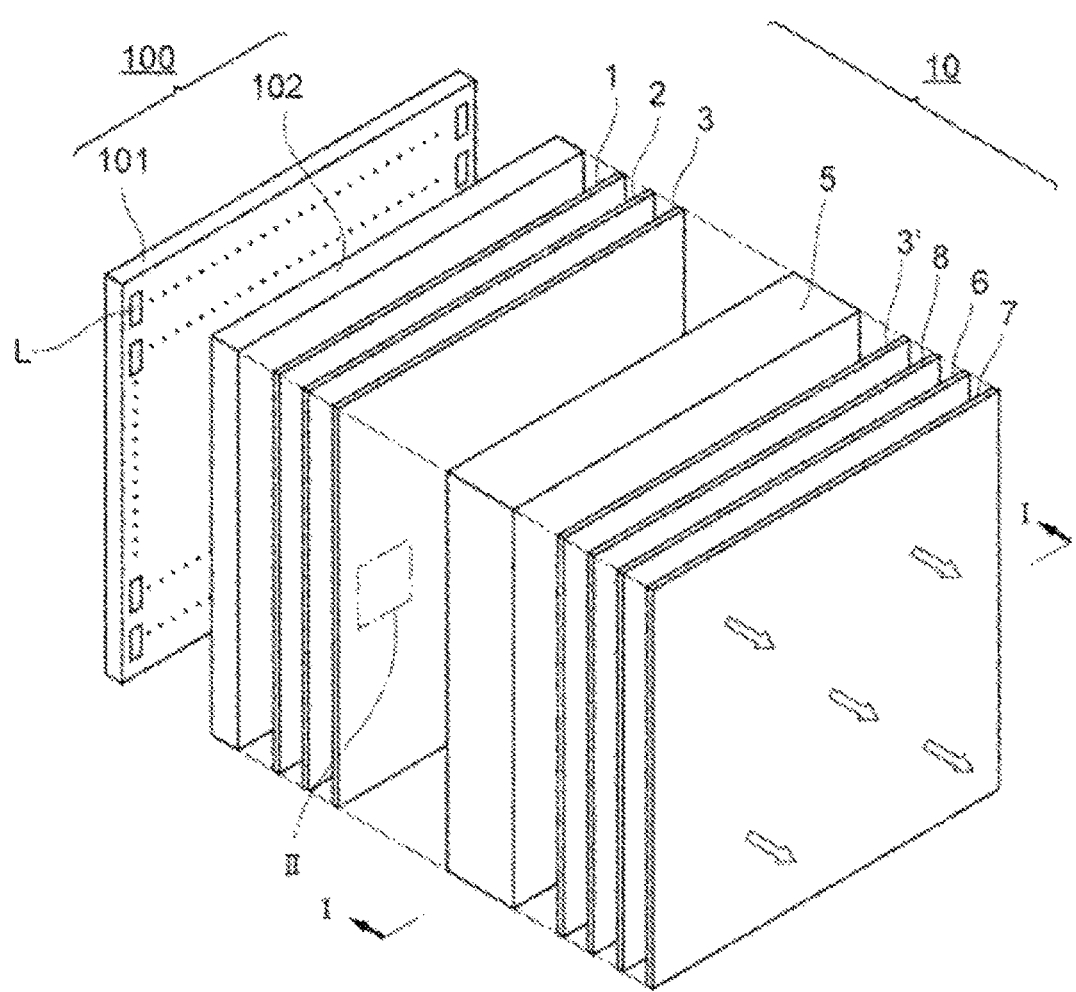
FIG. 4 is a perspective view of another embodiment of a liquid crystal display element according to the present invention.

FIG. 4 is a perspective diagram illustrating the entire structure of an example of a liquid crystal display element used in this embodiment. For the sake of convenience in explanation, the components are illustrated spaced apart.

The liquid crystal display element 1000 according to the present invention includes a backlight unit 100 and a liquid crystal panel 10. The perspective diagram illustrates the entire structure of an example of a liquid crystal display element that has the so-called direct backlighting structure, in which the backlight unit 100 has a planar array of multiple light emitters L facing a flat-plate light guide section 102. For the sake of convenience in explanation, the components are illustrated spaced apart. In another configuration, the backlight 100 may have a light source section 101 on one side of a light guide section 102, the light source section 101 including multiple light emitters L.

The liquid crystal panel 10 in FIG. 4 includes a first substrate 2 with a first electrode layer 3 (e.g., pixel electrode) on one side and a first polarizing layer 1 on the other, a second substrate 7 with a second electrode layer 3' (e.g., common electrode), and a liquid crystal layer 5 sandwiched between the first and second substrates 2 and 7. Between the second substrate 7 and the second electrode layer 3' is a light conversion layer 6. On the surface of the light conversion layer 6 closer to the second electrode layer 3' is a second polarizing layer 8.

In the embodiment in FIG. 4, therefore, the liquid crystal display element 10 has a structure in which a backlight unit 100, a first plate polarizer 1, a first substrate 2, an electrode layer 3 including thin-film transistors (also referred to as a thin-film-transistor layer or pixel electrode), a layer 5 containing a liquid crystal composition, a second electrode layer 3', a second plate polarizer 8, a light conversion layer 6, and a second substrate 7 are stacked one after another.

The liquid crystal panel 10 in FIG. 4 has a polarizing layer 1 on one side of a first (transparent and insulating) substrate 2 and an electrode layer 3 on the other. A second (transparent insulating) substrate 7 faces the first substrate 2 with a liquid crystal layer 5 therebetween. On the substrate 7 are a light conversion layer 6 according to the present invention and a polarizing layer 8 in this order.

Figure 8:
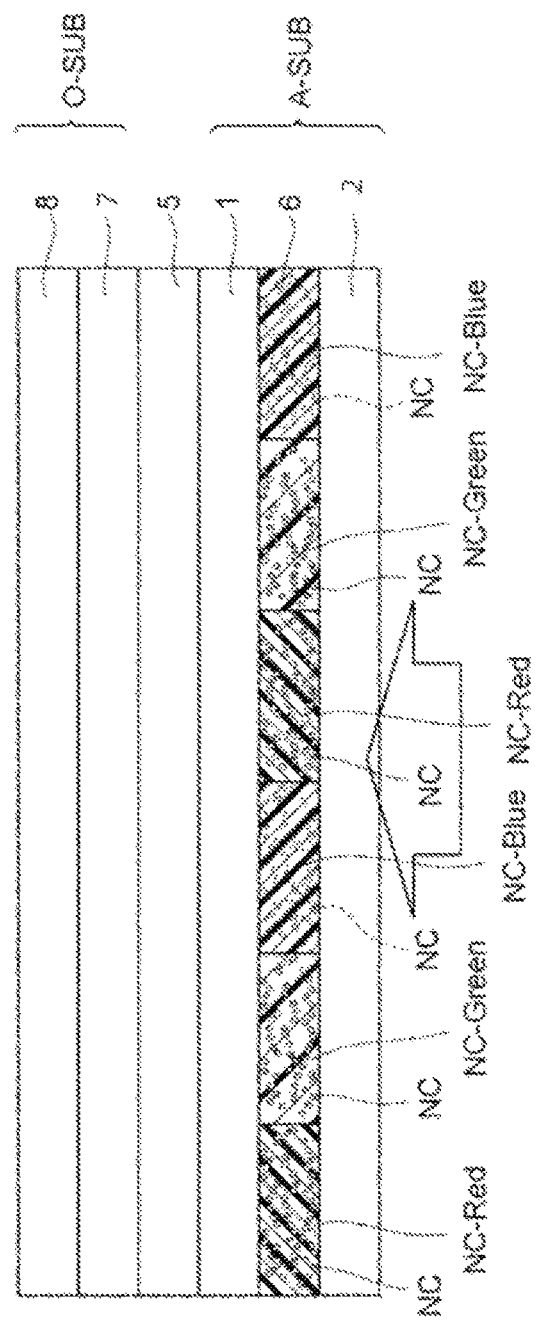
FIG. 8 is a schematic cross-sectional view of a liquid crystal display element along line I-I in FIG. 4, schematically illustrating an example of a light conversion layer of a liquid crystal display element according to the present invention.
Figure 9:
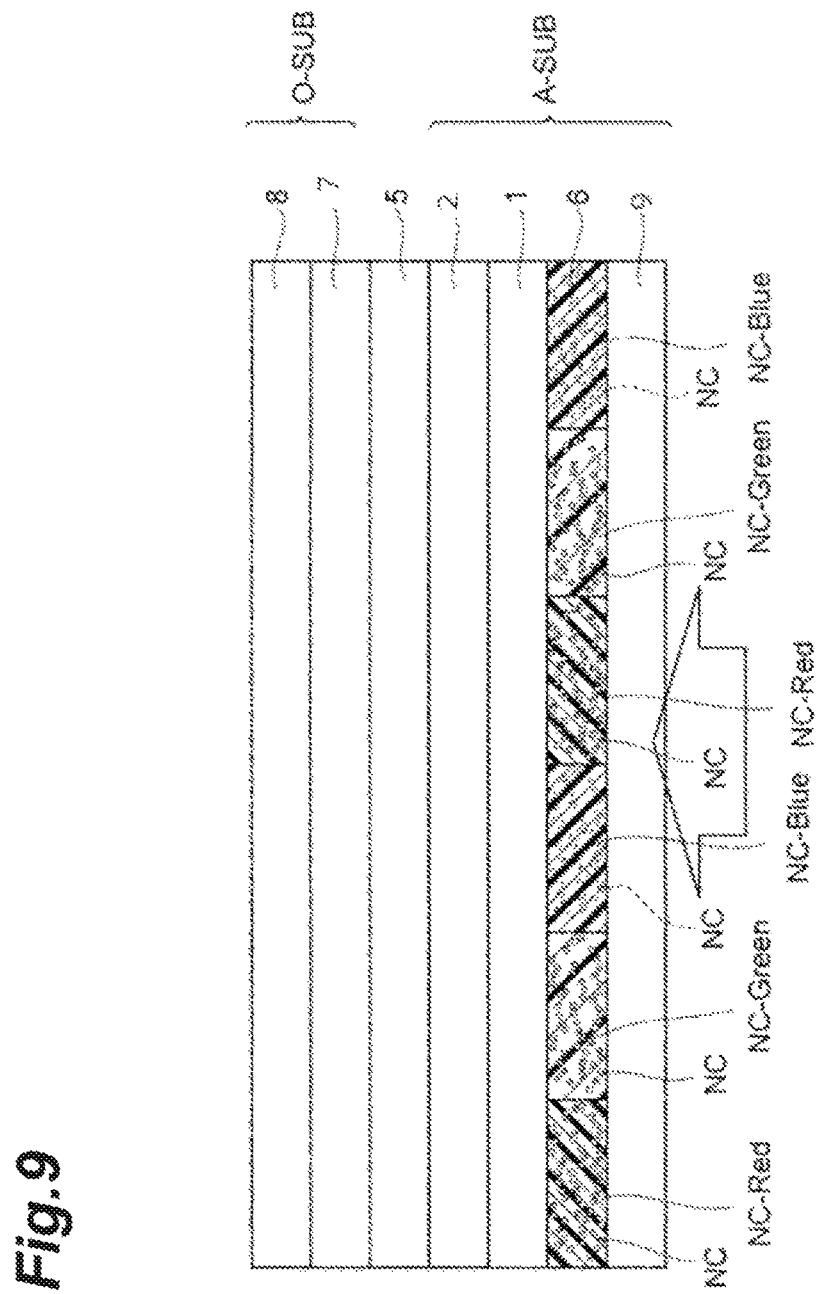
FIG. 9 is a schematic cross-sectional view of a liquid crystal display element along line I-I in FIG. 4, schematically illustrating an example of a light conversion layer of a liquid crystal display element according to the present invention.

In FIG. 4, the light conversion layer 6 according to the present invention is between the second substrate 7 and the liquid crystal layer 5. Another embodiment of a liquid crystal display element according to the present invention, however, may be a so-called color filter on array (COA) as illustrated in FIGS. 8 and 9. In this case, the light conversion layer 6 may be between the electrode layer 3 and the liquid crystal layer 5, or the light conversion layer 6 may be between the electrode layer 3 and the first substrate 2. An overcoat layer (not illustrated) may optionally cover the light conversion layer 6 to prevent the substances in the light conversion layer from flowing into the liquid crystal layer.

In FIG. 4, light emitted by the light emitters L enters into the liquid crystal panel 10 through the light guide section 102 (via a light diffuser plate or a light diffuser plate). The light that has entered the liquid crystal panel 10 is first polarized in a particular direction by the first polarizing layer 1. Then the first and second electrode layers 3 and 3' operate to change the polarization of the light in the liquid crystal layer 5. The light then is blocked or polarized in a particular direction in the second polarizing layer 8, and the polarized light enters into the light conversion layer 6. In the light conversion layer 6, the light that has entered there is absorbed by light-emitting nanocrystals. The absorbed light is converted into any of the emission spectra of red (R), green (G), and blue (B), producing any of the colors of red (R), green (G), and blue (B).

The following describes the cross-sectional structure of the liquid crystal panel component of a preferred liquid crystal display element according to the present invention, in particular configurations in which the polarizing layers, light conversion layer, liquid crystal layer, etc., are stacked.

FIGS. 5 to 9 are schematic cross-sectional views of the liquid crystal panel 10 component of liquid crystal display elements, intended to illustrate structures of a liquid crystal panel used in this embodiment.

In FIGS. 5 to 9, the substrate closer to the backlight unit (light source) than the liquid crystal layer 5 is and the stack on this substrate are collectively referred to as the array substrate (A-SUB), and the substrate facing the array substrate with the liquid crystal layer 5 therebetween and the stack on this substrate as the opposite substrate (O-SUB). The structure and preferred configurations of the array substrate (A-SUB) and opposite substrate (O-SUB) are described in detail hereinafter, where electrode structures are described with reference to FIGS. 10 to 12.

Figure 5:
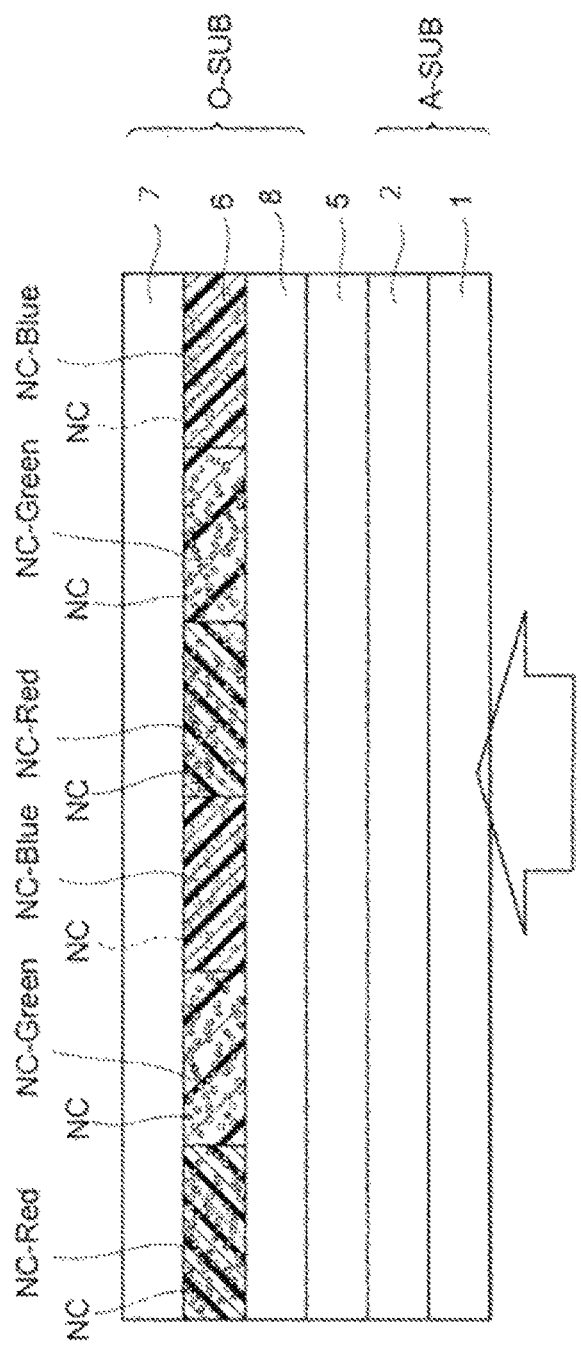
FIG. 5 is a schematic cross-sectional view of a liquid crystal display element along line I-I in FIG. 4, schematically illustrating an example of a light conversion layer of a liquid crystal display element according to the present invention.

The configuration in FIG. 5 is a form that includes a so-called in-cell polarizing layer. A light conversion layer 6 having the cross-sectional structure illustrated in FIG. 1 is in the opposite substrate (O-SUB), and the light conversion layer 6 and the second polarizing layer 8 are disposed between the pair of substrates (first and second substrates 2 and 7).

If the embodiment in FIG. 5 is applied to a VA liquid crystal display element, it is preferred that the electrode layer 3' (common electrode) be between the liquid crystal 5 and the second polarizing layer 8 or between the second polarizing layer 8 and the light conversion layer 6 in the opposite substrate O-SUB with the electrode layer 3 (pixel electrode) on the first substrate 2. Preferably, at least one of the opposite substrate (O-SUB) and the array substrate (A-SUB) has an alignment layer 4 on its surface touching the liquid crystal layer. If the liquid crystal display element is an FFS or IPS one in FIG. 5, it is preferred that the pixel and common electrodes be on the first sub 2.

Figure 6:
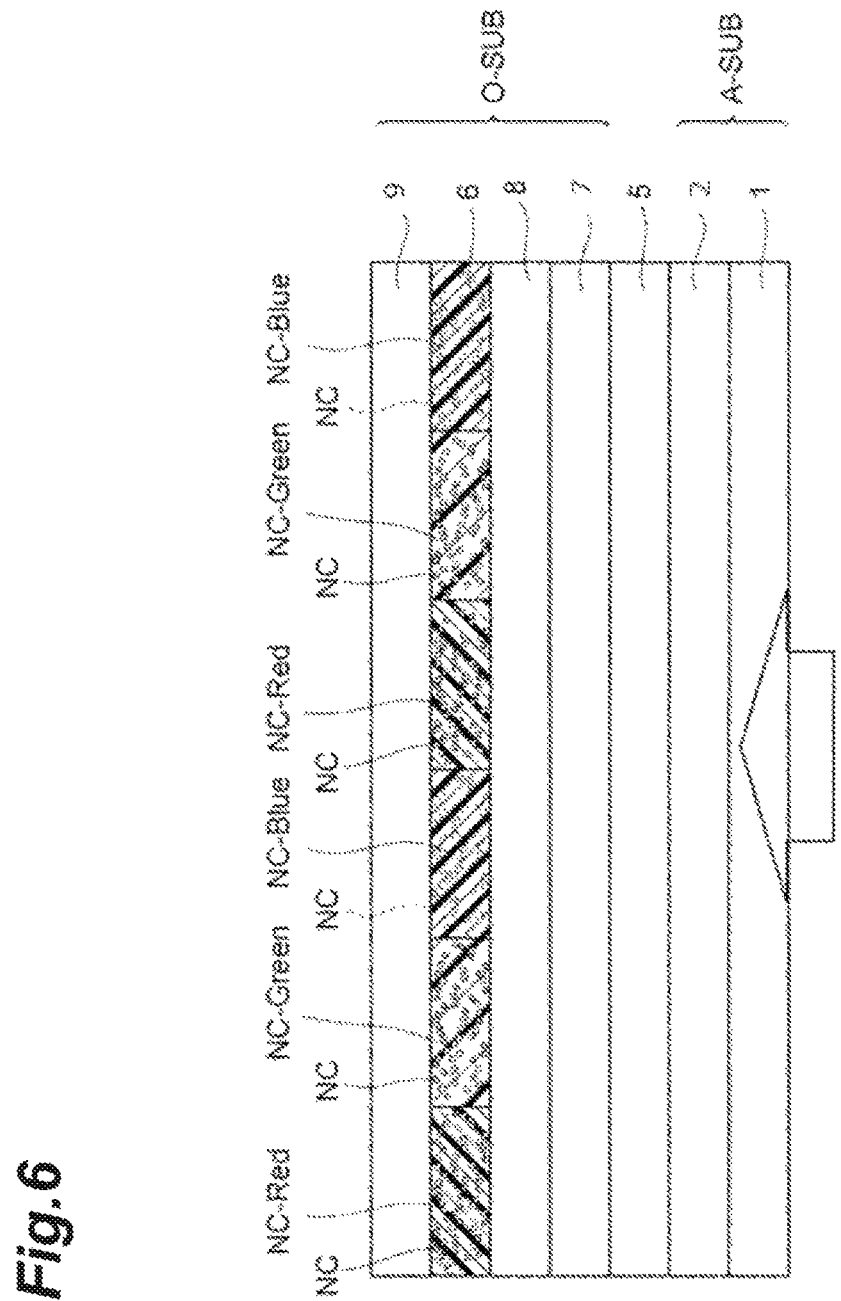
FIG. 6 is a schematic cross-sectional view of a liquid crystal display element along line I-I in FIG. 4, schematically illustrating an example of a light conversion layer of a liquid crystal display element according to the present invention.

Next, the configuration in FIG. 6 has its light conversion layer 6 in the opposite substrate (O-SUB), and the light conversion layer 6, having the cross-sectional structure illustrated in FIG. 1, is outside the pair of substrates (first and second substrates 2 and 7). The second polarizing layer 8 and the light conversion layer 6 are therefore supported by a supporting substrate 9. The supporting substrate 9 is preferably a transparent substrate.

If the embodiment in FIG. 6 is applied to a VA liquid crystal display element, it is preferred that the electrode layer 3' (common electrode) be between the liquid crystal 5 and the second polarizing layer 8 in the opposite substrate O-SUB with the electrode layer 3 (pixel electrode) on the first substrate 2. Preferably, at least one of the opposite substrate (O-SUB) and the array substrate (A-SUB) has an alignment layer 4 on its surface touching the liquid crystal layer. If the liquid crystal display element is an FFS or IPS one in FIG. 6, it is preferred that the pixel and common electrodes be on the first substrate 2.

Figure 7:
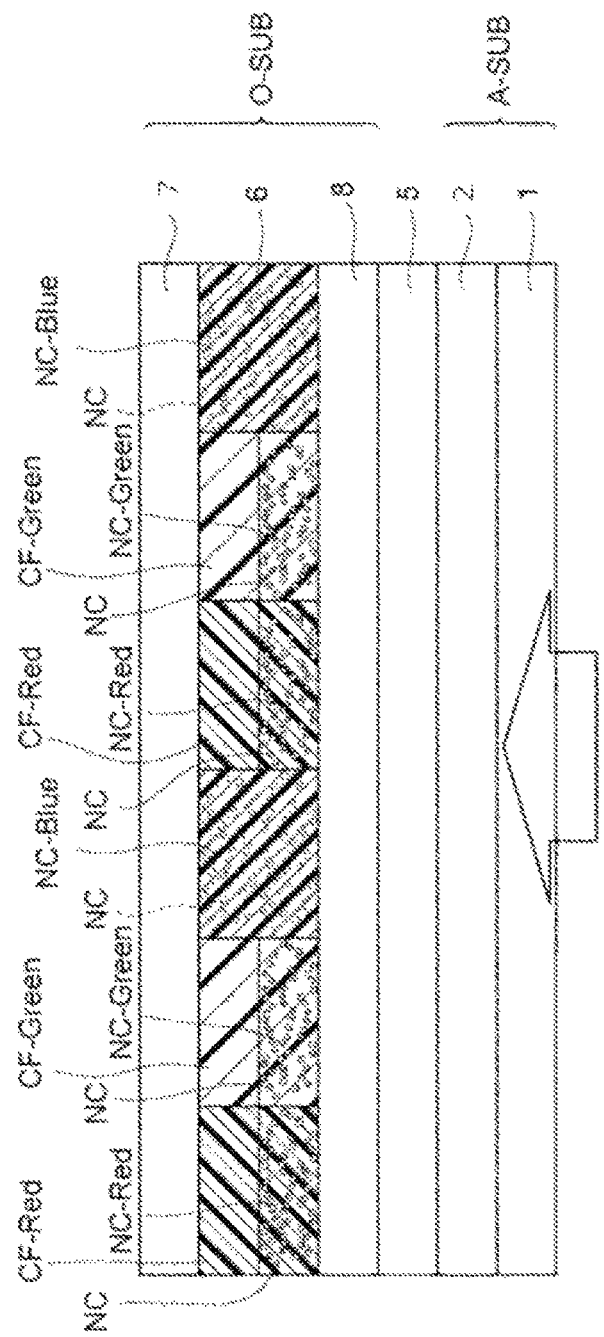
FIG. 7 is a schematic cross-sectional view of a liquid crystal display element along line I-I in FIG. 4, schematically illustrating an example of a light conversion layer of a liquid crystal display element according to the present invention.

Next, the configuration in FIG. 7 is a form that includes an in-cell plate polarizer. The light conversion layer 6 is in the opposite substrate O-SUB, and the light conversion layer 6 and the second polarizing layer 8 are between the pair of substrates (first and second substrates 2 and 7). The light conversion layer 6 has portions of color layers in red and green. Of these, the portions of color layers in red have a two-layer structure in which a light-converting pixel layer that contains red light-emitting nanocrystals (NC-Red) is stacked with a colorant layer that contains a red colorant (so-called red color filter) (CF-Red), and those in green have a two-layer structure in which a light-converting pixel layer that contains green light-emitting nanocrystals (NC-Green), which emit green light, is stacked with a colorant layer that contains a green colorant (so-called green color filter) (CF-Green).

If the light emitters are, for example, blue LEDs, there may be a colorant layer that contains a blue colorant (so-called blue color filter) formed between the light conversion layer 6 and the second polarizing layer 8 in FIG. 7 throughout as illustrated in FIG. 1.

If the embodiment in FIG. 7 is applied to a VA liquid crystal display element, it is preferred that the electrode layer 3' (common electrode) be between the liquid crystal 5 and the second polarizing layer 8 in the opposite substrate O-SUB with the electrode layer 3 (pixel electrode) on the first substrate 2. If the liquid crystal display element is an FFS or IPS one in FIG. 7, it is preferred that the pixel and common electrodes be on the first substrate 2. For a VA, FFS, or IPS liquid crystal display element, it is preferred that at least one of the opposite substrate (O-SUB) and the array substrate (A-SUB) has an alignment layer 4 on its surface touching the liquid crystal layer.

In the embodiments in FIGS. 5 to 7 detailed above, light is produced using a source of a high-energy light beam, such as short-wave visible light or ultraviolet light. The light goes through a liquid crystal layer and polarizing layers, which serve as optical switches, and then is absorbed by light-emitting nanocrystals contained in a light conversion layer.

The absorbed light is converted into light with particular wavelengths by the light-emitting nanocrystals, producing colors.

The embodiment in FIG. 8 is a color-filter-on-array liquid crystal panel. A light conversion layer 6 as illustrated in FIG. 1 is in the array substrate (A-SUB), and the second polarizing layer 8 is farther outside than the second substrate 7, and the first polarizing layer 1 is between the pair of substrates (first and second substrates 2 and 7) as an in-cell plate polarizer.

If the embodiment in FIG. 8 is applied to a VA liquid crystal display element, it is preferred that the electrode layer 3' (common electrode) be between the liquid crystal 5 and the second substrate 7 in the opposite substrate O-SUB with the electrode layer 3 (pixel electrode) on the first substrate 2.

Preferably, at least one of the opposite substrate (O-SUB) and the array substrate (A-SUB) has an alignment layer 4 on its surface touching the liquid crystal layer.

If the liquid crystal display element is an FFS or IPS one in FIG. 8, it is preferred that the pixel and common electrodes be on the first substrate 2, such as between the first substrate 2 and the light conversion layer 6, between the first polarizing layer 1 and the light conversion layer 6, or between the first polarizing layer 1 and the liquid crystal layer 5. Forming a blue color filter between the light conversion layer 6 and the first substrate 2 throughout is preferred because it blocks any unwanted light and limits the associated loss of image quality. If the incident light is blue light, the color layers that produce blue does not need to contain blue light-emitting nanocrystals but can be, for example, transparent resin layers or color layers that contain a blue colorant (so-called blue color filters).

The embodiment in FIG. 9 has a light conversion layer 6 as illustrated in FIG. 1 in the array substrate (A-SUB), closer to the backlight unit (light source), and the first and second polarizing layers 1 and 8 are outside the pair of substrates (first and second substrates 2 and 7). The first polarizing layer 1 and the light conversion layer 6 are therefore supported by a supporting substrate 9 placed closer to the light source section (backlight unit) than the first substrate 2 is. As in the above configurations, a blue color filter may be formed between the light conversion layer 6 and the supporting substrate 9 throughout.

Of these configurations in FIGS. 5 to 9, those illustrated in FIGS. 5 to 7, in which the light conversion layer 6 is in the opposite substrate O-SUB, opposite the substrate A-SUB closer to the backlight unit (light source), are particularly preferred. In these configurations, the advantage of the present invention of reduced or eliminated damage to the liquid crystal layer from exposure to a high-energy light beam becomes significant.

The color filters used in the above configurations may optionally contain, for example, the aforementioned transparent resin and the undermentioned photocurable compound and dispersant. As for production, the color filters can be formed by, for example, a known inkjet or photolithography process.

Figure 10:
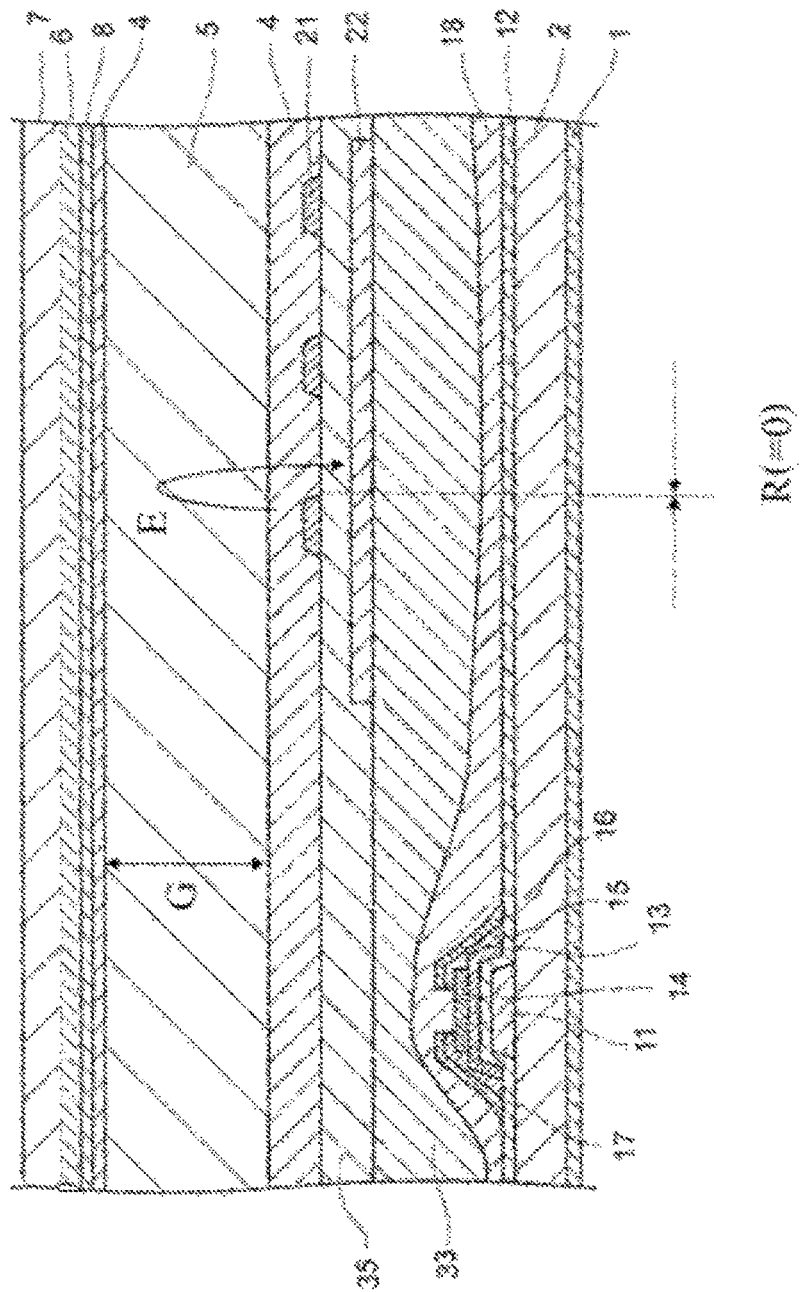
FIG. 10 is a cross-sectional view of an FFS liquid crystal panel.

The following describes an example of an FFS liquid crystal panel in a liquid crystal display element according to the present invention using FIG. 10.

FIG. 10 is an example of a cross-sectional view of a liquid crystal display element. On part of the surface of a first substrate 2, a gate insulating film 12, a thin-film transistor (11, 13, 15, 16, and 17), a passivation film 18, a planarizing film 33, a common electrode 22, an insulating film 35, a pixel electrode 21, and an alignment layer 4 are stacked in this order. Although the passivation film 18 and planar film 33 in FIG. 10 are two separate layers, the functions of the passivation film 18 and planar film 33 may be integrated into one planarizing film. Although the display element in FIG. 10 has an alignment layer 4, the alignment layer 4 is optional.

In the embodiment of an FFS liquid crystal display element as illustrated in FIG. 10, the common electrode 22 is a flat-plate electrode formed substantially over the entire surface of the gate insulating layer 12, whereas the pixel electrode 21 is a comb-shaped electrode formed on the insulating protective layer 18 covering the common electrode 22. That is, the common electrode 22 is closer to the first substrate 2 than the pixel electrode 21 is, and these two electrodes overlap each other with the insulating protective layer 18 therebetween. The pixel and common electrodes 21 and 22 are formed of a transparent electrically conductive material, such as ITO (Indium Tin Oxide), IZO (Indium Zinc Oxide), or IZTO (Indium Zinc Tin Oxide). Since the pixel and common electrodes 21 and 22 are formed of a transparent electrically conductive material, the aperture area per unit pixel area is large. As a result, the aperture ratio and the transmittance are increased.

The pixel and common electrodes 21 and 22, moreover, create a fringe electric field therebetween. For this to be possible, these electrodes are formed so that the horizontal component R of the electrode-to-electrode path, between the pixel and common electrodes 21 and 22 (also referred to as the horizontal component of the shortest separation path), is smaller than the thickness G of the liquid crystal layer 5 between the first and second substrates 2 and 7. The horizontal component R of the electrode-to-electrode path represents the distance between the electrodes in the direction parallel to the substrates. In FIG. 10, in which a flat-plate common electrode 22 and a comb-shaped pixel electrode 21 overlap each other, the horizontal component of the shortest separation path (or electrode-to-electrode distance): R=0. The horizontal component R of the shortest separation path is therefore smaller than the thickness of the liquid crystal layer between the first and second substrates 2 and 7: G (also referred to as the cell gap), resulting in the formation of a fringe electric field E. An FFS liquid crystal display element can therefore use a horizontal electric field, created perpendicular to the lines that form the comb-like shape of the pixel electrode 21, and a parabolic electric field. The electrode width in the comb-shaped section of the pixel electrode 21: l and the width of the spaces in the comb-shaped section of the pixel electrode 21: m are preferably appropriate for all liquid crystal molecules in the liquid crystal layer 5 to be driven by the electric fields produced. The horizontal component R of the shortest separation path between the pixel and common electrodes can be adjusted by, for example, the (average) thickness of the insulating film 35.

Figure 11:
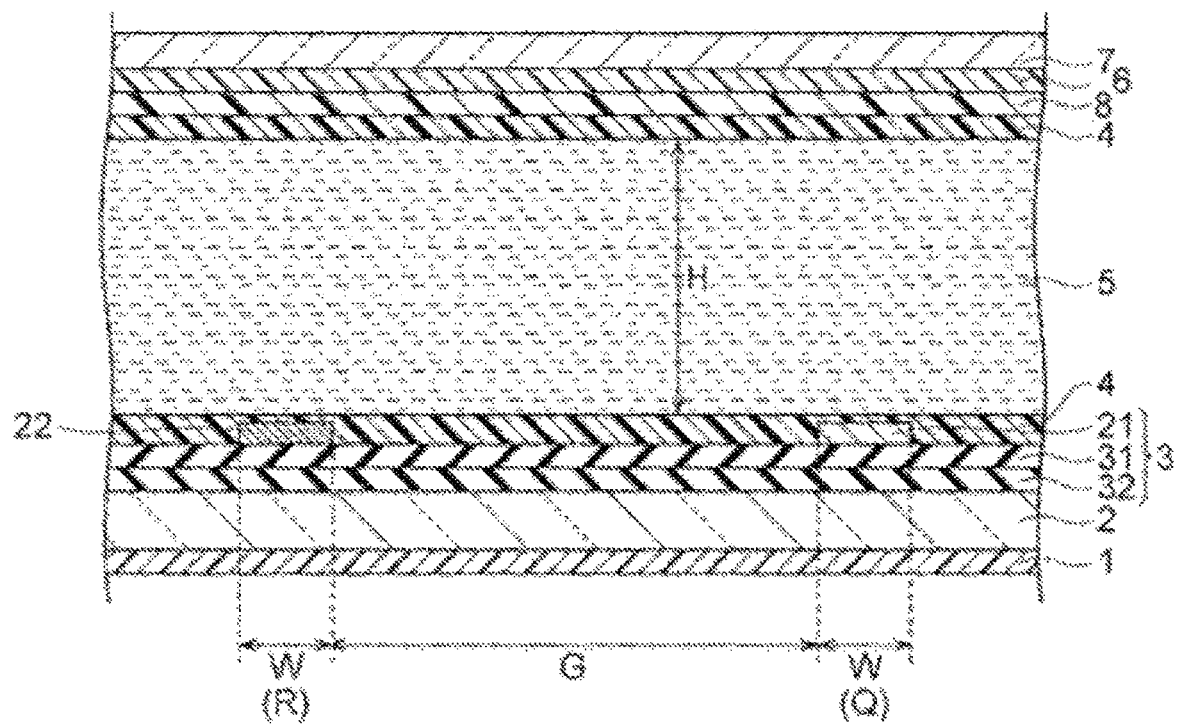
FIG. 11 is a cross-sectional view of an IPS liquid crystal panel.

The following describes an example of an IPS liquid crystal panel, as a variation of an FFS liquid crystal panel, in a liquid crystal display element according to the present invention using FIG. 11. In an IPS liquid crystal display element, the liquid crystal panel 10 has a structure in which there is an electrode layer 3 (including a common electrode, a pixel electrode, and TFTs) on one of two substrates. A first polarizing layer 1, a first substrate 2, an electrode layer 3, an alignment layer 4, a liquid crystal layer 5 containing a liquid crystal composition, an alignment layer 4, a second polarizing layer 8, a light conversion layer 6, and a second substrate 7 are stacked one after another.

FIG. 11 is a cross-sectional view of an IPS liquid crystal panel. On the first substrate 2, a gate insulating layer 32 covers gate bus lines 26 (not illustrated) and also covers substantially the entire surface of the first substrate 2, and there is an insulating protective layer 31 formed on the surface of the gate insulating layer 32. On the insulating protective film 31 are a first electrode (pixel electrode) 21 and a second electrode (common electrode) 22, spaced apart. The insulating protective layer 31 has the insulating capability and is formed of, for example, silicon nitride, silicon dioxide, or silicon oxynitride film. The first and second substrates 2 and 7 are spaced apart with a predetermined space therebetween, with an alignment layer 4 and an electrode layer 3 including thin-film transistors on one side of the first substrate 2 and the first polarizing layer 1 on the other, with an alignment layer 4, the second polarizing layer 8, and the light conversion layer 6 on one side of the second substrate 2, and in such a manner that the alignment layers face each other. This space is filled with the liquid crystal layer 5 containing a liquid crystal composition.

The IPS liquid crystal display section illustrated in FIG. 11 has an electrode-to-electrode distance G, between the first and second electrodes 21 and 22, and a thickness of the liquid crystal layer between the first and second substrate 2 and 7 (cell gap): H that satisfy the relationship G≥H.

Figure 12:
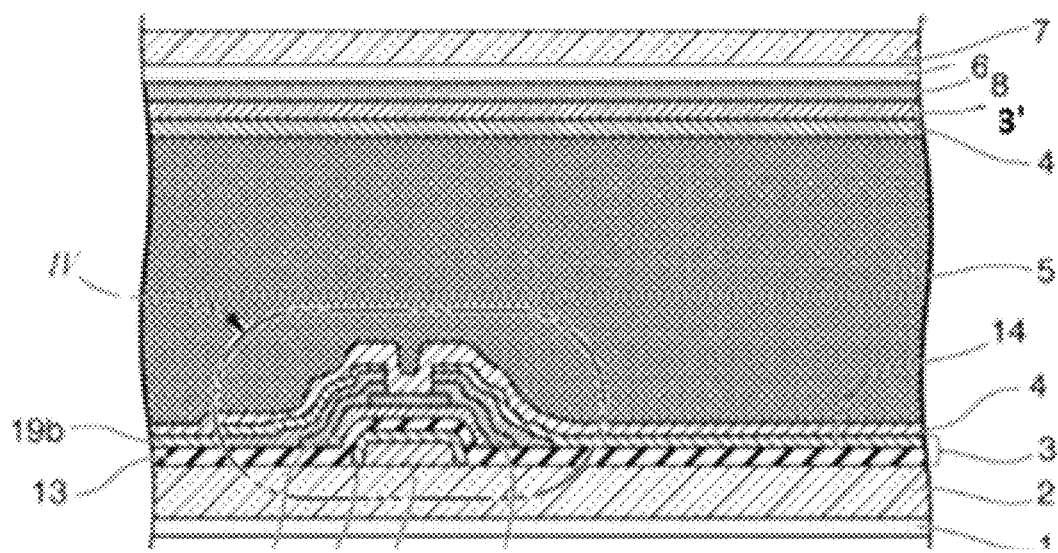
FIG. 12 is a cross-sectional view of a VA liquid crystal panel.

The following describes an example of a vertical-alignment liquid crystal panel (VA liquid crystal display) as another embodiment of a preferred liquid crystal panel according to the present invention using FIG. 12. FIG. 12 is a cross-sectional view of the liquid crystal panel illustrated in FIG. 4. In this case, the liquid crystal panel 10 of the liquid crystal display element according to the present invention has a structure in which a first polarizing layer 1, a first substrate 2, an electrode layer 3 including thin-film transistors (also referred to as a thin-film-transistor layer), an alignment layer 4, a liquid crystal layer 5 containing a liquid crystal composition, an alignment layer 4, a common electrode 3', a first polarizing layer 8, a light conversion layer 6, and a second substrate 7 are stacked one after another. A preferred configuration for the structure of the thin-film transistors in the liquid crystal display element according to the present invention (region IV in FIG. 12) is as described above and not discussed here.

Unlike that of the IPS and FFS display elements described above, the liquid crystal panel section of a vertical-alignment liquid crystal display element as illustrated in FIG. 12 has its common electrode 3' on the substrate opposite the TFTs, with the common electrode 3' facing and spaced apart from the pixel electrode 21. In other words, the pixel and common electrodes 21 and 22 are on different substrates. The FFS and IPS liquid crystal display elements described above, by contrast, have their pixel and common electrodes 21 and 22 on the same substrate.

The liquid crystal display element according to the present invention detailed above may have the technology of local dimming, which improves contrast by controlling the brightness of the backlight unit 100 in each of multiple areas fewer than the pixels of the liquid crystal.

In a possible method for local dimming, the multiple light emitters L are used as light sources for particular regions of the liquid crystal panel. The light emitters L can be controlled in accordance with the brightness of display regions. In this case, the multiple light emitters L may be arranged in an array or may be arranged in a row along an edge of the liquid crystal panel 10.

Another method for the local dimming can be used if the display element has a light guide section 102 in its backlight unit 100 and also has a liquid crystal panel 10. In such a case, there may be a control layer, as the light guide section 102, between the light guide plate (and/or a light diffuser plate) and the substrate of the liquid crystal panel closer to the light source. The control layer controls the amount of backlight in each of particular regions fewer than the pixels of the liquid crystal.

The control of the amount of backlight may alternatively be accomplished by using liquid crystal elements fewer than the pixels of the liquid crystal. The liquid crystal elements can be selected from various existing technologies, but an LCD layer that contains a liquid crystal with polymer networks formed therein is preferred in terms of transmittance. Such a layer containing a polymer-networked (nematic) liquid crystal (layer containing a polymer-networked (nematic) liquid crystal optionally sandwiched between a pair of transparent electrodes) scatters light while the voltage is off, and transmits light while the voltage is on. Local dimming can therefore be achieved by forming, between the light guide plate (and/or a light diffuser plate) and the substrate of the liquid crystal panel closer to the light source, an LCD layer that contains a polymer-networked liquid crystal partitioned to divide the entire display screen into multiple areas.

A liquid crystal display element according to the present invention, moreover, preferably has a retardation (Re) (25° C.), defined by equation (1) below, of 220 to 300 nm if the light source section has its primary emission peak at 450 nm:

$$Re = \Delta n \times d$$

(In equation (1), Δn represents refractive index anisotropy, and d represents the cell thickness (μm) of the liquid crystal layer of the liquid crystal display element.).

An ordinary liquid crystal display element switches the permeation of the usual type of white light, which includes the wavelengths in the entire visible spectrum. A liquid crystal display element according to the present invention, on the other hand, switches the permeation of blue visible light (light in the so-called short-wavelength region), approximately 500 nm or shorter, or ultraviolet radiation, a type of radiation that excites the quantum dots. Differing in the type of transmitted light and the optical character of the transmitted light, these types of elements are also different in, for example, the characteristics required. In the related art, the liquid crystal material has not been optimized in its optical characteristics considering the difference between the light sources used in liquid crystal display elements that contain quantum dots or other light-emitting nanocrystals as a light emitter and those used in ordinary liquid crystal display elements, which contain no quantum dots or other light-emitting nanocrystals, and this has led to the problem of the optical characteristics of a display element that uses quantum dots or other light-emitting nanocrystals not being fully exploited. The above retardation condition, however, improves the transmittance of the liquid crystal display element. Another problem to be solved by the present invention is therefore to reduce or prevent a loss of the transmittance of a liquid crystal display element.

The following describes the light source section, polarizing layers, liquid crystal layer, and alignment layer(s), which are major components of a liquid crystal display element according to the present invention.

(Light Source Section)

A light source section according to the present invention has a light emitter that emits ultraviolet or visible light. Their wavelength range is not critical, but the light emitter preferably has its primary emission peak in the blue spectrum. For example, a light-emitting diode having its primary emission peak in the wavelength range of 420 nm or more and 480 nm or less (blue light-emitting diode) is suitable for use.

The wavelength range of the light emitter (or light-emitting diode) according to the present invention is not critical, but the light emitter (or light-emitting diode) preferably has its primary emission peak in the blue spectrum. For example, a light-emitting diode having its primary emission peak in the wavelength range of 430 nm or more and 500 nm or less (420 nm or more and 480 nm or less) is suitable for use. The light-emitting diode having its primary emission peak in the blue spectrum can be a known one. An example of a light-emitting diode that has its primary emission peak in the blue spectrum is one that includes at least an AlN seed layer formed on a sapphire substrate, an underlayer formed on the seed layer, and a GaN-based multilayer semiconductor layer. The multilayer semiconductor layer can be, for example, a stack of an underlayer, an n-type semiconductor layer, a light-emitting layer, and a p-type semiconductor layer, from the closest to the farthest from the substrate.

Examples of light sources that emit ultraviolet radiation include a low-pressure mercury lamp, a medium-pressure mercury lamp, a high-pressure mercury lamp, an ultrahigh-pressure mercury lamp, a carbon arc lamp, an electrodeless lamp, a metal halide lamp, a xenon arc lamp, and LEDs. For use as the light emitters L according to the present invention, however, LEDs that produce ultraviolet light is preferred if excluding the aforementioned LED that has its primary emission peak in the wavelength range of 420 nm or more and 480 nm or less.

It should be noted that light that has its central emission wavelength in the wavelength band between 420 and 480 nm is herein referred to as blue light, light that has its central emission wavelength in the wavelength band between 500 and 560 nm as green light, and light that has its central emission wavelength in the wavelength band between 605 and 665 nm as red light. Ultraviolet light as mentioned herein refers to light that has its central emission wavelength in the wavelength band of 300 nm or more and less than 420 nm. "A half width" herein refers to the width of a peak at the ½ height of the peak.

(Polarizing Layers)

A polarizing layer according to the present invention can be of any type and can be a known plate polarizer (polarizing layer). Examples include a dichroic organic dye polarizer, a polarizing coating, a wire-grid polarizer, and a cholesteric liquid crystal polarizer. For example, the wire-grid polarizer is formed on the first substrate, second substrate, and color filter, preferably by any one of nanoimprinting, block copolymerization, e-beam lithography, and glancing angle deposition. A polarizing coating may be formed with the alignment layer described hereinafter as an extra component. If a polarizing layer according to the present invention is a polarizing coating, therefore, it is preferred that the display element have the polarizing coating and an alignment layer.

The following describes the liquid crystal layer, alignment layer(s), and other components of the liquid crystal panel section of a liquid crystal display element according to the present invention.

A liquid crystal layer according to the present invention has, as mentioned above, a liquid crystal composition that contains at least one compound represented by general formula (i):

[Chem. 3]

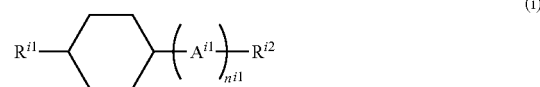

(i)

(where $R^{i1}$ and $R^{i2}$ each independently represent a C1-8 alkyl, C2-8 alkenyl, C1-8 alkoxy, or C2-8 alkenyloxy group, $A^{i1}$ represents a 1,4-phenylene or trans-1,4-cyclohexylene group, and $n^{i1}$ represents 0 or 1.)

By helping form a liquid crystal layer that contains compound(s) highly reliable in terms of lightfastness, the compound helps reduce or prevent damage to the liquid crystal layer from light from the light source, in particular blue light (from blue LEDs). The compound, moreover, adjusts the retardation of the liquid crystal layer, thereby reduce or prevent a loss of the transmittance of the liquid crystal display element In the liquid crystal layer according to the present invention, the lower limit of preferred percentages of the compound represented by general formula (i) is 1% by mass, 2% by mass, 3% by mass, 5% by mass, 7% by mass, 10% by mass, 15% by mass, 20% by mass, 25% by mass, 30% by mass, 35% by mass, 40% by mass, 45% by mass, 50% by mass, or 55% by mass of the total amount of the composition according to the present invention. The upper limit of preferred percentages is 95% by mass, 90% by mass, 85% by mass, 80% by mass, 75% by mass, 70% by mass, 65% by mass, 60% by mass, 55% by mass, 50% by mass, 45% by mass, 40% by mass, 35% by mass, 30% by mass, or 25% by mass of the total amount of the composition according to the present invention.

In the liquid crystal layer according to the present invention, it is particularly preferred that the amount of the compound represented by general formula (i) be between 10% and 50% by mass.

The compound represented by general formula (i) is preferably compound(s) selected from the group of compounds represented by general formulae (i-1) and (i-2).

The compounds represented by general formula (i-1) are the following compounds.

[Chem. 4]

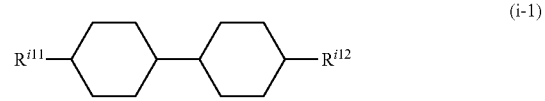

(i-1)

(In the formula, $R^{i11}$ and $R^{i12}$ each independently represent the same meaning as $R^{i1}$ and $R^{i2}$ in general formula (i).)

$R^{i11}$ and $R^{i12}$ are preferably linear C1-5 alkyl, linear C1-4 alkoxy, or linear C2-5 alkenyl groups.

Those compounds represented by general formula (i-1) can be used alone but can also be used in a combination of two or more. Any two or more of the compounds can be combined, but compounds needed for the performance attributes required, such as solubility at low temperatures, transition temperature, electrical reliability, and birefringence, are used in combination. The number of kinds of compounds used is one, two, three, four, or five or more as an embodiment of the present invention by way of example.

The lower limit of preferred percentages is 1% by mass, 2% by mass, 3% by mass, 5% by mass, 7% by mass, 10% by mass, 12% by mass, 15% by mass, 17% by mass, 20% by mass, 22% by mass, 25% by mass, 27% by mass, 30% by mass, 35% by mass, 40% by mass, 45% by mass, 50% by mass, or 55% by mass of the total amount of the composition according to the present invention. The upper limit of preferred percentages is 95% by mass, 90% by mass, 85% by mass, 80% by mass, 75% by mass, 70% by mass, 65% by mass, 60% by mass, 55% by mass, 50% by mass, 48% by mass, 45% by mass, 43% by mass, 40% by mass, 38% by mass, 35% by mass, 33% by mass, 30% by mass, 28% by mass, 25% by mass, 23% by mass, or 20% by mass of the total amount of the composition according to the present invention.

If the manufacturer needs to keep low the viscosity of the composition according to the present invention and thereby make the composition quick in response, it is preferred that the above lower limit be high with the upper limit high. If the manufacturer needs to keep high the $T_{NI}$ of the composition according to the present invention and thereby make the composition good in temperature stability, it is preferred that the above lower limit be moderate with the upper limit moderate. If the manufacturer wants a large dielectric constant anisotropy to keep the drive voltage low, it is preferred that the above lower limit be low with the upper limit low.

The compound(s) represented by general formula (i-1) is preferably compound(s) selected from the group of compounds represented by general formula (i-1-1).

[Chem. 5]

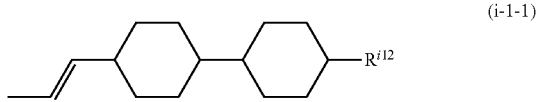
(i-1-1)

(In the formula, $R^{i12}$ represents the same meaning as in general formula (i-1).)

The compound(s) represented by general formula (i-1-1) is preferably compound(s) selected from the group of compounds represented by formulae (i-1-1.1) to (i-1-1.3), preferably the compound represented by formula (i-1-1.2) or (i-1-1.3), in particular the compound represented by formula (i-1-1.3).

[Chem. 6]

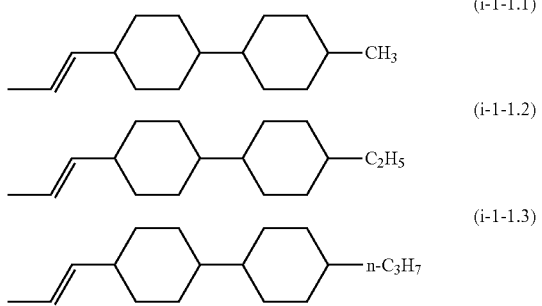

The lower limit of preferred percentages of the compound represented by formula (i-1-1.3) to the total amount of the composition according to the present invention is 1% by mass, 2% by mass, 3% by mass, 5% by mass, 7% by mass, or 10% by mass. The upper limit of preferred percentages is 20% by mass, 15% by mass, 13% by mass, 10% by mass, 8% by mass, 7% by mass, 6% by mass, 5% by mass, or 3% by mass of the total amount of the composition according to the present invention.

The compound(s) represented by general formula (i-1) is preferably compound(s) selected from the group of compounds represented by general formula (i-1-2). This ensures the liquid crystal layer exhibits excellent durability and a good voltage holding ratio even if irradiated with light with an ultraviolet wavelength between 200 and 400 nm as the backlight.

[Chem. 7]

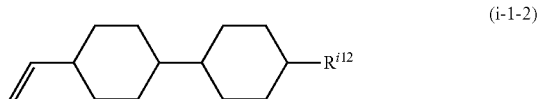
(i-1-2)

(In the formula, $R^{i12}$ represents the same meaning as in general formula (i-1).)

The lower limit of preferred percentages of the compound(s) represented by formula (i-1-2) to the total amount of the composition according to the present invention is 1% by mass, 5% by mass, 10% by mass, 15% by mass, 17% by mass, 20% by mass, 23% by mass, 25% by mass, 27% by mass, 30% by mass, or 35% by mass. The upper limit of preferred percentages is 60% by mass, 55% by mass, 50% by mass, 45% by mass, 42% by mass, 40% by mass, 38% by mass, 35% by mass, 33% by mass, or 30% by mass of the total amount of the composition according to the present invention.

The compound(s) represented by general formula (i-1-2), moreover, is preferably compound(s) selected from the group of compounds represented by formulae (i-1-2.1) to (i-1-2.4), preferably compound(s) represented by formulae (i-1-2.2) to (i-1-2.4). In particular, the compound represented by formula (i-1-2.2) is preferred because it improves the response rate of the composition according to the present invention markedly. If a high $T_{NI}$ is wanted more than the response rate, it is preferred to use the compound represented by formula (i-1-2.3) or (i-1-2.4). It is not preferred to set the percentage of the compounds represented by formulae (i-1-2.3) and (i-1-2.4) to 30% by mass or more for the solubility at low temperatures to be good.

[Chem. 8]

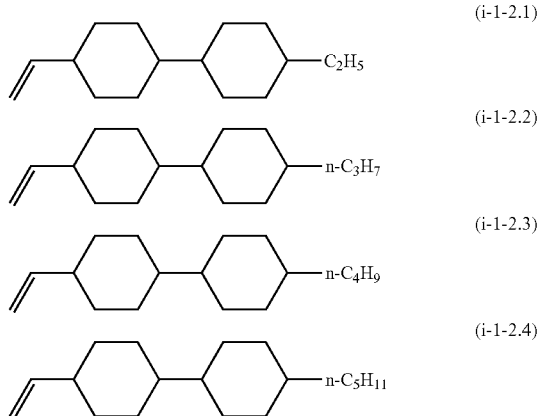

The lower limit of preferred percentages of the compound represented by formula (i-1-2.2) to the total amount of the composition according to the present invention is 10% by mass, 15% by mass, 18% by mass, 20% by mass, 23% by mass, 25% by mass, 27% by mass, 30% by mass, 33% by mass, 35% by mass, 38% by mass, or 40% by mass. The upper limit of preferred percentages is 60% by mass, 55% by mass, 50% by mass, 45% by mass, 43% by mass, 40% by mass, 38% by mass, 35% by mass, 32% by mass, 30% by mass, 20% by mass, 15% by mass, or 10% by mass of the total amount of the composition according to the present invention. Among these, it is particularly preferred that the upper limit for the percentage be 15% by mass, in particular 10% by mass for the prevention of damage to the liquid crystal layer from blue visible light.

The lower limit of preferred total percentages of the compounds represented by formulae (i-1-1.3) and (i-1-2.2) to the total amount of the compound according to the present invention is 10% by mass, 15% by mass, 20% by mass, 25% by mass, 27% by mass, 30% by mass, 35% by mass, or 40% by mass. The upper limit of preferred percentages is 60% by mass, 55% by mass, 50% by mass, 45% by mass, 43% by mass, 40% by mass, 38% by mass, 35% by mass, 32% by mass, 30% by mass, 27% by mass, 25% by mass, or 22% by mass of the total amount of the composition according to the present invention.

The compound(s) represented by general formula (i-1) is preferably compound(s) selected from the group of compounds represented by general formula (i-1-3).

[Chem. 9]

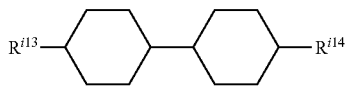

(i-1-3)

(In the formula, $R^{i13}$ and $R^{i14}$ each independently represent a C1-8 alkyl or C1-8 alkoxy group.)

$R^{i13}$ and $R^{i14}$ are preferably linear C1-5 alkyl, linear C1-4 alkoxy, or linear C2-5 alkenyl groups.

The lower limit of preferred percentages of the compound(s) represented by formula (i-1-3) to the total amount of the composition according to the present invention is 1% by mass, 5% by mass, 10% by mass, 13% by mass, 15% by mass, 17% by mass, 20% by mass, 23% by mass, 25% by mass, or 30% by mass. The upper limit of preferred percentages is 60% by mass, 55% by mass, 50% by mass, 45% by mass, 40% by mass, 37% by mass, 35% by mass, 33% by mass, 30% by mass, 27% by mass, 25% by mass, 23% by mass, 20% by mass, 17% by mass, 15% by mass, 13% by mass, or 10% by mass of the total amount of the composition according to the present invention.

The compound(s) represented by general formula (i-1-3), moreover, is preferably compound(s) selected from the group of compounds represented by formulae (i-1-3.1) to (i-1-3.12), preferably the compound represented by formula (i-1-3.1), (i-1-3.3), or (i-1-3.4). In particular, the compound represented by formula (i-1-3.1) is preferred because it improves the response rate of the composition according to the present invention markedly. If a high $T_{NI}$ is wanted more than the response rate, it is preferred to use the compounds represented by formulae (i-1-3.3), (i-1-3.4), (L-1-3.11), and (i-1-3.12). It is not preferred to set the total percentage of the compounds represented by formulae (i-1-3.3), (i-1-3.4), (i-1-3.11), and (i-1-3.12) to 20% by mass or more for the solubility at low temperatures to be good.

[Chem. 10]

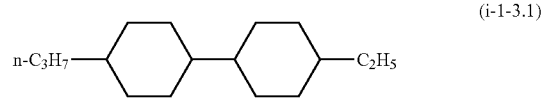

(i-1-3.1)

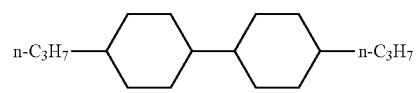

(i-1-3.2)

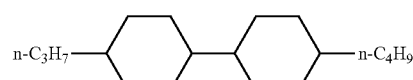

(i-1-3.3)

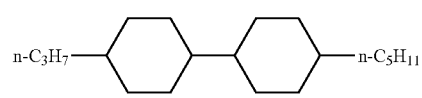

(i-1-3.4)

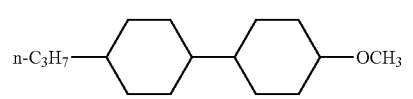

(i-1-3.11)

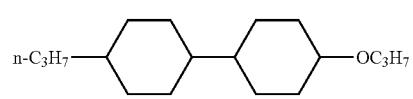

(i-1-3.12)

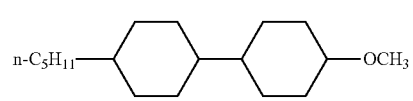

(i-1-3.13)

The lower limit of preferred percentages of the compound represented by formula (i-1-3.1) to the total amount of the composition according to the present invention is 1% by mass, 2% by mass, 3% by mass, 5% by mass, 7% by mass, 10% by mass, 13% by mass, 15% by mass, 18% by mass, or 20% by mass. The upper limit of preferred percentages is 20% by mass, 17% by mass, 15% by mass, 13% by mass, 10% by mass, 8% by mass, 7% by mass, or 6% by mass of the total amount of the composition according to the present invention.

The compound(s) represented by general formula (i-1) is preferably compound(s) selected from the group(s) of compounds represented by general formula(e) (i-1-4) and/or (i-1-5).

[Chem. 11]

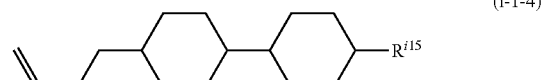

(i-1-4)

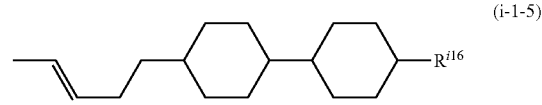

(i-1-5)

(In the formulae, $R^{i15}$ and $R^{i16}$ each independently represent a C1-8 alkyl or C1-8 alkoxy group.)

$R^{i15}$ and $R^{i16}$ are preferably linear C1-5 alkyl, linear C1-4 alkoxy, or linear C2-5 alkenyl groups.

The lower limit of preferred percentages of the compound(s) represented by formula (i-1-4) to the total amount of the composition according to the present invention is 1% by mass, 5% by mass, 10% by mass, 13% by mass, 15% by mass, 17% by mass, or 20% by mass. The upper limit of preferred percentages is 25% by mass, 23% by mass, 20% by mass, 17% by mass, 15% by mass, 13% by mass, or 10% by mass of the total amount of the composition according to the present invention.

The lower limit of preferred percentages of the compound(s) represented by formula (i-1-5) to the total amount of the composition according to the present invention is 1% by mass, 5% by mass, 10% by mass, 13% by mass, 15% by mass, 17% by mass, or 20% by mass. The upper limit of preferred percentages is 25% by mass, 23% by mass, 20% by mass, 17% by mass, 15% by mass, 13% by mass, or 10% by mass of the total amount of the composition according to the present invention.

The compound(s) represented by general formulae (i-1-4) and (i-1-5) is, moreover, preferably compound(s) selected from the group of compounds represented by formulae (i-1-4.1) to (i-1-5.3), preferably the compound represented by formula (i-1-4.2) or (i-1-5.2).

[Chem. 12]

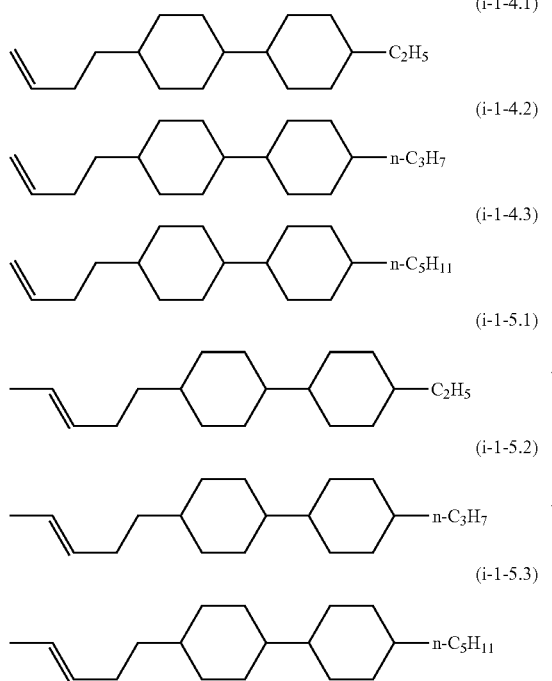

(i-1-4.1)
(i-1-4.2)
(i-1-4.3)
(i-1-5.1)
(i-1-5.2)
(i-1-5.3)

The lower limit of preferred percentages of the compound represented by formula (i-1-4.2) to the total amount of the composition according to the present invention is 1% by mass, 2% by mass, 3% by mass, 5% by mass, 7% by mass, 10% by mass, 13% by mass, 15% by mass, 18% by mass, or 20% by mass. The upper limit of preferred percentages is 20% by mass, 17% by mass, 15% by mass, 13% by mass, 10% by mass, 8% by mass, 7% by mass, or 6% by mass of the total amount of the composition according to the present invention.

It is preferred to combine two or more compounds selected from the compounds represented by formulae (i-1-1.3), (i-1-2.2), (i-1-3.1), (i-1-3.3), (i-1-3.4), (i-1-3.11), and (i-1-3.12), preferably two or more compounds selected from the compounds represented by formulae (i-1-1.3), (i-1-2.2), (i-1-3.1), (i-1-3.3), (i-1-3.4), and (i-1-4.2). The lower limit of preferred percentages of the total percentage of these compounds is 1% by mass, 2% by mass, 3% by mass, 5% by mass, 7% by mass, 10% by mass, 13% by mass, 15% by mass, 18% by mass, 20% by mass, 23% by mass, 25% by mass, 27% by mass, 30% by mass, 33% by mass, or 35% by mass of the total amount of the composition according to the present invention. The upper limit is 80% by mass, 70% by mass, 60% by mass, 50% by mass, 45% by mass, 40% by mass, 37% by mass, 35% by mass, 33% by mass, 30% by mass, 28% by mass, 25% by mass, 23% by mass, or 20% by mass of the total amount of the composition according to the present invention. If the reliability of the composition is a high priority, it is preferred to combine two or more compounds selected from the compounds represented by formulae (i-1-3.1), (i-1-3.3), and (i-1-3.4)). If the response rate of the composition is a high priority, it is preferred to combine two or more compounds selected from the compounds represented by formulae (i-1-1.3) and (i-1-2.2).

The compound(s) represented by general formula (i-1) is preferably compound(s) selected from the group of compounds represented by general formula (i-1-6).

[Chem. 13]

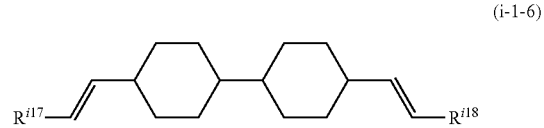

(i-1-6)

(In the formula, $R^{i17}$ and $R^{i18}$ each independently represent a methyl group or hydrogen atom.)

The lower limit of preferred percentages of the compound(s) represented by formula (i-1-6) to the total amount of the composition according to the present invention is 1% by mass, 5% by mass, 10% by mass, 15% by mass, 17% by mass, 20% by mass, 23% by mass, 25% by mass, 27% by mass, 30% by mass, or 35% by mass. The upper limit of preferred percentages is 60% by mass, 55% by mass, 50% by mass, 45% by mass, 42% by mass, 40% by mass, 38% by mass, 35% by mass, 33% by mass, or 30% by mass of the total amount of the composition according to the present invention.

The compound(s) represented by general formula (i-1-6), moreover, is preferably compound(s) selected from the group of compounds represented by formulae (i-1-6.1) to (i-1-6.3).

[Chem. 14]

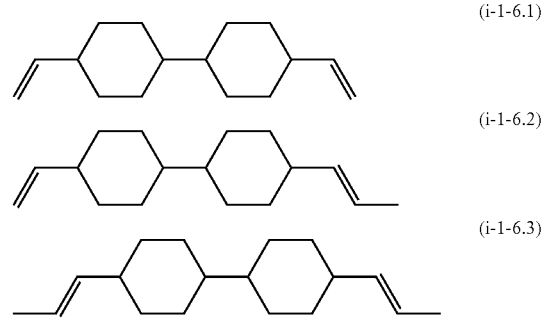

(i-1-6.1)
(i-1-6.2)
(i-1-6.3)

The compounds represented by general formula (i-2) are the following compounds.

[Chem. 15]

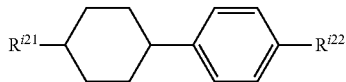
(i-2)

(In the formula, $R^{i21}$ and $R^{i22}$ each independently represent the same meaning as Ri1 and Ri1 in general formula (i).)

$R^{i21}$ is preferably a C1-5 alkyl or C2-5 alkenyl group, and $R^{L22}$ is preferably a C1-5 alkyl, C4-5 alkenyl, or C1-4 alkoxy group.

Those compounds represented by general formula (i-2) can be used alone but can also be used in a combination of two or more. Any two or more of the compounds can be combined, but compounds needed for the performance attributes required, such as solubility at low temperatures, transition temperature, electrical reliability, and birefringence, are used in combination. The number of kinds of compounds used is one, two, three, four, or five or more as an embodiment of the present invention by way of example.

If solubility at low temperatures is a high priority, setting the percentage relatively large is highly effective. If the response rate is a high priority, by contrast, setting the percentage relatively small is highly effective. To improve drop marks or image-sticking properties, it is preferred to set the range of percentages to a medium range.

The lower limit of preferred percentages of the compound(s) represented by formula (i-2) to the total amount of the composition according to the present invention is 1% by mass, 2% by mass, 3% by mass, 5% by mass, 7% by mass, or 10% by mass. The upper limit of preferred percentages is 20% by mass, 15% by mass, 13% by mass, 10% by mass, 8% by mass, 7% by mass, 6% by mass, 5% by mass, or 3% by mass of the total amount of the composition according to the present invention.

The compound(s) represented by general formula (i-2), moreover, is preferably compound(s) selected from the group of compounds represented by formulae (i-2.1) to (i-2.6), preferably compound(s) represented by formulae (L-2.1), (i-2.3), (i-2.4), and (i-2.6).

[Chem. 16]

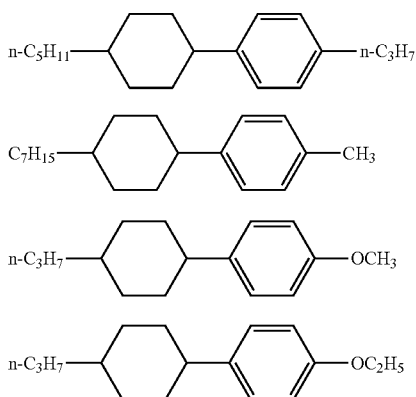

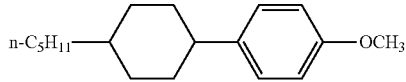
(i-2.5)

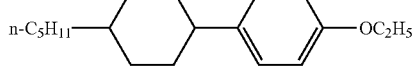
(i-2.6)

(n-Type Compounds)

Besides the above compound(s) represented by general formula (i), which has no dielectric constant anisotropy (A approximately in the range of −2) to 2, a liquid crystal composition according to the present invention preferably contains dielectrically negative compound(s) (The sign of Ae is negative, with the absolute value larger than 2.) that is one or two or more compounds selected from the compounds represented by general formulae (N-1), (N-2), (N-3), and (N-4) below.

[Chem. 17]

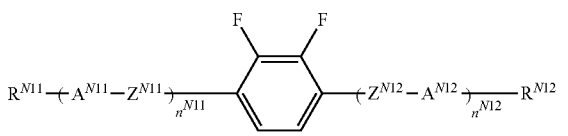
(N-1)

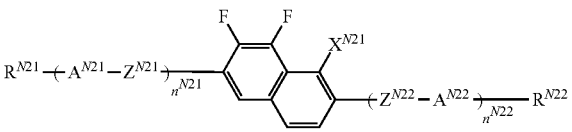
(N-2)

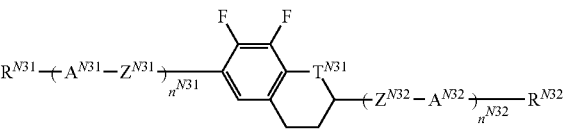
(N-3)

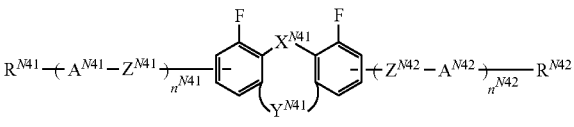
(N-4)

[In general formulae (N-1), (N-2), (N-3), and (N-4), $R^{N11}$, $R^{N12}$, $R^{N21}$, $R^{N22}$, $R^{N31}$, $R^{N32}$, $R^{N41}$, and $R^{N42}$ each independently represent a C1-8 alkyl group or a moiety having a chemical structure resulting from substituting one —$CH_2$— in a C2-8 alkyl chain, or each of nonadjacent two or more independently, with —CH=CH—, —C≡C—, —O—, —CO—, —COO—, or —OCO—, $A^{N11}$, $A^{N12}$, $A^{N21}$, $A^{N22}$, $A^{N31}$, $A^{N32}$, $A^{N41}$, and $A^{N42}$ each independently represent a group selected from the group consisting of:

(a) a 1,4-cyclohexylene group (One —$CH_2$— or two or more nonadjacent —$CH_2$— present in this group may be substituted with —O—.);

(b) a 1,4-phenylene group (One —CH= or two or more nonadjacent —CH= present in this group may be substituted with —N=.);

(c) a naphthalen-2,6-diyl, 1,2,3,4-tetrahydronaphthalen-2,6-diyl, or decahydronaphthalen-2,6-diyl group (One —CH= or two or more nonadjacent —CH= present in the naphthalen-2,6-diyl or 1,2,3,4-tetrahydronaphthalen-2,6-diyl group may be substituted with —N=.); and (d) a 1,4-cyclohexenylene group,
the hydrogen atoms in the structure of the groups (a), (b), (c), and (d) may each independently be substituted with a cyano group, a fluorine atom, or a chlorine atom, $Z^{N11}$, $Z^{N12}$, $Z^{N21}$, $Z^{N22}$, $Z^{N31}$, $Z^{N32}$, $Z^{N41}$, and $Z^{N42}$ each independently represent a single bond, —CH$_2$CH$_2$—, —(CH$_2$)$_4$—, —OCH$_2$—, —CH$_2$O—, —COO—, —OCO—, —OCF$_2$—, —CF$_2$O—, —CH=N—N=CH—, —CH=CH—, —CF=CF—, or —C≡C—, and $X^{N21}$ represents a hydrogen or fluorine atom, $T^{N31}$ represents —CH$_2$— or an oxygen atom, $X^{N41}$ represents an oxygen atom, a nitrogen atom, or —CH$_2$—, and $Y^{N41}$ represents a single bond or —CH$_2$—, $n^{N11}$, $n^{N12}$, $n^{N21}$, $n^{N22}$, $n^{N31}$, $n^{N32}$, $n^{N41}$, and $n^{N42}$ each independently represent an integer of 0 to 3, with the proviso that each of $n^{N11}+n^{N12}$, $n^{N21}+n^{N22}$, and $n^{N31}+n^{N32}$ is independently 1, 2, or 3. For $A^{N11}$ to $A^{N32}$ and $Z^{N11}$ to $Z^{N32}$, multiple groups may be the same or different. $n^{N41}+n^{N42}$ represents an integer of 0 to 3, with the proviso that for $A^{N41}$ and $A^{N42}$ and for $Z^{N41}$ and $Z^{N42}$, multiple groups may be the same or different.]

The compound(s) represented by general formulae (N-1), (N-2), (N-3), and (N-4) are preferably compound(s) having a negative Δε with the absolute value larger than 2.

In general formulae (N-1), (N-2), (N-3), and (N-4), each of $R^{N11}$, $R^{N12}$, $R^{N21}$, $R^{N22}$, $R^{N31}$, $R^{N32}$, $R^{N41}$, and $R^{N42}$ is preferably independently a C1-8 alkyl, C1-8 alkoxy, C2-8 alkenyl, or C2-8 alkenyloxy group, preferably a C1-5 alkyl, C1-5 alkoxy, C2-5 alkenyl, or C2-5 alkenyloxy group, more preferably a C1-5 alkyl or C2-5 alkenyl group, more preferably a C2-5 alkyl or C2-3 alkenyl group, in particular a C3 alkenyl group (propenyl group).

If the ring structure to which the group is bound is a phenyl group (aromatic), linear C1-5 alkyl, linear C1-4 alkoxy, and C4-5 alkenyl groups are preferred. If the ring structure to which the group is bound is a saturated ring structure, such as cyclohexane, pyran, or dioxane, linear C1-5 alkyl, linear C1-4 alkoxy, and linear C2-5 alkenyl groups are preferred. To stabilize the nematic phase, it is preferred that the total number of carbon and oxygen, if present, atoms be 5 or less, preferably with the group being linear.

An alkenyl group is preferably selected from the groups represented by any of formulae (R1) to (R5). (The black dot in the formulae represents a carbon atom in a ring structure.)

[Chem. 18]

 (R1)

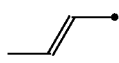 (R2)

 (R3)

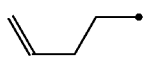 (R4)

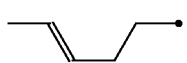 (R5)

If Δn needs to be large, each of $A^{N11}$, $A^{N12}$, $A^{N21}$, $A^{N22}$, $A^{N31}$, and $A^{N32}$ is preferably independently aromatic. To improve the response rate, it is preferred that each of these groups be independently aliphatic. Preferably, each of these groups independently represents a trans-1,4-cyclohexylene, 1,4-phenylene, 2-fluoro-1,4-phenylene, 3-fluoro-1,4-phenylene, 3,5-difluoro-1,4-phenylene, 2,3-difluoro-1,4-phenylene, 1,4-cyclohexenylene, 1,4-bicyclo[2.2.2]octylene, piperidin-1,4-diyl, naphthalen-2,6-diyl, decahydronaphthalen-2,6-diyl, or 1,2,3,4-tetrahydronaphthalen-2,6-diyl group, more preferably any of the structures given below,

[Chem. 19]

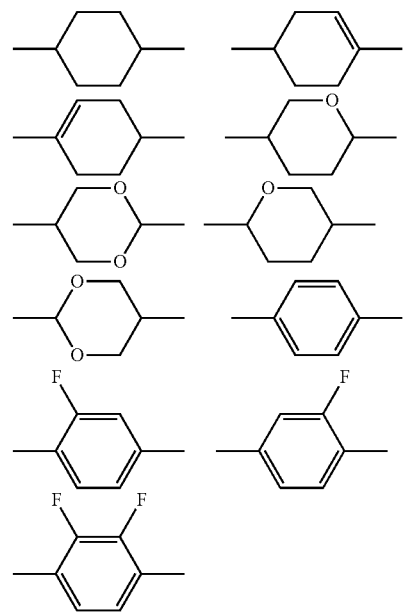

more preferably a trans-1,4-cyclohexylene, 1,4-cyclohexenylene, or 1,4-phenylene group.

$Z^{N11}$, $Z^{N12}$, $Z^{N21}$, $Z^{N22}$, $Z^{N31}$, and $Z^{N32}$ each preferably independently represent —CH$_2$O—, —CF$_2$O—, —CH$_2$CH$_2$—, —CF$_2$CF$_2$—, or a single bond, more preferably —CH$_2$O—, —CH$_2$CH$_2$—, or a single bond, in particular —CH$_2$O— or a single bond.

$X^{N21}$ is preferably a fluorine atom.
$T^{N31}$ is preferably an oxygen atom.
$n^{N11}+n^{N12}$, $n^{N21}+n^{N22}$, and $n^{N31}+n^{N32}$ are preferably 0, 1, or 2. The following combinations are preferred: $n^{N11}$ is 1, and $n^{N12}$ is 0; $n^{N11}$ is 2, and $n^{N12}$ is 0; $n^{N11}$ is 1, and $n^{N12}$ is 1; $n^{N11}$ is 2, and $n^{N12}$ is 1; $n^{N21}$ is 1, and $n^{N22}$ is 0; $n^{N21}$ is 2, and $n^{N22}$ is 0; $n^{N31}$ is 1, and $n^{N32}$ is 0; and $n^{N31}$ is 2, and $n^{N32}$ is 0.

The lower limit of preferred percentages of compound(s) represented by formula (N-1) to the total amount of the composition according to the present invention is 1% by mass, 10% by mass, 20% by mass, 30% by mass, 40% by mass, 50% by mass, 55% by mass, 60% by mass, 65% by mass, 70% by mass, 75% by mass, or 80% by mass. The upper limit of preferred percentages is 95% by mass, 85% by mass, 75% by mass, 65% by mass, 55% by mass, 45% by mass, 35% by mass, 25% by mass, or 20% by mass.

The lower limit of preferred percentages of compound(s) represented by formula (N-2) to the total amount of the composition according to the present invention is 1% by mass, 10% by mass, 20% by mass, 30% by mass, 40% by mass, 50% by mass, 55% by mass, 60% by mass, 65% by mass, 70% by mass, 75% by mass, or 80% by mass. The upper limit of preferred percentages is 95% by mass, 85% by mass, 75% by mass, 65% by mass, 55% by mass, 45% by mass, 35% by mass, 25% by mass, or 20% by mass.

The lower limit of preferred percentages of compound(s) represented by formula (N-3) to the total amount of the composition according to the present invention is 1% by mass, 10% by mass, 20% by mass, 30% by mass, 40% by mass, 50% by mass, 55% by mass, 60% by mass, 65% by mass, 70% by mass, 75% by mass, or 80% by mass. The upper limit of preferred percentages is 95% by mass, 85% by mass, 75% by mass, 65% by mass, 55% by mass, 45% by mass, 35% by mass, 25% by mass, or 20% by mass.

If the manufacturer needs to keep low the viscosity of the composition according to the present invention and thereby make the composition quick in response, it is preferred that the above lower limit be low with the upper limit low. If the manufacturer needs to keep high the $T_{NI}$ of the composition according to the present invention and thereby make the composition good in temperature stability, it is preferred that the above lower limit be low with the upper limit low. If the manufacturer wants a large dielectric constant anisotropy to keep the drive voltage low, it is preferred that the above lower limit be high with the upper limit high.

Of the compounds represented by general formula (N-1), those represented by general formula (N-2), those represented by general formula (N-3), and those represented by general formula (N-4), the compounds represented by general formula (N-1) are preferred for use in a liquid crystal composition according to the present invention.

(p-Type Compound)

A composition according to the present invention for a p-type liquid crystal display element preferably contains one or two or more compounds represented by general formula (J) below besides compound(s) represented by general formula (i). These compounds are dielectrically positive compounds (Δε is larger than 2.).

[Chem. 20]

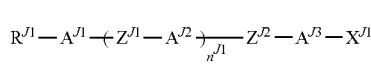
(J)

(In the formula, $R^{J1}$ represents a C1-8 alkyl group, and one —CH$_2$— in the alkyl group, or each of nonadjacent two or more independently, may be substituted with —CH≡CH—, —C≡C—, —O—, —CO—, —COO—, or —OCO—, $n^{J1}$ represents 0, 1, 2, 3, or 4, $A^{J1}$, $A^{J2}$, and $A^{J3}$ each independently represent a group selected from the group consisting of:

(a) a 1,4-cyclohexylene group (One —CH$_2$— or two or more nonadjacent —CH$_2$— present in this group may be substituted with —O—.);

(b) a 1,4-phenylene group (One —CH= or two or more nonadjacent —CH= present in this group may be substituted with —N=.); and (c) a naphthalen-2,6-diyl, 1,2,3,4-tetrahydronaphthalen-2,6-diyl, or decahydronaphthalen-2,6-diyl group (One —CH= or two or more nonadjacent —CH= present in the naphthalen-2,6-diyl or 1,2,3,4-tetrahydronaphthalen-2,6-diyl group may be substituted with —N=.), the groups (a), (b), and (c) may each independently be substituted with a cyano group, a fluorine atom, a chlorine atom, a methyl group, a trifluoromethyl group, or a trifluoromethoxy group, $Z^{J1}$ and $Z^{J2}$ each independently represent a single bond, —CH$_2$CH$_2$—, —(CH$_2$)$_4$—, —OCH$_2$—, —CH$_2$O—, —OCF$_2$—, —CF$_2$O—, —COO—, —OCO—, or —C≡C—, if $n^{J1}$ is 2, 3, or 4 and there are multiple $A^{J2}$s, they may be the same or different, and if $n^{J1}$ is 2, 3, or 4 and there are multiple $Z^{J1}$s, they may be the same or different, and $X^{J1}$ represents a hydrogen atom, a fluorine atom, a chlorine atom, a cyano group, a trifluoromethyl group, a fluoromethoxy group, a difluoromethoxy group, a trifluoromethoxy group, or a 2,2,2-trifluoroethyl group.)

In general formula (J), $R^{J1}$ is preferably a C1-8 alkyl, C1-8 alkoxy, C2-8 alkenyl, or C2-8 alkenyloxy group, preferably a C1-5 alkyl, C1-5 alkoxy, C2-5 alkenyl, or C2-5 alkenyloxy group, more preferably a C1-5 alkyl or C2-5 alkenyl group, more preferably a C2-5 alkyl or C2-3 alkenyl group, in particular a C3 alkenyl group (propenyl group).

If reliability is a high priority, $R^{J1}$ is preferably an alkyl group. If reducing viscosity is a high priority, $R^{J1}$ is preferably an alkenyl group.

If the ring structure to which the group is bound is a phenyl group (aromatic), linear C1-5 alkyl, linear C1-4 alkoxy, and C4-5 alkenyl groups are preferred. If the ring structure to which the group is bound is a saturated ring structure, such as cyclohexane, pyran, or dioxane, linear C1-5 alkyl, linear C1-4 alkoxy, and linear C2-5 alkenyl groups are preferred. To stabilize the nematic phase, it is preferred that the total number of carbon and oxygen, if present, atoms be 5 or less, preferably with the group being linear.

An alkenyl group is preferably selected from the groups represented by any of formulae (R1) to (R5). (The black dot in the formulae represents a carbon atom in the ring structure to which the alkenyl group is bound.)

[Chem. 21]

(R1)

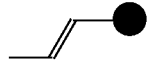
(R2)

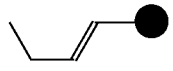
(R3)

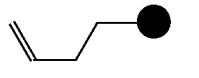
(R4)

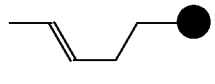
(R5)

If Δn needs to be large, each of $A^{J1}$, $A^{J2}$, and $A^{J3}$ is preferably independently aromatic. To improve the response rate, it is preferred that each of these groups be independently aliphatic. Preferably, each of these groups independently represents a trans-1,4-cyclohexylene, 1,4-phenylene, 1,4-bicyclo[2.2.2]octylene, piperidin-1,4-diyl, naphthalen-2,6-diyl, decahydronaphthalen-2,6-diyl, or 1,2,3,4-tetrahydronaphthalen-2,6-diyl group, whether or not fluorinated, more preferably any of the structures given below,

[Chem. 22]

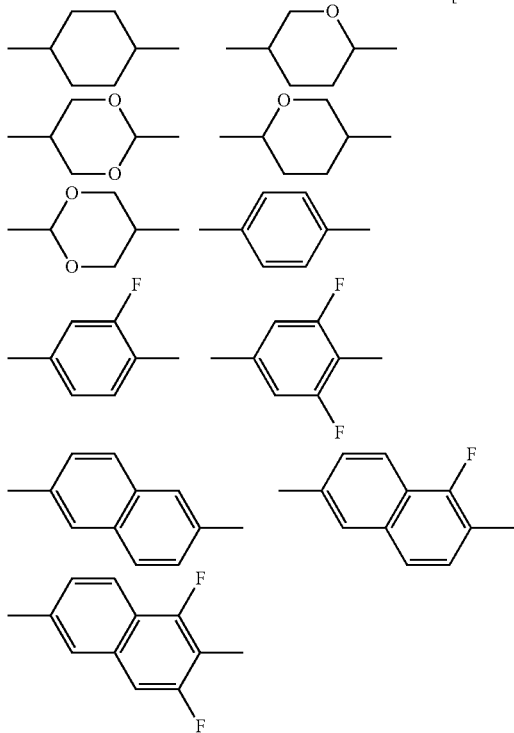

more preferably any of the structures given below.

[Chem. 23]

$Z^{J1}$ and $Z^{J2}$ each preferably independently represent —CH$_2$O—, —OCH$_2$—, —CF$_2$O—, —CH$_2$CH$_2$—, —CF$_2$CF$_2$—, or a single bond, more preferably —OCH$_2$—, —CF$_2$O—, —CH$_2$CH$_2$—, or a single bond, in particular —OCH$_2$—, —CF$_2$O—, or a single bond.

$X^{J1}$ is preferably a fluorine atom or trifluoromethoxy group, preferably a fluorine atom.

$n^{J1}$ is preferably 0, 1, 2, or 3, preferably 0, 1, or 2. If emphasis is on improving Δε, $n^{J1}$ is preferably 0 or 1. If $T_{NI}$ is a high priority, $n^{J1}$ is preferably 1 or 2.

Any two or more such compounds can be combined, but compounds selected in accordance with the desired performance attributes, such as solubility at low temperatures, transition temperature, electrical reliability, and birefringence, are used in combination. The number of kinds of compounds used is one, two, or three as an embodiment of the present invention by way of example, or is four, five, six, or seven or more in another embodiment of the present invention.

In the composition according to the present invention, the percentage of the compound(s) represented by general formula (J) needs to be adjusted as needed for the performance attributes required, such as solubility at low temperatures, transition temperature, electrical reliability, birefringence, process suitability, drop marks, image-sticking, and dielectric constant anisotropy.

The lower limit of preferred percentages of the compound(s) represented by general formula (J) to the total amount of the composition according to the present invention is 1% by mass, 10% by mass, 20% by mass, 30% by mass, 40% by mass, 50% by mass, 55% by mass, 60% by mass, 65% by mass, 70% by mass, 75% by mass, or 80% by mass. The upper limit of preferred percentages is, in an embodiment of the present invention by way of example, 95% by mass, 85% by mass, 75% by mass, 65% by mass, 55% by mass, 45% by mass, 35% by mass, or 25% by mass of the total amount of the composition according to the present invention.

If the manufacturer needs to keep low the viscosity of the composition according to the present invention and thereby make the composition quick in response, it is preferred to set the above lower limit relatively low with the upper limit relatively low. If the manufacturer needs to keep high the $T_{NI}$ of the composition according to the present invention and thereby make the composition good in temperature stability, it is preferred to set the above lower limit relatively low with the upper limit relatively low. If the manufacturer wants a large dielectric constant anisotropy to keep the drive voltage low, it is preferred to set the above lower limit relatively high with the upper limit relatively high.

If reliability is a high priority, $R^{J1}$ is preferably an alkyl group. If reducing viscosity is a high priority, $R^{J1}$ is preferably an alkenyl group.

For use as the compound(s) represented by general formula (J), those compounds represented by general formula (M) and those represented by general formula (K) are preferred.

First, examples of compounds represented by general formula (M) include the compounds having the following structure.

[Chem. 24]

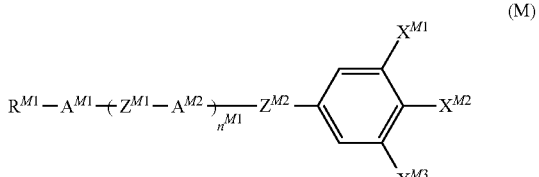

(M)

(In the formula, $R^{M1}$ represents a C1-8 alkyl group, and one —CH$_2$— in the alkyl group, or each of two or more nonadjacent —$CH_2$— independently, may be substituted with —CH=CH—, —C≡C—, —O—, —CO—, —COO—, or —OCO—, $n^{M1}$ represents 0, 1, 2, 3, or 4, $A^{M1}$ and $A^{M2}$ each independently represent a group selected from the group consisting of:

(a) a 1,4-cyclohexylene group (One —$CH_2$— or two or more nonadjacent —$CH_2$— present in this group may be substituted with —O— or —S—.); and (b) a 1,4-phenylene group (One —CH= or two or more nonadjacent —CH= present in this group may be substituted with —N=.), the hydrogen atoms on the groups (a) and (b) may each independently be substituted with a cyano group, a fluorine atom, or a chlorine atom, $Z^{M1}$ and $Z^{M2}$ each independently represent a single bond, —$CH_2CH_2$—, —$(CH_2)_4$—, —$OCH_2$—, —$CH_2O$—, —$OCF_2$—, —$CF_2O$—, —COO—, —OCO—, or —C≡C—, if $n^{M1}$ is 2, 3, or 4 and there are multiple $A^{M2}$s, they may be the same or different, and if $n^{M1}$ is 2, 3, or 4 and there are multiple $Z^{M1}$s, they may be the same or different, $X^{M1}$ and $X^{M3}$ each independently represent a hydrogen, chlorine, or fluorine atom, and $X^{M2}$ represents a hydrogen atom, a fluorine atom, a chlorine atom, a cyano group, a trifluoromethyl group, a fluoromethoxy group, a difluoromethoxy group, a trifluoromethoxy group, or a 2,2,2-trifluoroethyl group.)

In general formula (M), $R^{M1}$ is preferably a C1-8 alkyl, C1-8 alkoxy, C2-8 alkenyl, or C2-8 alkenyloxy group, preferably a C1-5 alkyl, C1-5 alkoxy, C2-5 alkenyl, or C2-5 alkenyloxy group, more preferably a C1-5 alkyl or C2-5 alkenyl group, more preferably a C2-5 alkyl or C2-3 alkenyl group, in particular a C3 alkenyl group (propenyl group).

If reliability is a high priority, $R^{M1}$ is preferably an alkyl group. If reducing viscosity is a high priority, $R^{M1}$ is preferably an alkenyl group.

If the ring structure to which the group is bound is a phenyl group (aromatic), linear C1-5 alkyl, linear C1-4 alkoxy, and C4-5 alkenyl groups are preferred. If the ring structure to which the group is bound is a saturated ring structure, such as cyclohexane, pyran, or dioxane, linear C1-5 alkyl, linear C1-4 alkoxy, and linear C2-5 alkenyl groups are preferred. To stabilize the nematic phase, it is preferred that the total number of carbon and oxygen, if present, atoms be 5 or less, preferably with the group being linear.

An alkenyl group is preferably selected from the groups represented by any of formulae (R1) to (R5). (The black dot in the formulae represents a carbon atom in the ring structure to which the alkenyl group is bound.)

[Chem. 25]

(R1)

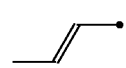
(R2)

(R3)

(R4)

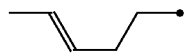
(R5)

If Δn needs to be large, each of $A^{M1}$ and $A^{M2}$ is preferably independently aromatic. To improve the response rate, it is preferred that each of these groups be independently aliphatic. Preferably, each of these groups independently represents a trans-1,4-cyclohexylene, 1,4-phenylene, 2-fluoro-1,4-phenylene, 3-fluoro-1,4-phenylene, 3,5-difluoro-1,4-phenylene, 2,3-difluoro-1,4-phenylene, 1,4-cyclohexenylene, 1,4-bicyclo[2.2.2]octylene, piperidin-1,4-diyl, naphthalen-2,6-diyl, decahydronaphthalen-2,6-diyl, or 1,2,3,4-tetrahydronaphthalen-2,6-diyl group, more preferably any of the structures given below,

[Chem. 26]

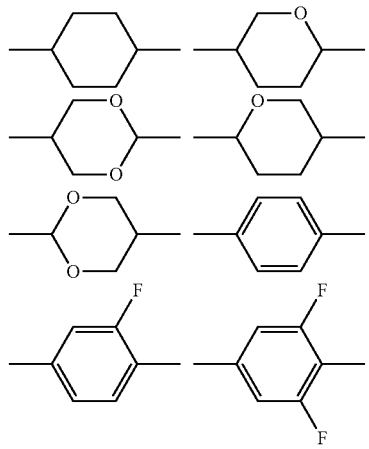

more preferably any of the structures given below.

[Chem. 27]

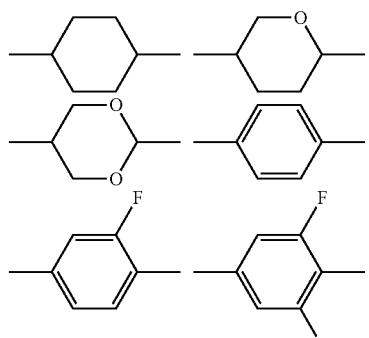

$Z^{M1}$ and $Z^{M2}$ each preferably independently represent —$CH_2O$—, —$CF_2O$—, —$CH_2CH_2$—, —$CF_2CF_2$—, or a single bond, more preferably —$CF_2O$—, —$CH_2CH_2$—, or a single bond, in particular —$CF_2O$— or a single bond.

$n^{M1}$ is preferably 0, 1, 2, or 3, preferably 0, 1, or 2. If emphasis is on improving Δε, $n^{M1}$ is preferably 0 or 1. If $T_{NI}$ is a high priority, $n^{M1}$ is preferably 1 or 2.

Any two or more such compounds can be combined, but compounds selected in accordance with the desired performance attributes, such as solubility at low temperatures, transition temperature, electrical reliability, and birefringence, are used in combination. The number of kinds of compounds used is one, two, or three as an embodiment of the present invention by way of example, or is four, five, six, or seven or more in another embodiment of the present invention.

In the composition according to the present invention, the percentage of the compound(s) represented by general formula (M) needs to be adjusted as needed for the performance attributes required, such as solubility at low temperatures, transition temperature, electrical reliability, birefringence, process suitability, drop marks, image-sticking, and dielectric constant anisotropy.

The lower limit of preferred percentages of the compound(s) represented by general formula (M) to the total amount of the composition according to the present invention is 1% by mass, 10% by mass, 20% by mass, 30% by mass, 40% by mass, 50% by mass, 55% by mass, 60% by mass, 65% by mass, 70% by mass, 75% by mass, or 80% by mass. The upper limit of preferred percentages is, in an embodiment of the present invention by way of example, 95% by mass, 85% by mass, 75% by mass, 65% by mass, 55% by mass, 45% by mass, 35% by mass, or 25% by mass of the total amount of the composition according to the present invention.

If the manufacturer needs to keep low the viscosity of the composition according to the present invention and thereby make the composition quick in response, it is preferred to set the above lower limit relatively low with the upper limit relatively low. If the manufacturer needs to keep high the $T_{NI}$ of the composition according to the present invention and thereby make the composition good in temperature stability, it is preferred to set the above lower limit relatively low with the upper limit relatively low. If the manufacturer wants a large dielectric constant anisotropy to keep the drive voltage low, it is preferred to set the above lower limit relatively high with the upper limit relatively high.

Next, those compounds represented by general formula (K) have the following chemical structure.

[Chem. 28]

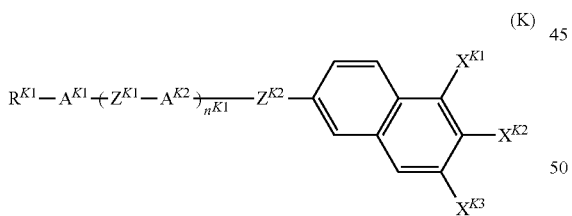

(K)

(In the formula, $R^{K1}$ represents a C1-8 alkyl group, and one —$CH_2$— in the alkyl group, or each of nonadjacent two or more independently, may be substituted with —CH=CH—, —C≡C—, —O—, —CO—, —COO—, or —OCO—, $n^{K1}$ represents 0, 1, 2, 3, or 4, $A^{K1}$ and $A^{K2}$ each independently represent a group selected from the group consisting of:

(a) a 1,4-cyclohexylene group (One —$CH_2$— or two or more nonadjacent —$CH_2$— present in this group may be substituted with —O— or —S—.); and (b) a 1,4-phenylene group (One —CH= or two or more nonadjacent —CH= present in this group may be substituted with —N=.), the hydrogen atoms on the groups (a) and (b) may each independently be substituted with a cyano group, a fluorine atom, or a chlorine atom, $Z^{K1}$ and $Z^{K2}$ each independently represent a single bond, —$CH_2CH_2$—, —$(CH_2)_4$—, —$OCH_2$—, —$CH_2O$—, —$OCF_2$—, —$CF_2O$—, —COO—, —OCO—, or —C≡C—, if $n^{K1}$ is 2, 3, or 4 and there are multiple $A^{K2}$s, they may be the same or different, and if $n^{K1}$ is 2, 3, or 4 and there are multiple $Z^{K1}$s, they may be the same or different, $X^{K1}$ and $X^{K3}$ each independently represent a hydrogen, chlorine, or fluorine atom, and $X^{K2}$ represents a hydrogen atom, a fluorine atom, a chlorine atom, a cyano group, a trifluoromethyl group, a fluoromethoxy group, a difluoromethoxy group, a trifluoromethoxy group, or a 2,2,2-trifluoroethyl group.)

In general formula (K), $R^{K1}$ is preferably a C1-8 alkyl, C1-8 alkoxy, C2-8 alkenyl, or C2-8 alkenyloxy group, preferably a C1-5 alkyl, C1-5 alkoxy, C2-5 alkenyl, or C2-5 alkenyloxy group, more preferably a C1-5 alkyl or C2-5 alkenyl group, more preferably a C2-5 alkyl or C2-3 alkenyl group, in particular a C3 alkenyl group (propenyl group).

If reliability is a high priority, $R^{K1}$ is preferably an alkyl group. If reducing viscosity is a high priority, $R^{K1}$ is preferably an alkenyl group.

If the ring structure to which the group is bound is a phenyl group (aromatic), linear C1-5 alkyl, linear C1-4 alkoxy, and C4-5 alkenyl groups are preferred. If the ring structure to which the group is bound is a saturated ring structure, such as cyclohexane, pyran, or dioxane, linear C1-5 alkyl, linear C1-4 alkoxy, and linear C2-5 alkenyl groups are preferred. To stabilize the nematic phase, it is preferred that the total number of carbon and oxygen, if present, atoms be 5 or less with the group being linear.

An alkenyl group is preferably selected from the groups represented by any of formulae (R1) to (R5). (The black dot in the formulae represents a carbon atom in the ring structure to which the alkenyl group is bound.)

[Chem. 29]

(R1)

(R2)

(R3)

(R4)

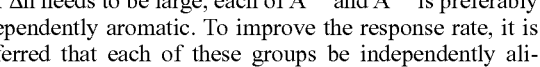

(R5)

If Δn needs to be large, each of $A^{K1}$ and $A^{K2}$ is preferably independently aromatic. To improve the response rate, it is preferred that each of these groups be independently aliphatic. Preferably, each of these groups independently represents a trans-1,4-cyclohexylene, 1,4-phenylene, 2-fluoro-1,4-phenylene, 3-fluoro-1,4-phenylene, 3,5-difluoro-1,4-phenylene, 2,3-difluoro-1,4-phenylene, 1,4-cyclohexenylene, 1,4-bicyclo[2.2.2]octylene, piperidin-1,4-diyl, naphthalen-2,6-diyl, decahydronaphthalen-2,6-diyl, or 1,2,3,4-tetrahydronaphthalen-2,6-diyl group, more preferably any of the structures given below,

[Chem. 30]

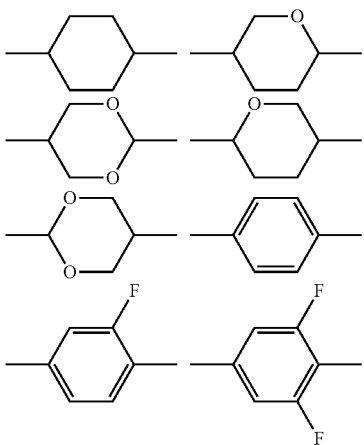

more preferably any of the structures given below.

[Chem. 31]

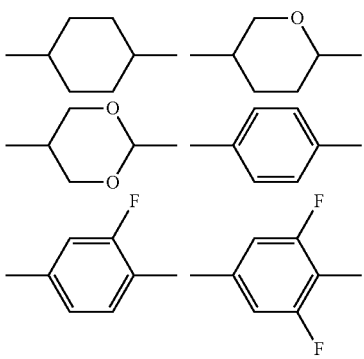

$Z^{K1}$ and $Z^{K2}$ each preferably independently represent —CH$_2$O—, —CF$_2$O—, —CH$_2$CH$_2$—, —CF$_2$CF$_2$—, or a single bond, more preferably —CF$_2$O—, —CH$_2$CH$_2$—, or a single bond, in particular —CF$_2$O— or a single bond.

$n^{K1}$ is preferably 0, 1, 2, or 3, preferably 0, 1, or 2. If emphasis is on improving Δε, $n^{K1}$ is preferably 0 or 1. If $T_{NI}$ is a high priority, $n^{K1}$ is preferably 1 or 2.

Any two or more such compounds can be combined, but compounds selected in accordance with the desired performance attributes, such as solubility at low temperatures, transition temperature, electrical reliability, and birefringence, are used in combination. The number of kinds of compounds used is one, two, or three as an embodiment of the present invention by way of example, or is four, five, six, or seven or more in another embodiment of the present invention.

In the composition according to the present invention, the percentage of the compound(s) represented by general formula (K) needs to be adjusted as needed for the performance attributes required, such as solubility at low temperatures, transition temperature, electrical reliability, birefringence, process suitability, drop marks, image-sticking, and dielectric constant anisotropy.

The lower limit of preferred percentages of the compound(s) represented by general formula (K) to the total amount of the composition according to the present invention is 1% by mass, 10% by mass, 20% by mass, 30% by mass, 40% by mass, 50% by mass, 55% by mass, 60% by mass, 65% by mass, 70% by mass, 75% by mass, or 80% by mass. The upper limit of preferred percentages is, in an embodiment of the present invention by way of example, 95% by mass, 85% by mass, 75% by mass, 65% by mass, 55% by mass, 45% by mass, 35% by mass, or 25% by mass of the total amount of the composition according to the present invention.

If the manufacturer needs to keep low the viscosity of the composition according to the present invention and thereby make the composition quick in response, it is preferred to set the above lower limit relatively low with the upper limit relatively low. If the manufacturer needs to keep high the $T_{NI}$ of the composition according to the present invention and thereby make the composition good in temperature stability, it is preferred to set the above lower limit relatively low with the upper limit relatively low. If the manufacturer wants a large dielectric constant anisotropy to keep the drive voltage low, it is preferred to set the above lower limit relatively high with the upper limit relatively high.

A liquid crystal composition according to the present invention contains, as an essential ingredient, having substantially no dielectric constant anisotropy (compound(s) with a Δε between −2 and 2; such a compound hereinafter sometimes abbreviated to a "nonpolar compound") that is at least one compound represented by general formula (i). Besides the compound represented by general formula (i), preferably, the liquid crystal composition further contains nonpolar compound(s) that is one or two or more compounds represented by general formula (L) below. Those compounds represented by general formula (L) are dielectrically substantially neutral compounds (the value of Δε between −2 and 2).

[Chem. 32]

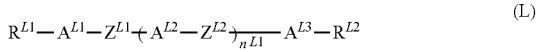

(L)

(In the formula, $R^{L1}$ and $R^{L2}$ each independently represent a C1-8 alkyl group, and one —CH$_2$— in the alkyl group, or each of nonadjacent two or more independently, may be substituted with —CH=CH—, —C≡C—, —O—, —CO—, —COO—, or —OCO—, $n^{L1}$ represents 0, 1, 2, or 3, $A^{L1}$, $A^{L2}$, and $A^{L3}$ each independently represent a group selected from the group consisting of:

(a) a 1,4-cyclohexylene group (One —CH$_2$— or two or more nonadjacent —CH$_2$— present in this group may be substituted with —O—.);

(b) a 1,4-phenylene group (One —CH= or two or more nonadjacent —CH= present in this group may be substituted with —N=.); and (c) a naphthalen-2,6-diyl, 1,2,3,4-tetrahydronaphthalen-2,6-diyl, or decahydronaphthalen-2,6-diyl group (One —CH= or two or more nonadjacent —CH= present in the naphthalen-2,6-diyl or 1,2,3,4-tetrahydronaphthalen-2,6-diyl group may be substituted with —N=.), the groups (a), (b), and (c) may each independently be substituted with a cyano group, a fluorine atom, or a chlorine atom, $Z^{L1}$ and $Z^{L2}$ each independently represent a single bond, —CH$_2$CH$_2$—, —(CH$_2$)$_4$—, —OCH$_2$—, —CH$_2$O—, —COO—, —OCO—, —OCF$_2$—, —CF$_2$O—, —CH=N— N=CH—, —CH=CH—, —CF=CF—, or —C≡C—, and if $n^{L1}$ is 2 or 3 and there are multiple $A^{L2}$s, they may be the same or different, and if $n^{L1}$ is 2 or 3 and there are multiple $Z^{L2}$s, they may be the same or different, with the proviso that those compounds represented by general formulae (N-1), (N-2), (N-3), (J), and (i) are excluded.)

Those compounds represented by general formula (L) can be used alone but can also be used in combination. Any two or more of the compounds can be combined, but compounds needed for the desired performance attributes, such as solubility at low temperatures, transition temperature, electrical reliability, and birefringence, are used in combination. The number of kinds of compounds used is one as an embodiment of the present invention by way of example or two, three, four, five, six, seven, eight, nine, or ten or more in another embodiment of the present invention.

In the composition according to the present invention, the percentage of the compound(s) represented by general formula (L) needs to be adjusted as needed for the performance attributes required, such as solubility at low temperatures, transition temperature, electrical reliability, birefringence, process suitability, drop marks, image-sticking, and dielectric constant anisotropy.

The lower limit of preferred percentages of the compound(s) represented by general formula (L) to the total amount of the composition according to the present invention is 1% by mass, 10% by mass, 20% by mass, 30% by mass, 40% by mass, 50% by mass, 55% by mass, 60% by mass, 65% by mass, 70% by mass, 75% by mass, or 80% by mass. The upper limit of preferred percentages is 95% by mass, 85% by mass, 75% by mass, 65% by mass, 55% by mass, 45% by mass, 35% by mass, or 25% by mass.

If the manufacturer needs to keep low the viscosity of the composition according to the present invention and thereby make the composition quick in response, it is preferred that the above lower limit be high with the upper limit high. If the manufacturer needs to keep high the $T_{NI}$ of the composition according to the present invention and thereby make the composition good in temperature stability, it is preferred that the above lower limit be high with the upper limit high. If the manufacturer wants a large dielectric constant anisotropy to keep the drive voltage low, it is preferred that the above lower limit be low with the upper limit low.

If reliability is a high priority, it is preferred that both $R^{L1}$ and $R^{L2}$ be alkyl groups. If making the compound less volatile is a high priority, it is preferred that both $R^{L1}$ and $R^{L2}$ be alkoxy groups. If reducing viscosity is a high priority, it is preferred that at least one of them be an alkenyl group.

The number of halogen atoms present in the molecule is preferably 0, 1, 2, or 3, preferably 0 or 1. If compatibility with other liquid crystal molecule(s) is a high priority, this number of halogen atoms is preferably 1.

For $R^{L1}$ and $R^{L2}$, if the ring structure to which the group is bound is a phenyl group (aromatic), linear C1-5 alkyl, linear C1-4 alkoxy, and C4-5 alkenyl groups are preferred. If the ring structure to which the group is bound is a saturated ring structure, such as cyclohexane, pyran, or dioxane, linear C1-5 alkyl, linear C1-4 alkoxy, and linear C2-5 alkenyl groups are preferred. To stabilize the nematic phase, it is preferred that the total number of carbon and oxygen, if present, atoms be 5 or less, preferably with the group being linear.

An alkenyl group is preferably selected from the groups represented by any of formulae (R1) to (R5). (The black dot in the formulae represents a carbon atom in a ring structure.)

[Chem. 33]

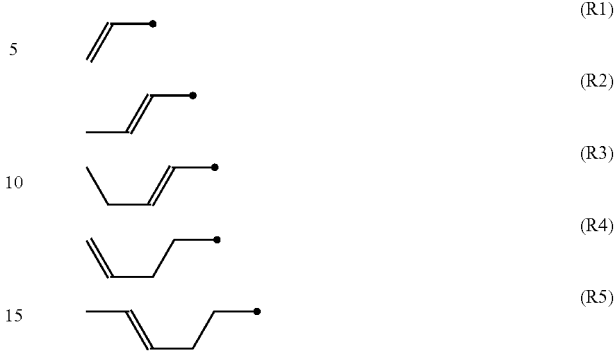

(R1)

(R2)

(R3)

(R4)

(R5)

If the response rate is a high priority, $n^{L1}$ is preferably 0. To improve the highest possible temperature of the nematic phase, it is preferred that $n^{L1}$ be 2 or 3. To achieve a balance therebetween, it is preferred that $n^{L1}$ be 1. For the composition to have the characteristics required of it, it is preferred to combine compounds with different values for $n^{L1}$.

If Δn needs to be large, $A^{L1}$, $A^{L2}$, and $A^{L3}$ are preferably aromatic. To improve the response rate, it is preferred that these groups be aliphatic. Preferably, each of these groups independently represents a trans-1,4-cyclohexylene, 1,4-phenylene, 2-fluoro-1,4-phenylene, 3-fluoro-1,4-phenylene, 3,5-difluoro-1,4-phenylene, 1,4-cyclohexenylene, 1,4-bicyclo[2.2.2]octylene, piperidin-1,4-diyl, naphthalen-2,6-diyl, decahydronaphthalen-2,6-diyl, or 1,2,3,4-tetrahydronaphthalen-2,6-diyl group, or a group having a structure represented by the structural formulae below, more preferably any of the structures given below,

[Chem. 34]

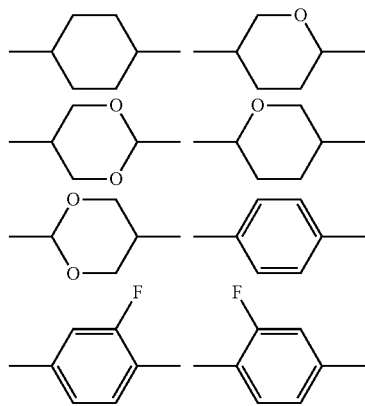

more preferably a trans-1,4-cyclohexylene or 1,4-phenylene group.

If the response rate is a high priority, $Z^{L1}$ and $Z^{L2}$ are preferably single bonds.

The compound(s) represented by general formula (L) preferably has no or one halogen atom in the molecule.

The compound(s) represented by general formula (L) is preferably compound(s) selected from the group of compounds represented by general formulae (L-3) to (L-8).

The compounds represented by general formula (L-3) are the following compounds.

[Chem. 35]

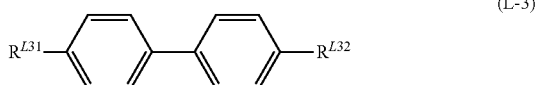

(L-3)

(In the formula, $R^{L31}$ and $R^{L32}$ each independently represent the same meaning as $R^{L1}$ and $R^{L2}$ in general formula (L).)

Each of $R^{L31}$ and $R^{L32}$ is preferably independently a C1-5 alkyl, C4-5 alkenyl, or C1-4 alkoxy group.

Those compounds represented by general formula (L-3) can be used alone but can also be used in a combination of two or more. Any two or more of the compounds can be combined, but compounds needed for the performance attributes required, such as solubility at low temperatures, transition temperature, electrical reliability, and birefringence, are used in combination. The number of kinds of compounds used is one, two, three, four, or five or more as an embodiment of the present invention by way of example.

The lower limit of preferred percentages of the compound(s) represented by general formula (L-3) to the total amount of the composition according to the present invention is 1% by mass, 2% by mass, 3% by mass, 5% by mass, 7% by mass, or 10% by mass. The upper limit of preferred percentages is 20% by mass, 15% by mass, 13% by mass, 10% by mass, 8% by mass, 7% by mass, 6% by mass, 5% by mass, or 3% by mass to the total amount of the composition according to the present invention.

To achieve a high birefringence, setting the percentage relatively large is highly effective. If a high $T_{NI}$ is a high priority, by contrast, setting the percentage relatively small is highly effective. To improve drop marks or image-sticking properties, it is preferred to set the range of percentages to a medium range.

The compounds represented by general formula (L-4) are the following compounds.

[Chem. 36]

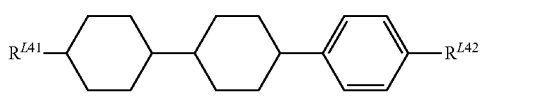

(L-4)

(In the formula, $R^{L41}$ and $R^{L42}$ each independently represent the same meaning as $R^{L1}$ and $R^{L2}$ in general formula (L).)

$R^{L41}$ is preferably a C1-5 alkyl or C2-5 alkenyl group, and $R^{L42}$ is preferably a C1-5 alkyl, C4-5 alkenyl, or C1-4 alkoxy group.)

Those compounds represented by general formula (L-4) can be used alone but can also be used in a combination of two or more. Any two or more of the compounds can be combined, but compounds needed for the performance attributes required, such as solubility at low temperatures, transition temperature, electrical reliability, and birefringence, are used in combination. The number of kinds of compounds used is one, two, three, four, or five or more as an embodiment of the present invention by way of example.

In the composition according to the present invention, the percentage of the compound(s) represented by general formula (L-4) needs to be adjusted as needed for the performance attributes required, such as solubility at low temperatures, transition temperature, electrical reliability, birefringence, process suitability, drop marks, image-sticking, and dielectric constant anisotropy.

The lower limit of preferred percentages of the compound(s) represented by general formula (L-4) to the total amount of the composition according to the present invention is 1% by mass, 2% by mass, 3% by mass, 5% by mass, 7% by mass, 10% by mass, 14% by mass, 16% by mass, 20% by mass, 23% by mass, 26% by mass, 30% by mass, 35% by mass, or 40% by mass. The upper limit of preferred percentages of the compound(s) represented by formula (L-4) to the total amount of the composition according to the present invention is 50% by mass, 40% by mass, 35% by mass, 30% by mass, 20% by mass, 15% by mass, 10% by mass, or 5% by mass.

The compounds represented by general formula (L-5) are the following compounds.

[Chem. 37]

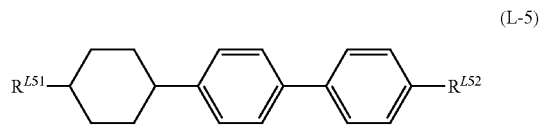

(L-5)

(In the formula, $R^{L51}$ and $R^{L52}$ each independently represent the same meaning as $R^{u}$ and $R^{L2}$ in general formula (L).)

$R^{L5}$ is preferably a C1-5 alkyl or C2-5 alkenyl group, and $R^{L52}$ is preferably a C1-5 alkyl, C4-5 alkenyl, or C1-4 alkoxy group.

Those compounds represented by general formula (L-5) can be used alone but can also be used in a combination of two or more. Any two or more of the compounds can be combined, but compounds needed for the performance attributes required, such as solubility at low temperatures, transition temperature, electrical reliability, and birefringence, are used in combination. The number of kinds of compounds used is one, two, three, four, or five or more as an embodiment of the present invention by way of example.

In the composition according to the present invention, the percentage of the compound(s) represented by general formula (L-5) needs to be adjusted as needed for the performance attributes required, such as solubility at low temperatures, transition temperature, electrical reliability, birefringence, process suitability, drop marks, image-sticking, and dielectric constant anisotropy.

The lower limit of preferred percentages of the compound(s) represented by general formula (L-5) to the total amount of the composition according to the present invention is 1% by mass, 2% by mass, 3% by mass, 5% by mass, 7% by mass, 10% by mass, 14% by mass, 16% by mass, 20% by mass, 23% by mass, 26% by mass, 30% by mass, 35% by mass, or 40% by mass. The upper limit of preferred percentages of the compound(s) represented by general formula (L-5) to the total amount of the composition according to the present invention is 50% by mass, 40% by mass, 35% by mass, 30% by mass, 20% by mass, 15% by mass, 10% by mass, or 5% by mass The compounds represented by general formula (L-6) are the following compounds.

[Chem. 38]

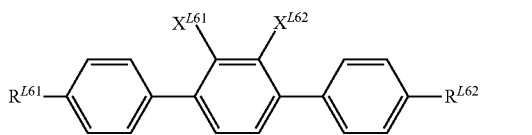

(L-6)

(In the formula, $R^{L61}$ and $R^{L62}$ each independently represent the same meaning as $R^{L1}$ and $R^{L2}$ in general formula (L), and $X^{L61}$ and $X^{L62}$ each independently represent a hydrogen or fluorine atom.)

Each of $R^{L61}$ and $R^{L62}$ is preferably independently a C1-5 alkyl or C2-5 alkenyl group. It is preferred that one of $X^{L61}$ and $X^{L62}$ be a fluorine atom with the other being a hydrogen atom.

Those compounds represented by general formula (L-6) can be used alone but can also be used in a combination of two or more. Any two or more of the compounds can be combined, but compounds needed for the performance attributes required, such as solubility at low temperatures, transition temperature, electrical reliability, and birefringence, are used in combination. The number of kinds of compounds used is one, two, three, four, or five or more as an embodiment of the present invention by way of example.

The lower limit of preferred percentages of the compound(s) represented by general formula (L-6) to the total amount of the composition according to the present invention is 1% by mass, 2% by mass, 3% by mass, 5% by mass, 7% by mass, 10% by mass, 14% by mass, 16% by mass, 20% by mass, 23% by mass, 26% by mass, 30% by mass, 35% by mass, or 40% by mass. The upper limit of preferred percentages of the compound(s) represented by general formula (L-6) to the total amount of the composition according to the present invention is 50% by mass, 40% by mass, 35% by mass, 30% by mass, 20% by mass, 15% by mass, 10% by mass, or 5% by mass. If emphasis is on increasing Δn, it is preferred to set the percentage large. If emphasis is on separation at low temperatures, it is preferred that the percentage be small.

The lower limit of preferred percentages of these compounds to the total amount of the composition according to the present invention is 1% by mass, 2% by mass, 3% by mass, 5% by mass, or 7% by mass. The upper limit of preferred percentages of these compounds is 20% by mass, 15% by mass, 13% by mass, 10% by mass, or 9% by mass.

The compounds represented by general formula (L-7) are the following compounds.

[Chem. 39]

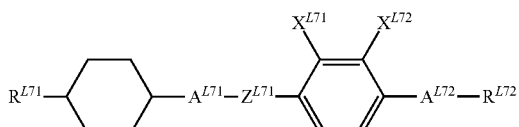

(L-7)

(In the formula, $R^{L71}$ and $R^{L72}$ each independently represent the same meaning as $R^{L1}$ and $R^{L2}$ in general formula (L), and $A^{L71}$ and $A^{L72}$ each independently represent the same meaning as $A^{L2}$ and $A^{L3}$ in general formula (L). The hydrogen atoms on $A^{L71}$ and $A^{L72}$ may each independently be substituted with a fluorine atom. $Z^{L7}$ represents the same meaning as $Z^{L2}$ in general formula (L), and $X^{L71}$ and $X^{L72}$ each independently represent a fluorine or hydrogen atom.)

In the formula, each of $R^{L71}$ and $R^{L72}$ is preferably independently a C1-5 alkyl, C2-5 alkenyl, or C1-4 alkoxy, and each of $A^{L71}$ and $A^{L72}$ is preferably independently a 1,4-cyclohexylene or 1,4-phenylene group. The hydrogen atoms on $A^{L71}$ and $A^{L72}$ may each independently be substituted with a fluorine atom. $Z^{L71}$ is preferably a single bond or COO—, preferably a single bond. $X^{L71}$ and $X^{L72}$ are preferably hydrogen atoms.

Any two or more such compounds can be combined, but compounds are combined in accordance with the performance attributes required, such as solubility at low temperatures, transition temperature, electrical reliability, and birefringence. The number of kinds of compounds used is one, two, three, or four as an embodiment of the present invention by way of example.

In the composition according to the present invention, the percentage of the compound(s) represented by general formula (L-7) needs to be adjusted as needed for the performance attributes required, such as solubility at low temperatures, transition temperature, electrical reliability, birefringence, process suitability, drop marks, image-sticking, and dielectric constant anisotropy.

The lower limit of preferred percentages of the compound(s) represented by general formula (L-7) to the total amount of the composition according to the present invention is 1% by mass, 2% by mass, 3% by mass, 5% by mass, 7% by mass, 10% by mass, 14% by mass, 16% by mass, or 20% by mass. The upper limit of preferred percentages of the compound(s) represented by general formula (L-7) to the total amount of the composition according to the present invention is 30% by mass, 25% by mass, 23% by mass, 20% by mass, 18% by mass, 15% by mass, 10% by mass, or 5% by mass.

If an embodiment with a high-$T_{NI}$ composition according to the present invention is desired, it is preferred to set the percentage of the compound(s) represented by formula (L-7) relatively large. If an embodiment with a low-viscosity composition according to the present invention is desired, it is preferred to set the percentage relatively small.

The compounds represented by general formula (L-8) are the following compounds.

[Chem. 40]

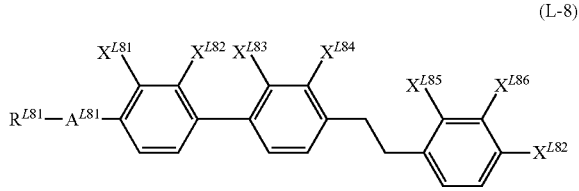

(L-8)

(In the formula, $R^{L81}$ and $R^{L82}$ each independently represent the same meaning as $R^{L1}$ and $R^{L2}$ in general formula (L), and $A^{L81}$ represents the same meaning as $A^{L1}$ in general formula (L) or a single bond. The hydrogen atoms on $A^{L81}$ may each independently substituted with a fluorine atom. $X^{L81}$ to $X^{L86}$ each independently represent a fluorine or hydrogen atom.)

In the formula, each of $R^{L81}$ and $R^{L82}$ is preferably independently a C1-5 alkyl, C2-5 alkenyl, or C1-4 alkoxy, and $A^{L81}$ is preferably a 1,4-cyclohexylene or 1,4-phenylene group. The hydrogen atoms on $A^{L71}$ and $A^{L72}$ may each independently be substituted with a fluorine atom. The number of fluorine atoms on each single ring structure in general formula (L-8) is preferably 0 or 1. The number of fluorine atoms in the molecule is preferably 0 or 1.

Any two or more such compounds can be combined, but compounds are combined in accordance with the performance attributes required, such as solubility at low temperatures, transition temperature, electrical reliability, and birefringence. The number of kinds of compounds used is one, two, three, or four as an embodiment of the present invention by way of example.

In the composition according to the present invention, the percentage of the compound(s) represented by general formula (L-8) needs to be adjusted as needed for the performance attributes required, such as solubility at low temperatures, transition temperature, electrical reliability, birefringence, process suitability, drop marks, image-sticking, and dielectric constant anisotropy.

The lower limit of preferred percentages of the compound(s) represented by general formula (L-8) to the total amount of the composition according to the present invention is 1% by mass, 2% by mass, 3% by mass, 5% by mass, 7% by mass, 10% by mass, 14% by mass, 16% by mass, or 20% by mass. The upper limit of preferred percentages of the compound(s) represented by general formula (L-8) to the total amount of the composition according to the present invention is 30% by mass, 25% by mass, 23% by mass, 20% by mass, 18% by mass, 15% by mass, 10% by mass, or 5% by mass.

If an embodiment with a high-$T_{NI}$ composition according to the present invention is desired, it is preferred to set the percentage of the compound(s) represented by formula (L-8) relatively large. If an embodiment with a low-viscosity composition according to the present invention is desired, it is preferred to set the percentage relatively small.

The lower limit of preferred total percentages of those compounds represented by general formula (i), (L), (N-1), (N-2), (N-3), and (J) to the total amount of the composition according to the present invention is 80% by mass, 85% by mass, 88% by mass, 90% by mass, 92% by mass, 93% by mass, 94% by mass, 95% by mass, 96% by mass, 97% by mass, 98% by mass, 99% by mass, or 100% by mass. The upper limit of preferred percentages is 100% by mass, 99% by mass, 98% by mass, or 95% by mass. To give the composition a large absolute Δε, however, it is preferred that the percentage of at least the compounds represented by general formula (N-1), those by formula (N-2), those by formula (N-3), or those by formula (J) be 0% by mass.

The lower limit of preferred total percentages of those compounds represented by general formulae (i), (L-1) to (L-7), (M-1) to (M-8), (N-1), . . . is 80% by mass, 85% by mass, 88% by mass, 90% by mass, 92% by mass, 93% by mass, 94% by mass, 95% by mass, 96% by mass, 97% by mass, 98% by mass, 99% by mass, or 100% by mass. The upper limit of preferred percentages is 100% by mass, 99% by mass, 98% by mass, or 95% by mass.

The composition according to the present invention preferably contains no compound that has a structure in which oxygen atoms are bound to each other, such as the peracid (—CO—OO—) structure, in the molecule.

If the reliability and long-term stability of the composition are high priorities, it is preferred that the percentage of compounds having a carbonyl group be 5% by mass or less, more preferably 3% by mass or less, even more preferably 1% by mass or less of the total mass of the composition. It is the most preferred that the composition contain substantially no such compounds.

If stability by UV irradiation is a high priority, it is preferred that the percentage of compounds substituted with chlorine atom(s) be 15% by mass or less, preferably 10% by mass or less, preferably 8% by mass or less, more preferably 5% by mass or less, preferably 3% by mass or less of the total mass of the composition. It is more preferred that the composition contain substantially no such compounds.

Preferably, the percentage of compounds whose ring structures in the molecule are all six-membered rings is large. It is preferred that the percentage of compounds whose ring structures in the molecule are all six-membered rings be 80% by mass or more, more preferably 90% by mass or more, even more preferably 95% by mass or more of the total mass of the composition. It is the most preferred that the composition be formed substantially only by compound(s) whose ring structures in the molecule are all six-membered rings.

To prevent oxidative deterioration of the composition, it is preferred that the percentage of compounds having a cyclohexenylene group as a ring structure be small. It is preferred that the percentage of compounds having a cyclohexenylene group be 10% by mass or less, preferably 8% by mass or less, more preferably 5% by mass or less, preferably 3% by mass or less of the total mass of the composition. It is even more preferred that the composition contain substantially no such compounds.

If improving viscosity and improving $T_{NI}$ are high priorities, it is preferred that the percentage of compounds having a 2-methylbenzen-1,4-diyl group, with or without hydrogen atom(s) substituted with a halogen, in the molecule be small. It is preferred that the percentage of compounds having such a 2-methylbenzen-1,4-diyl group in the molecule be 10% by mass or less, preferably 8% by mass or less, more preferably 5% by mass or less, preferably 3% by mass or less of the total mass of the composition. It is even more preferred that the composition contain substantially no such compounds.

Containing substantially no something herein means that the composition is free from it except for unintended contaminants.

If a compound contained in the composition according to the first embodiment of the present invention has a pendant alkenyl group and if the alkenyl group is bound to cyclohexane, the number of carbon atoms in the alkenyl group is preferably between 2 and 5. If the alkenyl group is bound to benzene, the number of carbon atoms in the alkenyl group is preferably 4 or 5, and it is preferred that the unsaturated bond of the alkenyl group be not directly bound to the benzene.

The average elastic modulus ($K_{AVG}$) of a liquid crystal composition used in the present invention is preferably between 10 and 25. The lower limit is preferably 10, preferably 10.5, preferably 11, preferably 11.5, preferably 12, preferably 12.3, preferably 12.5, preferably 12.8, preferably 13, preferably 13.3, preferably 13.5, preferably 13.8, preferably 14, preferably 14.3, preferably 14.5, preferably 14.8, preferably 15, preferably 15.3, preferably 15.5, preferably 15.8, preferably 16, preferably 16.3, preferably 16.5, preferably 16.8, preferably 17, preferably 17.3, preferably 17.5, preferably 17.8, preferably 18. The upper limit is preferably 25, preferably 24.5, preferably 24, preferably 23.5, preferably 23, preferably 22.8, preferably 22.5, preferably 22.3, preferably 22, preferably 21.8, preferably 21.5, preferably 21.3, preferably 21, preferably 20.8, preferably 20.5, preferably 20.3, preferably 20, preferably 19.8, preferably 19.5, preferably 19.3, preferably 19, preferably 18.8, preferably 18.5, preferably 18.3, preferably 18, preferably 17.8, preferably 17.5, preferably 17.3, preferably 17. If cutting power consumption is a high priority, reducing the intensity of the backlight is effective, and, when it comes to the liquid crystal display element, it is preferred to improve its optical transmittance. For this to be possible, it is preferred to set the value of $K_{AVG}$ relatively low. If improving the response rate is a high priority, it is preferred to set the value of $K_{AVG}$ relatively high.

The composition according to the present invention may contain a polymerizable compound so that a PS-, PSA-, NPS-, transverse field PSA-, or transverse field PSVA-mode liquid crystal display element, for example, can be produced therewith. The polymerizable compound used can be, for example, a photopolymerizable monomer, which polymerizes when exposed to light or any other type of radiation. An exemplary structure is that of a polymerizable compound that has a liquid crystal skeleton formed by multiple six-membered rings, for example of a biphenyl derivative or terphenyl derivative, linked together. More specifically, those bifunctional monomers represented by general formula (XX)

[Chem. 41]

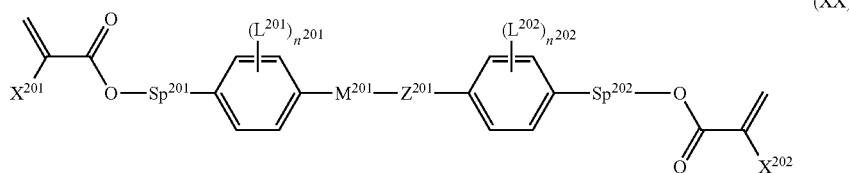

(XX)

(where $X^{201}$ and $X^{202}$ each independently represent a hydrogen atom or methyl group, and each of $Sp^{201}$ and $Sp^{202}$ is preferably independently a single bond, a C1-8 alkylene group, or —O—$(CH_2)_s$— (where s represents an integer of 2 to 7, and the oxygen atom binds to an aromatic ring), $Z^{201}$ represents —$OCH_2$—, —$CH_2O$—, —COO—, —OCO—, —$CF_2O$—, —$OCF_2$—, —$CH_2CH_2$—, —$CF_2CF_2$—, —CH=CH—COO—, —CH=CH—OCO—, —COO—CH=CH—, —OCO—CH=CH—, —COO—$CH_2CH_2$—, —OCO—$CH_2CH_2$—, —$CH_2CH_2$—COO—, —$CH_2CH_2$—OCO—, —COO—$CH_2$—, —OCO—$CH_2$—, —$CH_2$—COO—, —$CH_2$—OCO—, —$CY^1$=$CY^2$— (where $Y^1$ and $Y^2$ each independently represent a fluorine or hydrogen atom.), —C≡C—, or a single bond, each of $L^{201}$ and $L^{202}$ is independently a fluorine atom, C1-8 alkyl group, or C1-8 alkoxy group, and $M^{201}$ represents a 1,4-phenylene group, trans-1,4-cyclohexylene group, or single bond, all 1,4-phenylene groups in the formula may have any of their hydrogen atoms substituted with a fluorine atom, C1-8 alkyl group, or C1-8 alkoxy group, and each of n201 and n202 is independently an integer of 0 to 4.) are preferred.

For $X^{201}$ and $X^{202}$, it is preferred that both represent hydrogen atoms to form a diacrylate derivative, and it is also preferred that both represent methyl groups to form a dimethacrylate derivative. Even those compounds with one of $X^{201}$ and $X^{202}$ representing a hydrogen atom and the other representing a methyl group are preferred. The diacrylate derivatives polymerize the fastest of these forms of compounds, the dimethacrylate derivatives polymerize slowly, and the rate of polymerization of the asymmetric compounds is intermediate therebetween. The manufacturer can use a form preferred for the intended purpose of use. For PSA display elements, dimethacrylate derivatives are particularly preferred.

$Sp^{201}$ and $Sp^{202}$ each independently represent a single bond, C1-8 alkylene group, or —O—$(CH_2)_s$—. For PSA display elements, it is preferred that at least one of $Sp^{201}$ and $Sp^{202}$ be a single bond, or that the polymerizable compound be a compound in which both represent single bonds or in the form in which one is a single bond and the other represents a C1-8 alkylene group or —O—$(CH_2)_s$—. In this case, 1-4 alkyl groups are preferred, and s is preferably between 1 and 4.

$Z^{201}$ is preferably —$OCH_2$—, —$CH_2O$—, —COO—, —OCO—, —$CF_2O$—, —$OCF_2$—, —$CH_2CH_2$—, —$CF_2CF_2$—, or a single bond, more preferably —COO—, —OCO—, or a single bond, in particular a single bond.

$M^{201}$ represents a 1,4-phenylene group that may have any of its hydrogen atoms substituted with a fluorine atom, a trans-1,4-cyclohexylene group, or a single bond, but preferably is a 1,4-phenylene group or single bond. If C represents not a single bond but a ring structure, it is even preferred that $Z^{201}$ be not a single bond but a linking group. If $M^{201}$ is a single bond, $Z^{201}$ is preferably a single bond.

In these lights, preferred ring structures between $Sp^{201}$ and $Sp^{202}$ in general formula (XX) can be specifically described as follows.

If in general formula (XX) $M^{201}$ represents a single bond so that the ring structure is formed by two rings, the ring structure preferably represents any of formulae (XXa-1) to (XXa-5) below, more preferably any of formulae (XXa-1) to (XXa-3), in particular formula (XXa-1).

[Chem. 42]

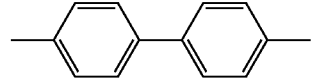

(XXa-1)

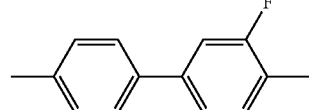

(XXa-2)

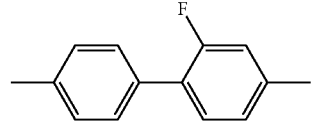

(XXa-3)

-continued (XXa-4)

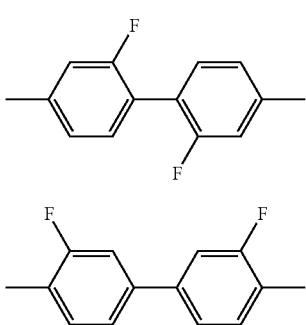

(XXa-5)

(In the formulae, each end binds to $Sp^{201}$ or $Sp^{202}$.)

Once polymerized, polymerizable compounds having such a skeleton provide an anchoring strength ideal for PSA liquid crystal display elements and ensure a good alignment. With such a polymerizable compound, therefore, display unevenness is limited or completely eliminated.

For use as the polymerizable monomer, therefore, general formula (XX-1) to (XX-4) are particularly preferred. In particular, general formula (XX-2) is the most preferred.

[Chem. 43]

(XX-1)

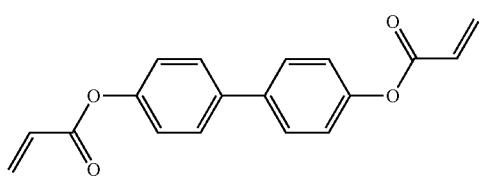

(XX-2)

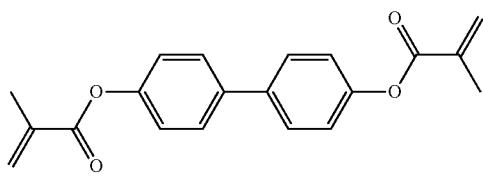

(XX-3)

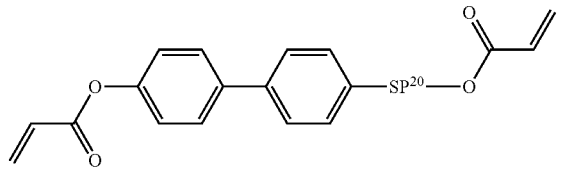

(XX-4)

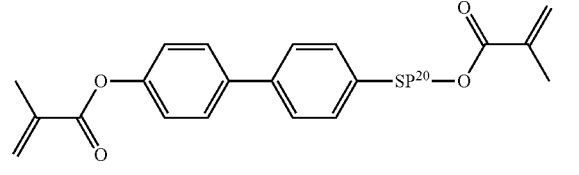

(In the formulae, the benzenes may be substituted with a fluorine atom, and $Sp^{20}$ represents a C2-5 alkylene group.)

The amount of a polymerizable compound in the composition according to the present invention is preferably between 0.01% by mass and 5% by mass, preferably between 0.05% by mass and 3% by mass, preferably between 0.1% by mass and 2% by mass.

A monomer added to the composition according to the present invention polymerizes even if there is no polymerization initiator, but the composition may contain a polymerization initiator to promote the polymerization. The polymerization initiator can be, for example, a benzoin ether, benzophenone, acetophenone, benzil ketal, or acylphosphine oxide.

As mentioned above, a liquid crystal display element according to the present invention may have alignment layer(s) 4. It is, however, preferred to avoid using alignment layers because it makes the liquid crystal display element easier to produce. The liquid crystal in such a case can instead be aligned by adding an agent for spontaneous alignment to the liquid crystal composition forming the liquid crystal layer according to the present invention to make the liquid crystal self-aligning without an alignment film, by using an aligned polyimide that is soluble in solvent, or by using photoalignment film(s), in particular non-polyimide photoalignment film(s).

The liquid crystal composition according to the present invention preferably contains an agent for spontaneous alignment. The agent for spontaneous alignment controls the direction of orientation of liquid crystal molecules contained in the liquid crystal composition forming the liquid crystal layer, presumably by gathering or becoming adsorbed on the interfaces of the liquid crystal layers. If the liquid crystal composition contains an agent for spontaneous alignment, therefore, the liquid crystal panel needs no alignment layer.

The amount of an agent for spontaneous alignment in the liquid crystal composition according to the present invention is preferably between 0.1% and 10% by mass of all liquid crystal composition. In the liquid crystal composition according to the present invention, an agent for spontaneous alignment may be used in combination with the aforementioned polymerizable compound.

The agent for spontaneous alignment has a polar group and a mesogenic group, preferably with any necessary polymerizable group.

The mesogenic group refers to a group capable of inducing the behavior of a liquid crystal phase, but a surface-modifying compound containing a mesogenic group itself does not need to exhibit a liquid crystal phase. In other words, "a mesogenic group" is a group that tends to induce structural order, and typically is a group that contains a firm moiety, such as an aromatic ring or other cyclic group. Additionally, the term "liquid crystal phase" as used here refers to a phase that has both the fluidity of liquids and anisotropy of crystals, and examples include a nematic liquid crystal, a smectic liquid crystal, and a cholesteric liquid crystal.

The mesogenic group in a surface-modifying compound according to the present invention and the molecule of the surface-modifying compound can be in any shape. Examples include rod-like, disk-like, banana-like, letter L, and letter T shapes and inclusion host structures, such as that of cyclodextrins, calixarenes, and cucurbiturils, but more preferably, they have shapes in which they can induce the behavior of a liquid crystal phase.

The polymerizable group is preferably represented by any of general formulae (P-1) to (P-15), which are given hereinafter.

The polar group is preferably an atomic group of a polar (charge-separated) element having a heteroatom, preferably an atomic group of a polar element having N, O, S, P, B, Si, or any similar heteroatom in its structure. A polar group according to the present invention may be a cyclic atomic group that includes a polar element having a heteroatom or a linear or branched atomic group that includes a polar element having a heteroatom.

A polar group according to the present invention may have a heteroatom-containing polar element of any valency, e.g., monovalent, divalent, or trivalent, and may have any number of polar elements having a heteroatom. Specifically, it is preferred that the polar element having a heteroatom be a moiety represented by a nitrogen-containing group; a cyano (—CN), primary amino (—NH$_2$), secondary amino (—NH—), tertiary amino (—NRR'; R and R' are alkyl groups), or pyridyl group, an oxygen-containing group; a hydroxyl (—OH), alkoxy (—OR; R is an alkyl group), formyl (—CHO), carboxyl (—COOH), ether (—R$^{a'}$OR$^{a''}$—; R$^{a'}$ and R$^{a''}$ are alkylene or alkenylene groups), ketone (—R$^{a'}$C(=O)R$^{a''}$—; R$^{a'}$ and R$^{a''}$ are alkylene or alkenylene groups), carbonate (—O—C(=O)—O—), alkoxy (alkenyloxy) carbonyl (—COOR"—; R" is an alkylene or alkenylene group), carbamoyl (—CONH$_2$), or ureido (—NHCONH$_2$) group, a phosphorus-containing group; a phosphinyl (—P(=O)H$_2$) or phosphoric acid (—OP(=O) (OH)$_2$) group; a boron-containing group; a boric acid group (—B(OH)$_2$), a sulfur-containing group; a mercapto (—SH), sulfide (—S—), sulfinyl (—S(=O)—), sulfonyl (—SO$_2$—), sulfonamide (—SO$_2$NH$_2$), sulfonic acid (—SO$_3$H), or sulfino (—S(=O)OH) group.

The agent(s) for spontaneous alignment is preferably general formula (a1-1) and/or general formula (a1-2) below.

[Chem. 44]

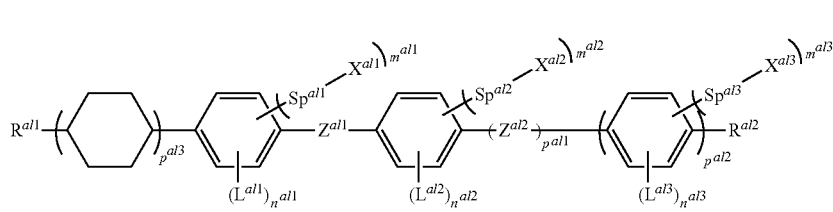

(a1-1)

(In the formula, R$^{a11}$, R$^{a12}$, Z$^{a11}$, Z$^{a12}$, L$^{a11}$, L$^{a12}$, L$^{a13}$, Sp$^{a11}$, Sp$^{a12}$, Sp$^{a13}$, X$^{a11}$, X$^{a13}$, m$^{a11}$, m$^{a12}$, m$^{a13}$, n$^{a11}$, n$^{a12}$, n$^{a13}$, p$^{a11}$, p$^{a12}$, and p$^{a13}$ are each independently:

R$^{a11}$ indicates a hydrogen atom, halogen, or linear, branched, or cyclic C1-20 alkyl, one or nonadjacent two or more CH$_2$ groups in the alkyl group may be substituted with —O—, —S—, —CO—, —CO—O—, —O—CO—, or —O—CO—O— unless O and/or S atoms directly bond together, and one or two or more hydrogen atoms in the alkyl group may be substituted with F or Cl;

R$^{a12}$ represents a group that includes any of the moieties given below;

[Chem. 45]

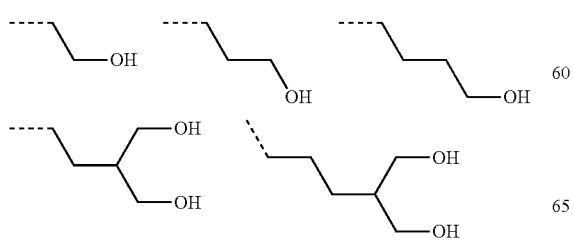

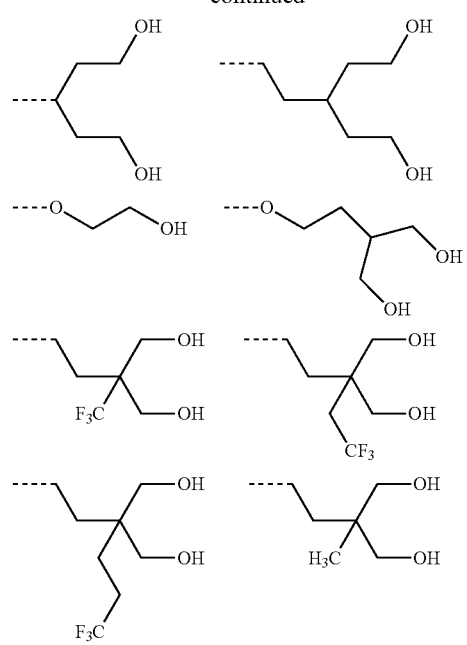

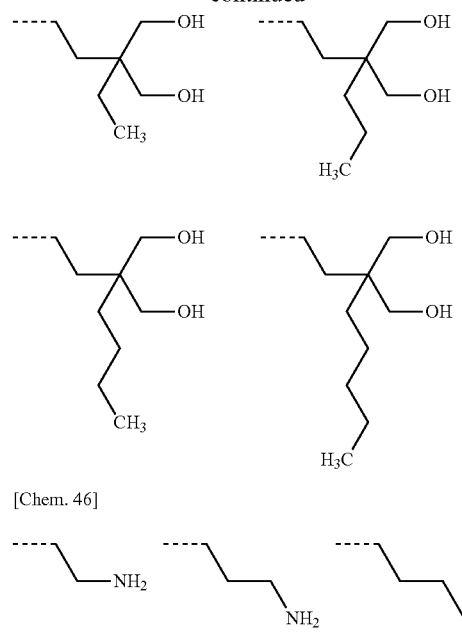

[Chem. 46]

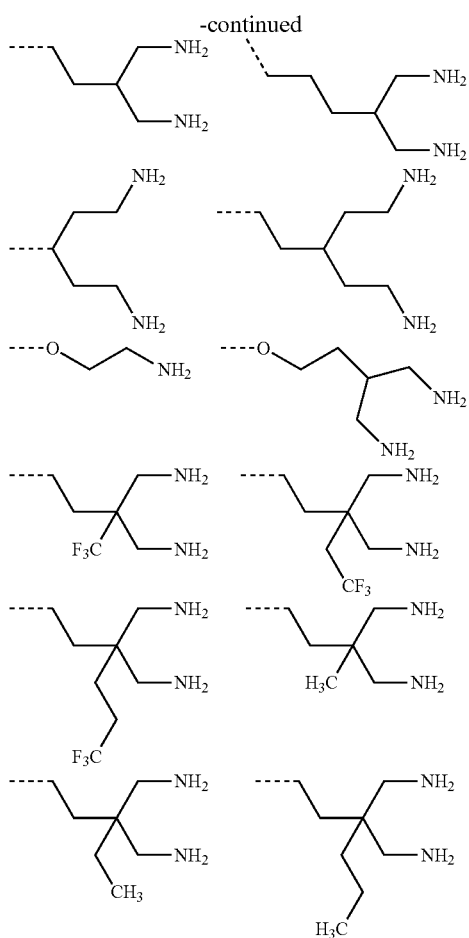

Sp$^{a11}$, Sp$^{a12}$, and Sp$^{a13}$ each independently represent a C1-12 alkyl group or single bond;

X$^{a11}$, X$^{a12}$, and X$^{a13}$ each independently indicate an alkyl, acryl, methacryl, or vinyl group;

Z$^{a11}$ indicates —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_n{}^{a1}$—, —CF$_2$CH$_2$—, —CH$_2$CF$_2$—, —(CF$_2$)$_n{}^{a1}$—, —CH═CH—, —CF═CF—, —C≡C—, —CH═CH—COO—, —OCO—CH═CH—, —(CR$^{a13}$R$^{a14}$)$_n{}^{a1}$—, —CH(—Sp$^{a11}$-X$^{a11}$)—, —CH$_2$CH(—Sp$^{a11}$-X$^{a11}$)—, or —CH(—Sp$^{a11}$-X$^{a11}$)CH(—Sp$^{a11}$-X$^{a11}$)—;

Z$^{a12}$ each independently indicates a single bond, —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)n1-, —CF$_2$CH$_2$—, —CH$_2$CF$_2$—, —(CF$_2$)$_{na1}$—, —CH═CH—, —CF═CF—, —C≡C—, —CH═CH—COO—, —OCO—CH═CH—, —(CR$^{a13}$R$^{a14}$)$_{na1}$—, —CH(—Sp$^{a11}$-X$^{a11}$)—, —CH$_2$CH(—Sp$^{a11}$-X$^{a11}$)—, or —CH(—Sp$^{a11}$-X$^{a11}$)CH(—Sp$^{a11}$-X$^{a11}$)—;

L$^{a11}$, L$^{a12}$, and L$^{a13}$ each independently represent a hydrogen atom, fluorine atom, chlorine atom, bromine atom, iodine atom, —CN, —NO$_2$, —NCO, —NCS, —OCN, —SCN, —C(═O)N(R$^{a13}$)$_2$, —C(═O)R$^{a13}$, optionally substituted C3-15 silyl group, optionally substituted aryl or cycloalkyl group, or one to twenty five carbon atoms, with the proviso that one or two or more hydrogen atoms may be substituted with a halogen atom (fluorine or chlorine atom);

R$^{a13}$ represents a C1-12 alkyl group, R$^{a14}$ represents a hydrogen atom or C1-12 alkyl group, and n$^{a1}$ represents an integer of 1 to 4; and p$^{a11}$, p$^{a12}$, and p$^{a13}$ each independently represent 0 or 1, m$^{a11}$, m$^{a12}$, and m$^{a13}$ each independently represent an integer of 0 to 3, and n$^{a11}$, n$^{a12}$, and n$^{a13}$ each independently represent an integer of 0 to 3.)

General formula (Al-2):

[Chem. 47]

$$R^{al21}\!-\!(\!A^{al21}\!-\!Z^{i2}\!)_{\overline{m}\,iii2}\!-\!G^{i1}\!-\!(\!(\!A^{al22}\!-\!Z^{i1}\!)_{\overline{m}\,iii1}\!-\!K^{i1})_{m\,iii3} \quad (al\text{-}2)$$

(In the formula, Z$^{i1}$ and Z$^{i2}$ each independently represent a single bond, —CH═CH—, —CF═CF—, —C≡C—, —COO—, —OCO—, —OCOO—, —OOCO—, —CF$_2$O—, —OCF$_2$—, —CH═CHCOO—, —OCOCH═CH—, —CH$_2$—CH$_2$COO—, —OCOCH$_2$—CH$_2$—, —CH═C(CH$_3$)COO—, —OCOC(CH$_3$)═CH—, —CH$_2$—CH(CH$_1$)COO—, —OCOCH(CH$_3$)—CH$_2$—, —OCH$_2$CH$_2$O— or a C2-20 alkylene group, and one or nonadjacent two or more —CH$_2$— in this alkylene group may be substituted with —O—, —COO—, or —OCO—, with the proviso that if K$^{i1}$ is (K-11), the mesogenic group includes at least one of —CH$_2$—CH$_2$COO—, —OCOCH$_2$—CH$_2$—, —CH═C(CH$_3$)COO—, —OCOC(CH$_3$)═CH—, —CH$_2$—CH(CH$_3$)COO—, —OCOCH(CH$_3$)—CH$_2$—, and —OCH$_2$CH$_2$O—, A$^{a121}$ and A$^{a122}$ each independently represent a divalent six-membered aromatic or divalent six-membered aliphatic ring, but it is preferred that each of them be a divalent unsubstituted six-membered aromatic ring, divalent unsubstituted aliphatic ring, or any of these ring structures with hydrogen atom(s) unsubstituted or substituted with a C1-6 alkyl group, C1-6 alkoxy group, or halogen atom, preferably a divalent unsubstituted six-membered aromatic ring or this ring structure with hydrogen atom(s) substituted with a fluorine atom or a divalent unsubstituted six-membered aliphatic ring, preferably a 1,4-phenylene, 2,6-naphthalene, or 1,4-cyclohexyl group, whether or not hydrogen atom(s) on the substituent is substituted with a halogen atom, alkyl group, or alkoxy group, with the proviso that at least one of the substituents is substituted with P$^{i1}$-Sp$^{i1}$-, for Z$^{i1}$, A$^{a121}$, and A$^{a122}$, multiple groups may be the same or different, Sp$^{i1}$ preferably represents a linear C1-18 alkylene group or single bond, more preferably a linear C2-15 alkylene group or single bond, even more preferably a linear C3-12 alkylene group or single bond, and R$^{a121}$ represents a hydrogen atom, linear or branched C1-20 alkyl group, halogenated alkyl group, or P$^{i1}$-Sp$^{i1}$-, preferably with —CH$_2$— in the alkyl group being —O—, —OCO—, or —COO— (with no —O— groups at adjacent positions), more preferably represents a hydrogen atom, linear or branched C1-18 alkyl group, or P$^{i1}$—Sp$^{i1}$-, with —CH$_2$— in the alkyl group being —O— or —OCO— (with no —O— groups at adjacent positions).

K$^{i1}$ represents a substituent represented by any of general formula (K-1) to (K-11) below,

[Chem. 48]

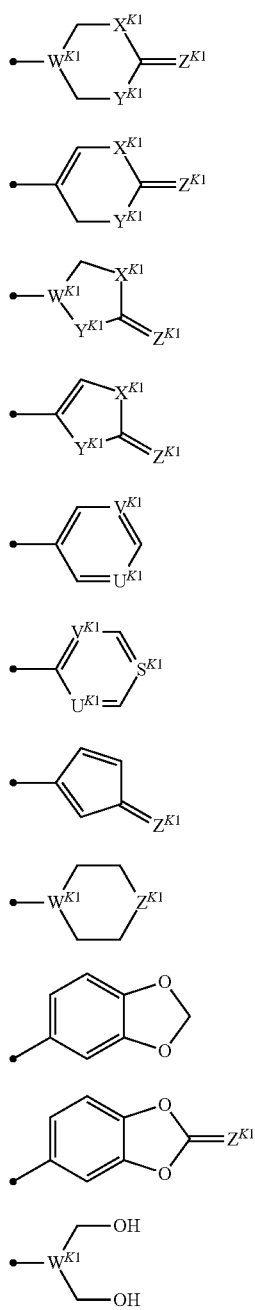

(K-1)
(K-2)
(K-3)
(K-4)
(K-5)
(K-6)
(K-7)
(K-8)
(K-9)
(K-10)
(K-11)

$P^{i1}$ represents a polymerizable group and represents a substituent selected from the group represented by general formulae (P-1) to (P-15) below (where the black dot farthest to the right represents a bond.),

[Chem. 49]

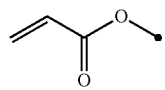 (P-1)

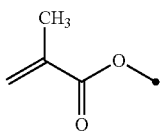 (P-2)

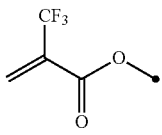 (P-3)

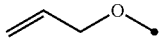 (P-4)

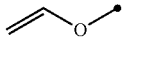 (P-5)

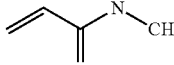 (P-6)

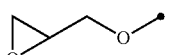 (P-7)

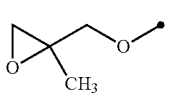 (P-8)

 (P-9)

 (P-10)

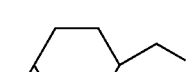 (P-11)

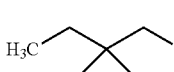 (P-12)

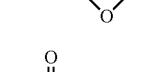 (P-13)

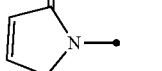 (P-14)

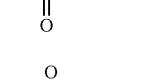 (P-15)

multiple $Z^{i1}$s, $Z^{i2}$s, $A^{a121}$s, $m^{iii1}$s, and/or $A^{a122}$s may be the same or different, with the proviso that one of $A^{i1}$s and $A^{i2}$s is substituted with at least one $P^{i1}$—$Sp^{i1}$- and that if $K^{i1}$ is (K-11), $Z^{ii1}$s include at least one of —$CH_2$—$CH_2COO$—, —OCOCH$_2$—CH$_2$—, —CH$_2$—CH(CH$_3$)COO—, —OCOCH(CH$_3$)—CH$_2$—, and —OCH$_2$CH$_2$O—, m$^{iii1}$ represents an integer of 1 to 5, m$^{iii2}$ represents an integer of 1 to 5, G$^{i1}$ represents a divalent, trivalent, or tetravalent branched structure or divalent, trivalent, or tetravalent aliphatic or aromatic ring structure, and m$^{iii3}$ represents an integer smaller by 1 than the valency of G$^{i1}$.)

More preferably, the agent according to the present invention for simultaneous alignment is a compound represented by general formula (a1-1-1) below.

[Chem. 50]

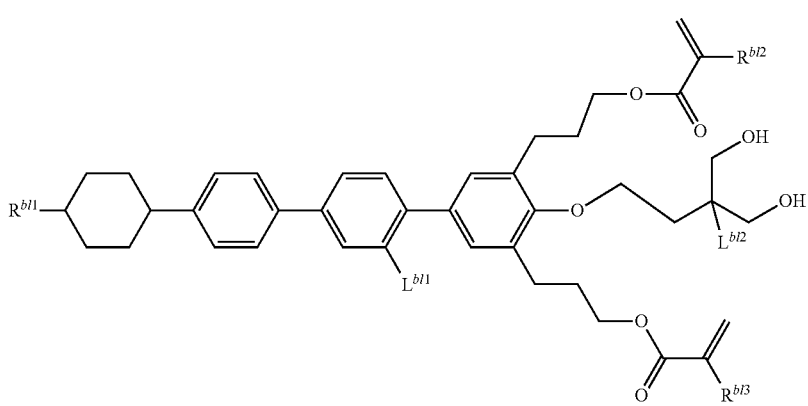

(a1-1-1)

(In the formula, R$^{b11}$ represents a linear C1-12 alkyl group, R$^{b12}$ and R$^{b13}$ each independently represent a hydrogen atom or linear C1-3 alkyl group, and L$^{b11}$ and L$^{b11}$ each independently represent a hydrogen atom or linear C1-7 alkyl group.)

An alternative means for eliminating alignment layers from the liquid crystal panel is, for example, to add a polymerizable compound to the liquid crystal composition, pour the liquid crystal composition between the first and second substrates with the liquid crystal composition at Tni or a higher temperature, and irradiating the liquid crystal composition, containing a polymerizable compound, with UV to cure the polymerizable compound.

The composition according to the present invention may further contain a compound represented by general formula (Q).

[Chem. 51]

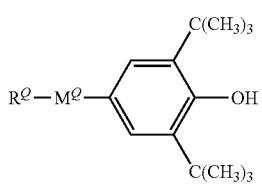

(Q)

(In the formula, R$^Q$ represents linear or branched C1-22 alkyl group, one or two or more CH$_2$ groups in the alkyl group may be substituted with —O—, —CH=CH—, —CO—, —OCO—, —COO—, —C≡C—, —CF$_2$O—, or —OCF$_2$— with no oxygen atoms at directly adjacent positions, and M$^4$ represents a trans-1,4-cyclohexylene group, 1,4-phenylene group, or single bond.)

R$^Q$ represents linear or branched C1-22 alkyl group, and one or two or more CH$_2$ groups in the alkyl group may be substituted with —O—, —CH=CH—, —CO—, —OCO—, —COO—, —C≡C—, —CF$_2$O—, or —OCF$_2$— with no oxygen atoms at directly adjacent positions. Preferably, R$^Q$ is a linear C1-10 alkyl or alkoxy group, linear C1-10 alkyl group with —OCO— or —COO— in place of a CH$_2$ group, branched C1-10 alkyl or alkoxy group, or branched C1-10 alkyl group with —OCO— or —COO— in place of a CH$_2$ group, more preferably a linear C1-20 alkyl group, linear C1-20 alkyl group with —OCO— or —COO— in place of a CH$_2$ group, branched C1-20 alkyl or alkoxy group, or branched C1-20 alkyl group with —OCO— or —COO— in place of a CH$_2$ group. M$^Q$ represents a trans-1,4-cyclohexylene group, 1,4-phenylene group, or single bond, but preferably is a trans-1,4-cyclohexylene or 1,4-phenylene group.

More specifically, it is preferred that the compound represented by general formula (Q) be a compound represented by any of general formulae (Q-a) to (Q-d) below.

[Chem. 52]

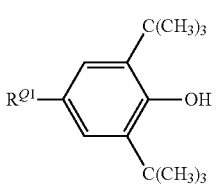

(Q-a)

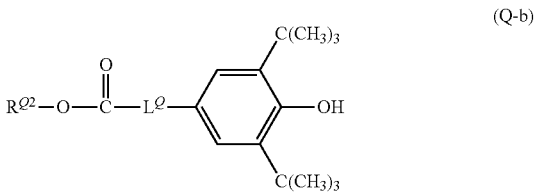

(Q-b)

-continued (Q-c)
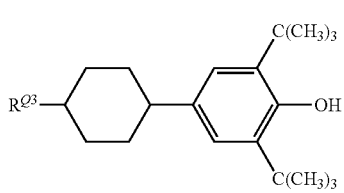

(Q-d)
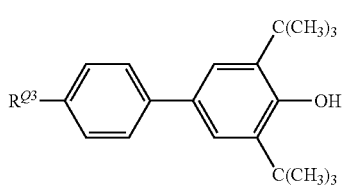

In the formulae, $R^{Q1}$ is preferably a linear or branched C1-10 alkyl group, $R^{Q2}$ is preferably a linear or branched C1-20 alkyl group, $R^{Q3}$ is preferably a linear or branched C1-8 alkyl group or linear or branched C1-8 alkoxy group, and $L^Q$ is preferably a linear or branched C1-8 alkylene group. Of those compounds represented by general formulae (Q-a) to (Q-d), those represented by general formulae (Q-c) and (Q-d) are more preferred.

The composition according to the present invention preferably contains one or two, more preferably one to five, compounds represented by general formula (Q). The amount of the compound(s) is preferably between 0.001% and 1% by mass, more preferably between 0.001 and 0.1% by mass, in particular between 0.001% and 0.05% by mass.

More specifically, for use as antioxidants or photostabilizers in the present invention, those compounds represented by (III-1) to (III-38) below are preferred.

[Chem. 53]

(III-1)
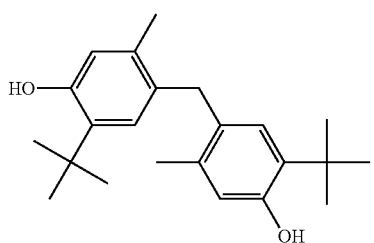

(III-2)
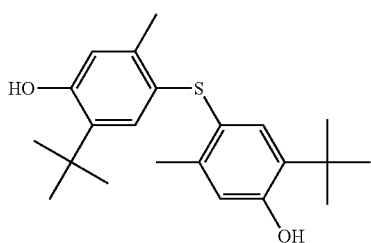

(III-3)
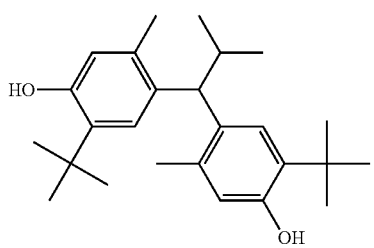

(III-4)
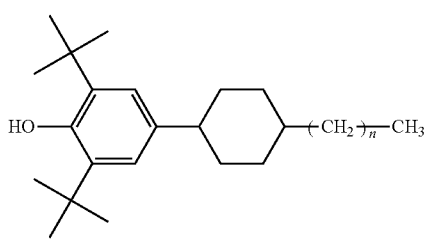

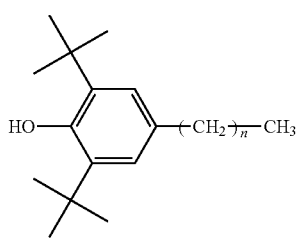
(III-5)

[Chem. 54]

(III-6)
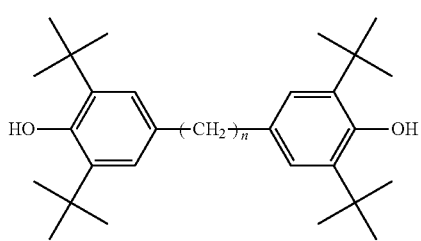

(III-7)
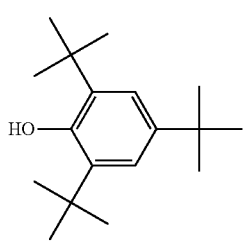

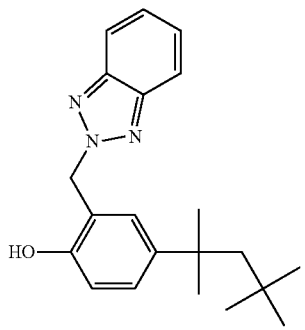
(III-8)
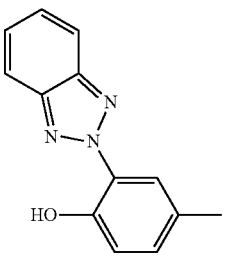
(III-9)
(III-10)
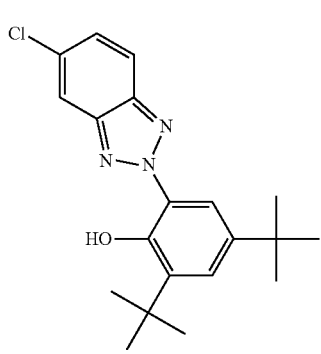
[Chem. 55]
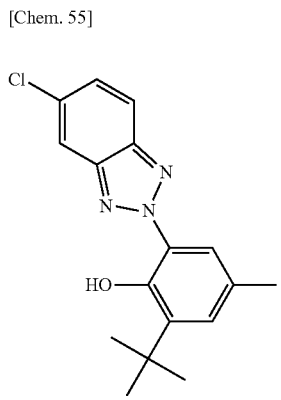
(III-11)
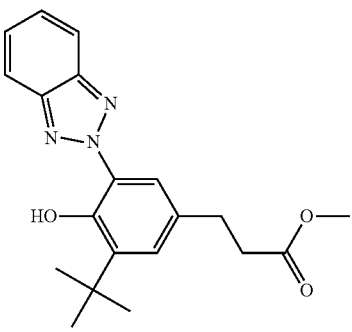
(III-12)
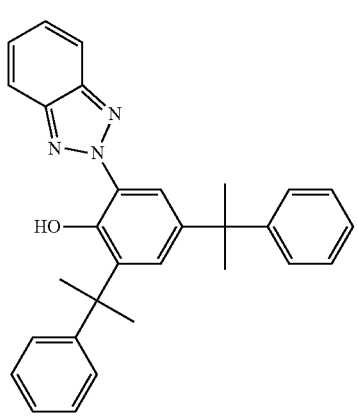
(III-13)
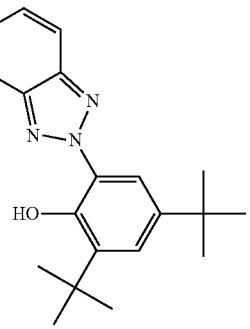
(III-14)

-continued
(III-15)
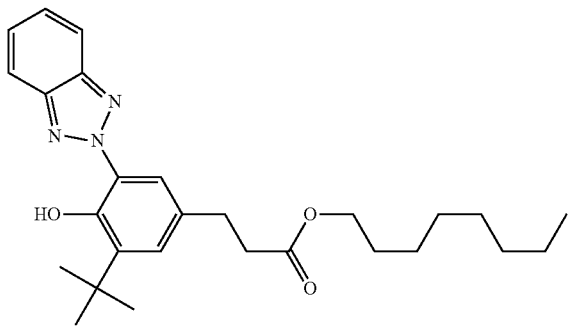
[Chem. 56]
(III-16)
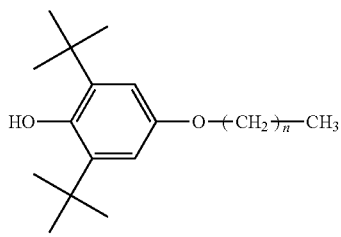
(III-17)
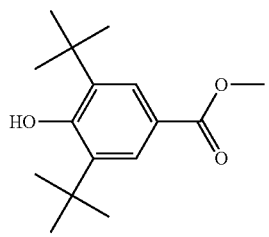
(III-18)
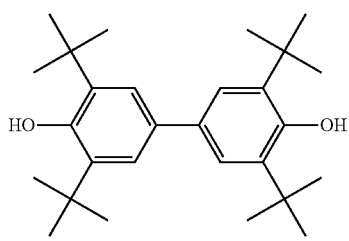
(III-19)
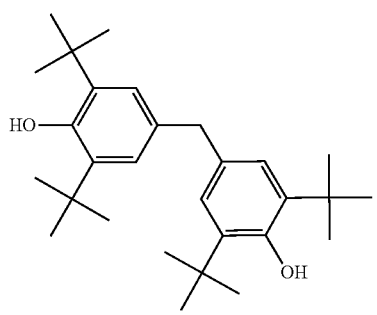
(III-20)
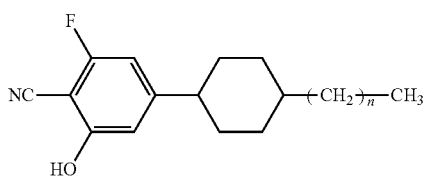
[Chem. 57]
(III-21)
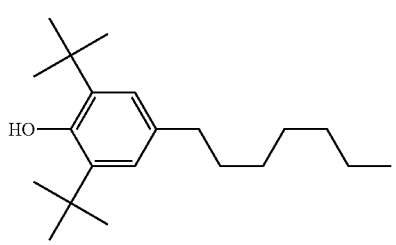
(III-22)
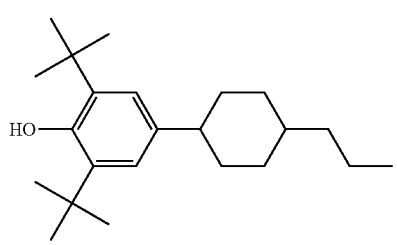
(III-23)
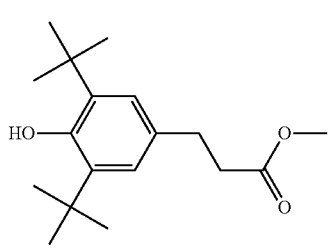
(III-24)
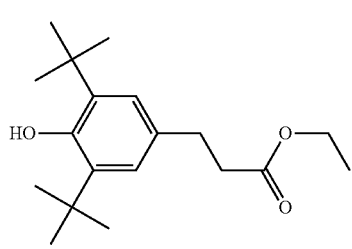

-continued
(III-25)
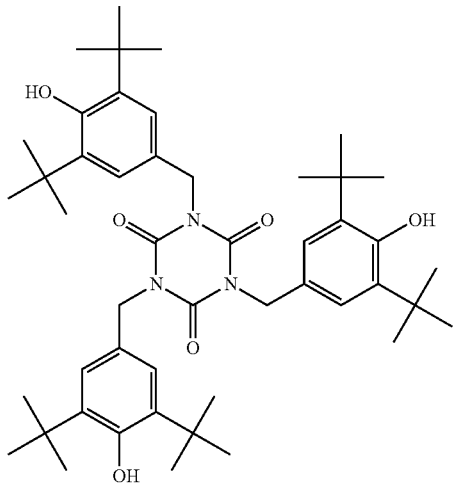
[Chem. 58]
(III-26)
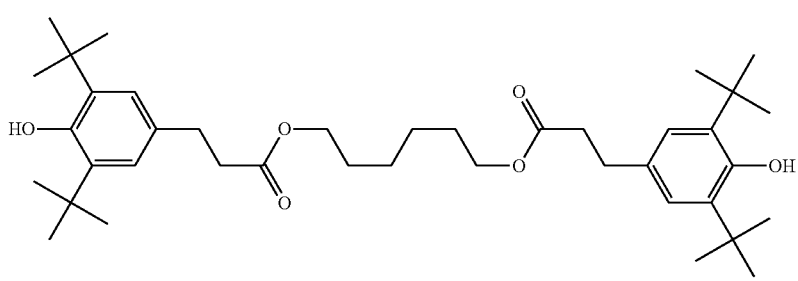
(III-27)
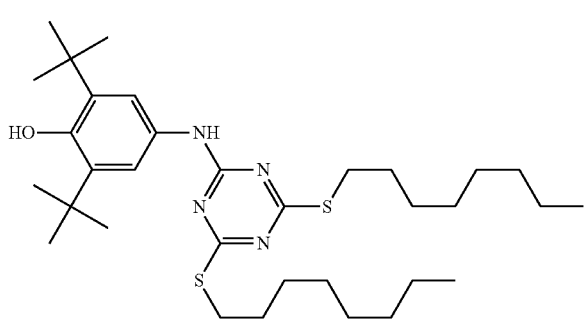
(III-28)
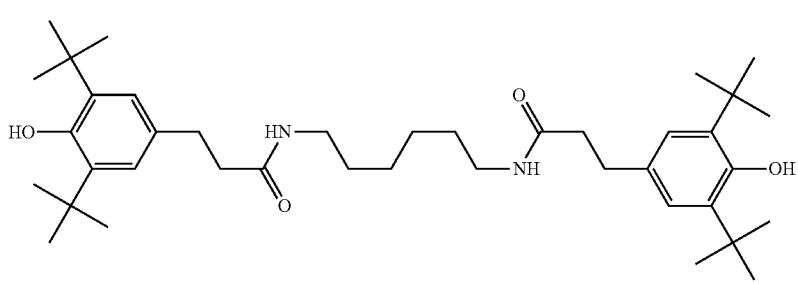
(III-29)
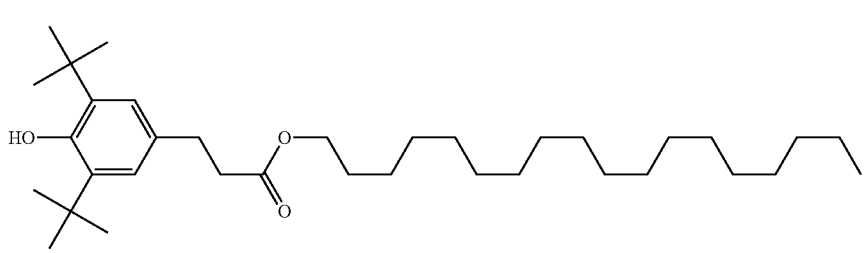

-continued
(III-30)
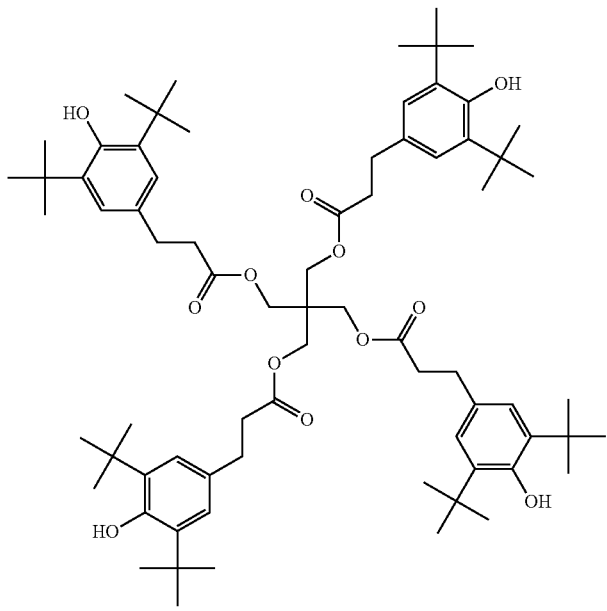
[Chem. 59]
(III-31)
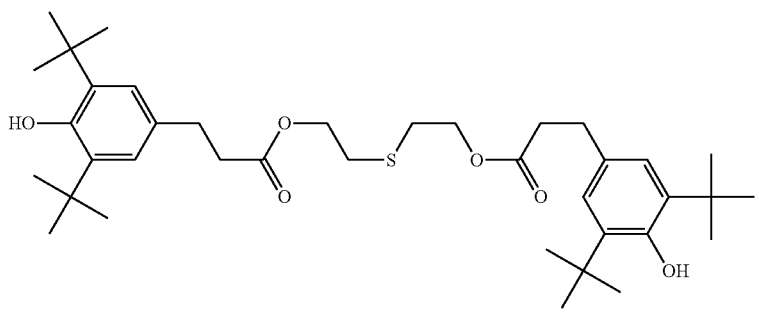
(III-32)
(III-33)
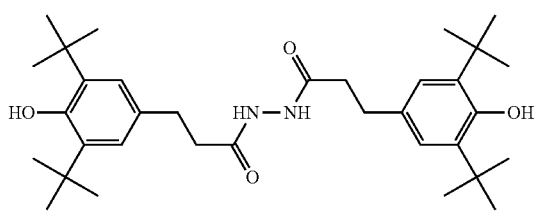
(III-34)
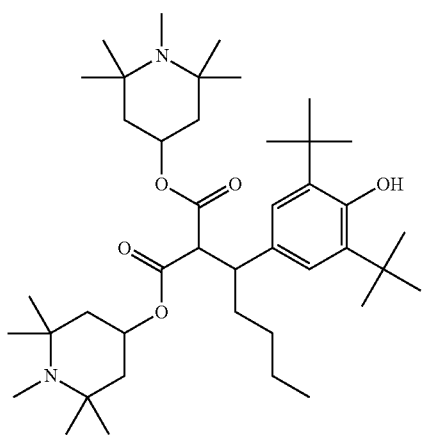

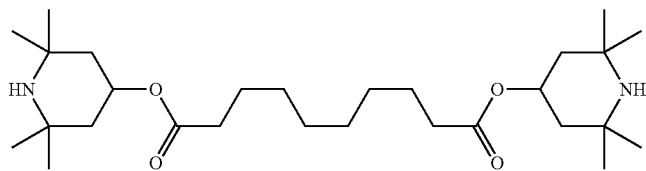

(III-35)

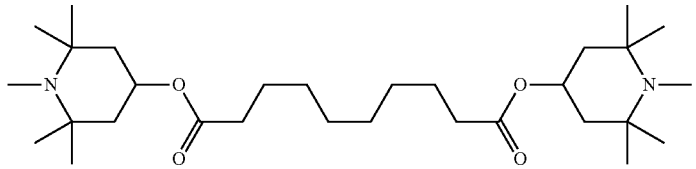

(III-36)

[Chem. 60]

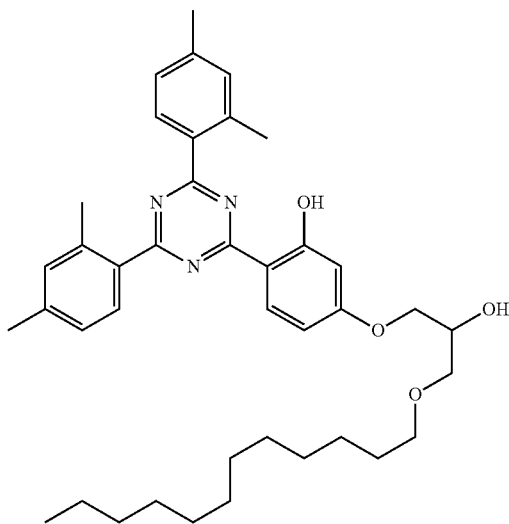

(III-37)

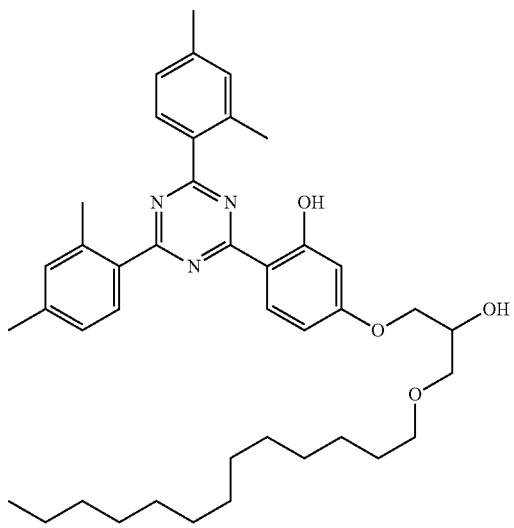

(III-38)

[Chem. 61]

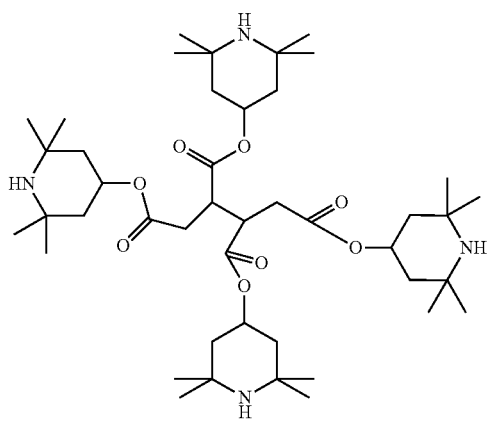

(III-39)

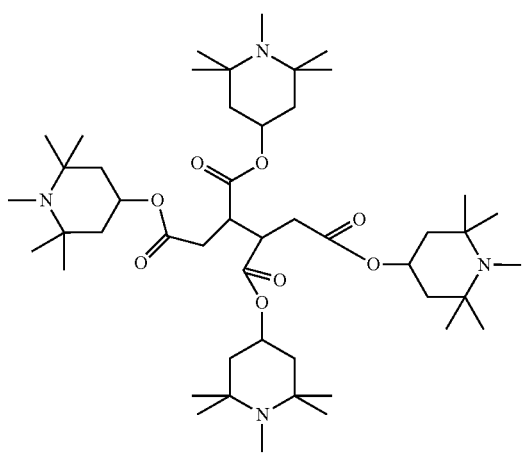

(III-40)

(In the formulae, n represents an integer of 0 to 20.)

The composition according to the present invention preferably contains one or two or more, more preferably one to five, compounds represented by general formula (Q) or selected from general formulae (III-1) to (III-38). The amount of the compound(s) is preferably between 0.001% and 1% by mass, more preferably between 0.001 and 0.1% by mass, in particular between 0.001% and 0.05% by mass.

A composition containing a polymerizable compound according to the present invention is rendered capable of liquid crystal alignment by ultraviolet-induced polymerization of the polymerizable compound contained therein, and is used in liquid crystal display elements that control the amount of transmitted light using the birefringence of the composition.

If the liquid crystal composition according to the present invention contains a polymerizable compound, the polymerizable compound is polymerized preferably by irradiating it with ultraviolet radiation, an electron beam, or any other type of active radiation or with two or more types of active radiation, whether together or one after another, because an appropriate polymerization rate is desired to achieve a good alignment of the liquid crystal. If ultraviolet radiation is used, the light source may be a polarized light source or may be an unpolarized light source. If the polymerized compound is polymerized with the composition containing it sandwiched between two substrates, at least the substrate closer to the light source needs to be given adequate transparency to the active radiation. Another means that can be used is to irradiate the liquid crystal composition with light through a mask so that the polymerizable compound is polymerized only in certain areas, then alter the electric or magnetic field or parameters such as temperature to change the orientation in the areas that have yet to be polymerized, and complete the polymerization by further irradiation with light. Ultraviolet exposure, in particular, is performed preferably with an alternating electric field applied across the composition containing a polymerizable compound. The alternating electric field applied is preferably alternating with a frequency of 10 Hz to 10 kHz, more preferably with a frequency of 60 Hz to 10 kHz, and the voltage is selected depending on the desired pretilt angle of the liquid crystal display element. That is, the pretilt angle of the liquid crystal display element can be controlled by the voltage applied. For transverse-field MVA liquid crystal display elements, it is preferred to control the pretilt angle to make it between 800 and 89.90 in light of alignment stability and contrast.

The temperature during the irradiation is preferably in a range in which the composition according to the present invention maintains its liquid crystal state. The polymerizable compound is polymerized preferably at a temperature close to room temperature, i.e., typically between 15° C. and 35° C. The lamp with which ultraviolet radiation is generated can be, for example, a metal halide lamp, a high-pressure mercury lamp, or an ultrahigh-pressure mercury lamp. As for wavelength, the ultraviolet radiation emitted preferably falls within a wavelength range not absorbed by the composition and preferably is used with some ultraviolet radiation cut if necessary. The intensity of the ultraviolet radiation emitted is preferably between 0.1 mW/cm2 and 100 W/cm$^2$, more preferably between 2 mW/cm$^2$ and 50 W/cm$^2$. The energy of the ultraviolet radiation emitted can be adjusted as needed, but preferably is between 10 mJ/cm2 and 500 J/cm2, more preferably between 100 mJ/cm2 and 200 J/cm2. The intensity may be changed during the ultraviolet irradiation. The duration of ultraviolet irradiation is selected in accordance with the intensity of the ultraviolet radiation emitted, but preferably is between 10 seconds and 3600 seconds, more preferably between 10 seconds and 600 seconds.

The polymerizable compound is polymerized preferably by irradiating it with ultraviolet radiation, an electron beam, or any other type of active radiation or with two or more types of active radiation, whether together or one after another, because an appropriate polymerization rate is desired to achieve a good alignment of the liquid crystal. If ultraviolet radiation is used, the light source may be a polarized light source or may be an unpolarized light source. If the polymerized compound is polymerized with the composition containing it sandwiched between two substrates, at least the substrate closer to the light source needs to be given adequate transparency to the active radiation. Another means that can be used is to irradiate the liquid crystal composition with light through a mask so that the polymerizable compound is polymerized only in certain areas, then alter the electric or magnetic field or parameters such as temperature to change the orientation in the areas that have yet to be polymerized, and complete the polymerization by further irradiation with light. Ultraviolet exposure, in particular, is performed preferably with an alternating electric field applied across the composition containing a polymerizable compound. The alternating electric field applied is preferably alternating with a frequency of 10 Hz to 10 kHz, more preferably with a frequency of 60 Hz to 10 kHz, and the voltage is selected depending on the desired pretilt angle of the liquid crystal display element. That is, the pretilt angle of the liquid crystal display element can be controlled by the voltage applied. For transverse-field MVA liquid crystal display elements, it is preferred to control the pretilt angle to make it between 800 and 89.90 in light of alignment stability and contrast.

The temperature during the irradiation is preferably in a range in which the composition according to the present invention maintains its liquid crystal state. The polymerizable compound is polymerized preferably at a temperature close to room temperature, i.e., typically between 15° C. and 35° C. The lamp with which ultraviolet radiation is generated can be, for example, a metal halide lamp, a high-pressure mercury lamp, or an ultrahigh-pressure mercury lamp. As for wavelength, the ultraviolet radiation emitted preferably falls within a wavelength range not absorbed by the composition and preferably is used with some ultraviolet radiation cut if necessary. The intensity of the ultraviolet radiation emitted is preferably between 0.1 mW/cm$^2$ and 100 W/cm$^2$, more preferably between 2 mW/cm and 50 W/cm$^2$. The energy of the ultraviolet radiation emitted can be adjusted as needed, but preferably is between 10 mJ/cm$^2$ and 500 J/cm$^2$, more preferably between 100 mJ/cm$^2$ and 200 J/cm$^2$. The intensity may be changed during the ultraviolet irradiation. The duration of ultraviolet irradiation is selected in accordance with the intensity of the ultraviolet radiation emitted, but preferably is between 10 seconds and 3600 seconds, more preferably between 10 seconds and 600 seconds.

"Alignment Layer(s)"

A preferred liquid crystal display element according to the present invention may optionally have an alignment layer on the surfaces, between the first and second substrates, touching the liquid crystal composition to align liquid crystal molecules in the liquid crystal layer 5. A liquid crystal display element that requires an alignment layer has it between the light conversion layer and the liquid crystal layer, but even a thick alignment layer is as thin as 100 nm or less. The alignment layer therefore does not completely block the interactions between the colorant(s) in the light conversion layer, such as light-emitting nanocrystals and/or a pigment, and the liquid crystal compound(s) in the liquid crystal layer.

Liquid crystal display elements that use no alignment layer have greater interactions between the colorant(s) in the light conversion layer, such as light-emitting nanocrystals and/or a pigment, and the liquid crystal compound(s) in the liquid crystal layer.

The alignment layer(s) according to the present invention is preferably at least one selected from the group consisting of a rubbed alignment layer or a photoalignment layer. If a rubbed alignment layer is used, it can be of any kind, and known polyimide alignment layers are suitable for use.

The rubbed alignment layer can be made of a transparent organic material, such as a polyimide, a polyamide, BCB (benzocyclobutene polymer), or polyvinyl alcohol. Particularly preferred are polyimide alignment layers, which result from the imidization of a polyamic acid, an acid synthesized from a diamine, such as an aliphatic or alicyclic diamine, e.g., p-phenylenediamine or 4,4'-diaminodiphenylmethane, and an aliphatic or alicyclic tetracarboxylic anhydride, such as butanetetracarboxylic anhydride or 2,3,5-tricarboxycyclopentylacetic anhydride, or aromatic tetracarboxylic anhydride, such as pyromellitic dianhydride. If used as, for example, vertical alignment layers, polyimide alignment layers can be used without further alignment.
(Photoalignment)

If an alignment layer according to the present invention is a photoalignment layer, it only needs to contain one or more photoresponsive molecules. The photoresponsive molecule(s) is preferably at least one selected from the group consisting of photodimerizable molecules, which dimerize to form a crosslink structure in response to light, photoisomerizable molecules, which isomerize and become oriented substantially perpendicular or parallel to the polarization axis in response to light, and photodegradable polymers, which break their polymer chains in response to light.

Photoisomerizable molecules are particularly preferred in light of sensitivity and anchoring strength.

For the photoisomerizable polymers, the light used to isomerize their molecules and orient them substantially perpendicular to the polarization axis is preferably between 200 and 500 nm, more preferably between 300 and 500 nm, even more preferably between 300 and 400 nm.

The weight-average molecular weight of a photoisomerizable polymer according to the present invention is preferably between 10000 and 800000, more preferably between 10000 and 400000, even more preferably between 50000 and 400000, in particular between 50000 and 300000.

This weight-average molecular weight (Mw) is that measured by GPC (Gel Permeation Chromatography).

This application claims priority from Japanese Patent Application "Japanese Patent Application No. 2016-255102," filed Dec. 28, 2016, and Japanese Patent Application "Japanese Patent Application No. 2016-177108," filed Sep. 14, 2017, the entire disclosure of which is incorporated herein.

EXAMPLES

The following describes the present invention in detail by examples. The present invention, however, is not limited to the Examples below. In Examples, all materials were used after any dissolved oxygen was replaced with nitrogen gas. The operations in producing luminescent nanocrystals and those in producing inks were performed in a nitrogen-filled glove box or in a flask under a nitrogen stream with the air shut out.

1. Preparation of Raw Materials for Dispersions and Ink Compositions

Titanium oxide was heated at 120° C. for 2 hours at a reduced pressure of 1 mmHg and allowed to cool in a nitrogen atmosphere before mixing. Liquid materials used in Examples were dehydrated using Molecular Sieves 3 A for at least 48 hours before mixing.
<Preparation of Ethylenic Unsaturated Monomers>

As ethylenic unsaturated monomers, the monomers listed in Table 1 below were prepared.

TABLE 1

| Compound name | Abbreviation | Number of ethylenic unsaturated groups | Viscosity at 23° C. (mPa · s) | Hansen solubility parameters | | |
|---|---|---|---|---|---|---|
| | | | | δd | δp | δh |
| Isobornyl acrylate | IBA | 1 (monofunctional) | 8 | 16.7 | 2.6 | 2.8 |
| Ethoxyethoxyethyl acrylate | EOEOA | 1 (monofunctional) | 3 | 16.1 | 5.4 | 6.6 |
| 2-Hydroxyethyl acrylate | HEA | 1 (monofunctional) | 6 | 16.0 | 13.2 | 13.4 |
| Dipropylene glycol diacrylate | DPGDA | 2 (bifunctional) | 9 | 16.4 | 4.8 | 6.4 |
| Glycerol triacrylate | GTA | 3 (trifunctional) | 30 | 16.9 | 5.2 | 7.8 |
| Trimethylolethane triacrylate | TMETA | 3 (trifunctional) | 58 | 16.8 | 4.0 | 6.6 |
| 1,6-Hexanediol dimethacrylate | HDDMA | 2 (bifunctional) | 6 | 16.4 | 4.6 | 6.1 |

IBA: MIWON
EOEOA: MIWON
HEA: Kanto Kagaku
DPGDA: MIWON
GTA: Toagosei
TMETA: Shin-Nakamura Chemical
HDDMA: Shin-Nakamura Chemical <Preparation of a Dispersion of Red-Luminescent InP/ZnSeS/ZnS Nanocrystal Particles>

[Preparation of an Indium Laurate Solution]

To a reaction flask were added 10 g of 1-octadecene (ODE), 146 mg (0.5 mmol) of indium acetate, and 300 mg (1.5 mmol) of lauric acid to give a mixture. The mixture was heated at 140° C. for 2 hours in a vacuum to give a transparent solution (solution of indium laurate). This solution was maintained in the glove box at room temperature until it was needed. It should be noted that indium laurate is sparingly soluble and easily precipitates at room temperature. Whenever an indium laurate solution was used, therefore, the solution (mixture in ODE) was heated to approximately 90° C. to dissolve the precipitate of indium laurate and form a transparent solution. Then the required volume of the transparent solution was measured out and used.

[Production of the Core of the Red Light-Emitting Nanocrystals (InP Core)]

To a reaction flask were added 5 g of trioctylphosphine oxide (TOPO), 1.46 g (5 mmol) of indium acetate, and 3.16 g (15.8 mmol) of lauric acid to give a mixture. The mixture wax heated at 160° C. for 40 minutes under nitrogen ($N_2$) conditions and then at 250° C. for 20 minutes in a vacuum. Then the reaction temperature (temperature of the mixture) was increased to 300° C. under nitrogen ($N_2$) conditions. At this temperature, a mixture of 3 g of 1-octadecene (ODE) and 0.25 g (1 mmol) of tris(trimethylsilyl)phosphine was introduced into the reaction flask quickly, and the reaction temperature was maintained at 260° C. Five minutes later, the heater was removed to terminate the reaction, and the resulting reaction solution was cooled to room temperature. Then 8 ml of toluene and 20 ml of ethanol were added to the reaction solution placed in the glove box. The mixture was then centrifuged to precipitate InP nanocrystal particles, and the InP nanocrystal particles were collected by decantation. The InP nanocrystal particles obtained were then dispersed in hexane. In this way, a liquid dispersion containing 5% by mass InP nanocrystal particles (hexane liquid dispersion) was obtained.

The hexane liquid dispersion of InP nanocrystal particles and indium laurate solution obtained were put into a reaction flask to give a mixture. The amount of the liquid dispersion of InP nanocrystal particles in hexane and that of the indium laurate solution were adjusted to 0.5 g (25 mg of InP nanocrystal particles) and 5 g (178 mg of indium laurate), respectively. After the mixture was allowed to stand at room temperature for 10 minutes in a vacuum, nitrogen gas was introduced into the flask until normal pressure. The temperature of the mixture was increased to 230° C. and maintained at this temperature for 2 hours so that hexane was removed from the flask. Then the internal temperature of the flask was increased to 250° C., a mixture of 3 g of 1-octadecene (ODE) and 0.03 g (0.125 mmol) of tris(trimethylsilyl)phosphine was introduced into the reaction flask quickly, and the reaction temperature was maintained at 230° C. Five minutes later, the heater was removed to terminate the reaction, and the resulting reaction solution was cooled to room temperature. Then 8 ml of toluene and 20 ml of ethanol were added to the reaction solution placed in the glove box. The mixture was then centrifuged to precipitate InP nanocrystal particles (InP cores) as the core of the red-luminescent InP/ZnSeS/ZnS nanocrystal particles, and the InP nanocrystal particles (InP cores) were collected by decantation. The InP nanocrystal particles (InP cores) obtained were then dispersed in hexane. In this way, a liquid dispersion containing 5% by mass InP nanocrystal particles (InP cores) (hexane liquid dispersion) was obtained.

[Formation of the Shells of the Red Light-Emitting Nanocrystals (ZnSeS/ZnS Shells)]

After 2.5 g of the hexane liquid dispersion of InP nanocrystal particles (InP cores) obtained was added to a reaction flask, 0.7 g of oleic acid was added to the reaction flask at room temperature, and the temperature was increased to 80° C. and kept for 2 hours. To this reaction mixture, a solution of 14 mg of diethylzinc, 8 mg of bis(trimethylsilyl)selenide, and 7 mg of hexamethyldisilathiane in 1 ml of ODE (ZnSeS precursor solution) was added dropwise. The temperature was increased to 200° C. and kept for 10 minutes. In this way, a ZnSeS shell having a thickness of 0.5 monolayers was formed.

Then the temperature was increased to 140° C. and kept for 30 minutes. To this reaction mixture, a ZnS precursor solution obtained by dissolving 69 mg of diethylzinc and 66 mg of hexamethyldisilathiane in 2 ml of ODE was added dropwise. The temperature was increased to 200° C. and kept for 30 minutes. In this way, a ZnS shell having a thickness of 2 monolayers was formed. Ten minutes after the addition of the ZnS precursor solution, the heater was removed to terminate the reaction. Then the reaction mixture was cooled to room temperature, and the resulting white precipitate was removed by centrifugation. In this way, a transparent liquid dispersion of nanocrystal particles was obtained in which red-luminescent InP/ZnSeS/ZnS nanocrystal particles were dispersed (ODE liquid dispersion of InP/ZnSeS/ZnS nanocrystal particles).

[Synthesis of the Organic Ligand for the InP/ZnSeS/ZnS Nanocrystal Particles]

Under a gaseous nitrogen stream, the ligand represented by formula (1A) below was prepared from JEFAMINE M-1000 (Huntsman) and succinic anhydride (Sigma-Aldrich) equimolar to JEFAMINE M-1000.

[Chem. 62]

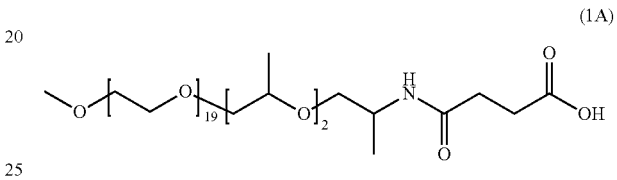

(1A)

[Production of the Dispersion of Red-Luminescent InP/ZnSeS/ZnS Nanocrystal Particles by Ligand Exchange]

Thirty milligrams of the above organic ligand was added to 1 ml of the above ODE liquid dispersion of InP/ZnSeS/ZnS nanocrystal particles. The resulting mixture was heated at 90° C. for 5 hours for ligand exchange. As the ligand exchange proceeded, the nanocrystal particles aggregated. After the end of ligand exchange, the nanocrystal particles were collected by decantation. Then 3 ml of ethanol was added to the collected nanocrystal particles, and the mixture was sonicated to disperse the particles once again. To 3 mL of the resulting liquid dispersion of nanocrystal particles in ethanol, 10 ml of n-hexane was added. After the mixture was centrifuged to precipitate the nanocrystal particles, the nanocrystal particles (InP/ZnSeS/ZnS nanocrystal particles modified with the organic ligand) were collected by decantation and drying in a vacuum. The percentage of the organic ligand to the total amount of the modified nanocrystal particles was 30% by mass. The nanocrystal particles obtained (InP/ZnSeS/ZnS nanocrystal particles modified with the organic ligand) were dispersed in EOEOA to make their amount in the dispersion 34.5% by mass. In this way, red light-emitting nanocrystal dispersion 1 was obtained. The EOEOA content of the dispersion was 65.5% by mass.

Red light-emitting nanocrystal dispersion 2 was obtained in the same way as above except that EOEOA was replaced with HDDMA. Red light-emitting nanocrystal dispersion 3 was obtained in the same way as above except that EOEOA was replaced with DPGDA.

<Preparation of a Dispersion of Green-Luminescent InP/ZnSeS/ZnS Nanocrystal Particles>

[Synthesis of the Core of the Green Light-Emitting Nanocrystals (InP Core)]

To a reaction flask were added 5 g of trioctylphosphine oxide (TOPO), 1.46 g (5 mmol) of indium acetate, and 3.16 g (15.8 mmol) of lauric acid to give a mixture. The mixture wax heated at 160° C. for 40 minutes under nitrogen ($N_2$) conditions and then at 250° C. for 20 minutes in a vacuum. Then the reaction temperature (temperature of the mixture) was increased to 300° C. under nitrogen ($N_2$) conditions. At this temperature, a mixture of 3 g of 1-octadecene (ODE) and 0.25 g (1 mmol) of tris(trimethylsilyl)phosphine was introduced into the reaction flask quickly, and the reaction temperature was maintained at 260° C. Five minutes later, the heater was removed to terminate the reaction, and the resulting reaction solution was cooled to room temperature. Then 8 ml of toluene and 20 ml of ethanol were added to the reaction solution placed in the glove box. The mixture was then centrifuged to precipitate InP nanocrystal particles (InP cores), and the InP nanocrystal particles (InP cores) were collected by decantation. The InP nanocrystal particles obtained (InP cores) were then dispersed in hexane. In this way, a liquid dispersion containing 5% by mass InP nanocrystal particles (InP cores) (hexane liquid dispersion) was obtained.

[Synthesis of the Shells of the Green Light-Emitting Nanocrystals (ZnSeS/ZnS Shells)]

After 2.5 g of the hexane liquid dispersion of InP nanocrystal particles (InP cores) obtained was added to a reaction flask, 0.7 g of oleic acid was added to the reaction flask at room temperature, and the temperature was increased to 80° C. To this reaction mixture, a solution of 14 mg of diethylzinc, 8 mg of bis(trimethylsilyl)selenide, and 7 mg of hexamethyldisilathiane in 1 ml of ODE (ZnSeS precursor solution) was added dropwise. In this way, a ZnSeS shell having a thickness equivalent to 0.5 monolayers was formed.

After the addition of the ZnSeS precursor solution, the reaction temperature was kept at 80° C. for 10 minutes. The temperature was then increased to 140° C. and kept for 30 minutes. To this reaction mixture, a ZnS precursor solution obtained by dissolving 69 mg of diethylzinc and 66 mg of hexamethyldisilathiane in 2 ml of ODE was added dropwise. In this way, a ZnS shell having a thickness of 2 monolayers was formed. Ten minutes after the addition of the ZnS precursor solution, the heater was removed to terminate the reaction. Then the reaction mixture was cooled to room temperature, and the resulting white precipitate was removed by centrifugation. In this way, a transparent liquid dispersion of nanocrystal particles was obtained in which green-luminescent InP/ZnSeS/ZnS nanocrystal particles were dispersed (ODE liquid dispersion).

[Production of the Dispersion of Green-Luminescent InP/ZnSeS/ZnS Nanocrystal Particles by Ligand Exchange]

Thirty milligrams of the above organic ligand was added to 1 ml of the above ODE liquid dispersion of nanocrystal particles. The resulting mixture was heated at 90° C. for 5 hours for ligand exchange. As the ligand exchange proceeded, the nanocrystal particles aggregated. After the end of ligand exchange, decantation was performed, 3 ml of ethanol was added to the nanocrystal particles, and the mixture was sonicated to disperse the particles once again. To 3 mL of the resulting liquid dispersion of nanocrystal particles in ethanol, 10 ml of n-hexane was added. After the mixture was centrifuged to precipitate the nanocrystal particles, the nanocrystal particles (InP/ZnSeS/ZnS nanocrystal particles modified with the organic ligand) were collected by decantation and drying in a vacuum. The percentage of the organic ligand to the total amount of the modified nanocrystal particles was 35% by mass. The nanocrystal particles obtained (InP/ZnSeS/ZnS nanocrystal particles modified with the organic ligand) were dispersed in EOEOA to make their amount in the dispersion 30.0% by mass. In this way, green light-emitting nanocrystal dispersion 1 was obtained. The EOEOA content of the dispersion was 70.0% by mass.

Green light-emitting nanocrystal dispersion 2 was obtained in the same way except that EOEOA was replaced with HDDMA. Green light-emitting nanocrystal dispersion 3 was obtained in the same way except that EOEOA was replaced with DPGDA.

<Preparation of Liquid Dispersions of Light-Diffusing Particles>

In a container filled with nitrogen gas, 33.0 g of titanium oxide (trade name, CR-60-2; Ishihara Sangyo Kaisha, Ltd.; average particle diameter (volume-average diameter), 210 nm), 1.00 g of a polymeric dispersant (trade name, AJISPER PB-821; Ajinomoto Fine-Techno Co., Inc.), and 26.0 g of DPGDA were mixed. The resulting mixture was dispersed by shaking it with zirconia beads (diameter: 1.25 mm) for 2 hours using a paint shaker, and then the zirconia beads were removed using a polyester mesh filter. In this way, light-diffusing particle liquid dispersion 1 (titanium oxide content: 55% by mass) was obtained. The DPGDA content of the dispersion was 43.3% by mass.

Light-diffusing particle liquid dispersion 2 was obtained in the same way except that DPGDA was replaced with TMETA. Light-diffusing particle liquid dispersion 3 was obtained in the same way except that DPGDA was replaced with GTA. Light-diffusing particle liquid dispersion 4 was obtained in the same way except that DPGDA was replaced with HDDMA. Light-diffusing particle liquid dispersion 5 was obtained in the same way except that DPGDA was replaced with HEA.

2. Preparation and Testing of Ink Compositions 2.1 Preparation and Testing of Ink Compositions 1 to 10, Active Energy-Curable (UV-Curable) Ink Compositions Example 1

[Preparation of Red Ink Compositions (Inkjet Inks)]

In a container filled with nitrogen gas, 5.95 g of red light-emitting nanocrystal dispersion 1, 3.68 g of light-diffusing particle liquid dispersion 1, and 0.35 g of ethyl phenyl(2,4,6-trimethylbenzoyl)phosphinate (IGM resin; trade name, Omnirad TPO-L) as a photoinitiator were mixed uniformly. Then the mixture was filtered through a filter having a pore size of 5 µm in the glove box. Then nitrogen gas was introduced into the container containing the filtrate to saturate the inside of the container. In this way, ink composition 1 was obtained.

Example 2

Ink composition 2 was prepared as in Example 1 except that light-diffusing particle liquid dispersion 1 was replaced with light-diffusing particle liquid dispersion 2.

Example 3

Ink composition 3 was prepared as in Example 1 except that red light-emitting nanocrystal dispersion 1 was replaced with red light-emitting nanocrystal dispersion 2.

Example 4

Ink composition 4 was prepared as in Example 1 except that red light-emitting nanocrystal dispersion 1 was replaced with red light-emitting nanocrystal dispersion 2 and that light-diffusing particle liquid dispersion 1 was replaced with light-diffusing particle liquid dispersion 3.

Example 5

Ink composition 5 was prepared as in Example 1 except that red light-emitting nanocrystal dispersion 1 was replaced with red light-emitting nanocrystal dispersion 3 and that light-diffusing particle liquid dispersion 1 was replaced with light-diffusing particle liquid dispersion 4.

Example 6

[Preparation of Green Ink Compositions (Inkjet Inks)]

In a container filled with nitrogen gas, 6.83 g of green light-emitting nanocrystal dispersion 1, 2.82 g of light-diffusing particle liquid dispersion 1, and 0.35 g of ethyl phenyl(2,4,6-trimethylbenzoyl)phosphinate (IGM resin; trade name, Omnirad TPO-L) as a photoinitiator were mixed uniformly. Then the mixture was filtered through a filter having a pore size of 5 μm in the glove box. Then nitrogen gas was introduced into the container containing the filtrate to saturate the inside of the container. In this way, ink composition 7 was obtained.

Example 7

Ink composition 8 was prepared as in Example 6 except that light-diffusing particle liquid dispersion 1 was replaced with light-diffusing particle liquid dispersion 2.

Example 8

Ink composition 9 was prepared as in Example 6 except that green light-emitting nanocrystal dispersion 1 was replaced with green light-emitting nanocrystal dispersion 2.

Example 9

Ink composition 10 was prepared as in Example 6 except that green light-emitting nanocrystal dispersion 1 was replaced with green light-emitting nanocrystal dispersion 2 and that light-diffusing particle liquid dispersion 1 was replaced with light-diffusing particle liquid dispersion 3.

Example 10

Ink composition 11 was prepared as in Example 6 except that green light-emitting nanocrystal dispersion 1 was replaced with green light-emitting nanocrystal dispersion 3 and that light-diffusing particle liquid dispersion 1 was replaced with light-diffusing particle liquid dispersion 4.

<Testing>

[Ejection Stability Testing]

The prepared ink compositions were stored under the conditions of 23° C. and 50% RH for 1 week. The stored ink compositions were subjected to ejection testing using an inkjet printer (FUJIFILM Dimatix, trade name "DMP-2831"), in which the inkjet head was warmed to 40° C., and the ink composition was ejected continuously for 10 minutes. The head unit, from which inks are ejected, of this inkjet printer has 16 nozzles, and the volume of ink composition per nozzle per ejection was set to 10 pL. The ejection stability of the ink compositions of Examples 1 to 10 was graded in accordance with the following criteria. The results are presented in Tables 2 to 4.

A: Continuous ejection successful (the ink composition was able to be continuously ejected from 10 or more of the 16 nozzles)

B: Continuous ejection failed (continuous ejection was possible from 9 or less of the 16 nozzles)

C: Ejection failed

[Curability Testing]

The ink compositions of Examples 1 to 10 were subjected to curability testing. Specifically, each ink composition was applied to a glass substrate (glass slide) to a thickness of 4 μm using a spin coater. The resulting film was put into a nitrogen purge box, the box was filled with nitrogen, and the film was irradiated with ultraviolet radiation at an exposure dose of 500 mJ/cm$^2$. The surface of the ultraviolet-irradiated layer was rubbed with a cotton swab, and the curability was graded in accordance with the following criteria. The results are presented in Tables 2 to 4. In the grade-A Examples, a layer of cured ink composition (light conversion layer) was successfully formed on the glass substrate.

A: Cured (no ink composition stuck to the tip of the cotton swab)

B: Not cured (the ink composition stuck to the tip of the cotton swab)

[External Quantum Efficiency (EQE)]

As a flat panel light source, CCS Inc.'s blue LED (peak emission wavelength: 450 nm) was used. The measuring instrument was Otsuka Electronics Co., Ltd.'s spectroradiometer (trade name "MCPD-9800") connected with an integrating sphere, and the integrating sphere was placed above the blue LED. The blue LED was turned on with a light conversion layer-coated substrate, prepared as in the above curability testing, interposed between it and the integrating sphere. The spectrum and the illuminance of each wavelength were measured.

From the spectrum and illuminance measured using the above instrument, the external quantum efficiency was determined as follows. Each of these values indicates what percentage of light (photons) that enters the light conversion layer is emitted as fluorescence toward the observer. Greater values therefore indicate better luminescence properties of the light conversion layer, and this makes the external quantum efficiency an important measure.

$$\text{Red EQE(\%)} = P1(\text{Red})/E(\text{Blue}) \times 100$$

$$\text{Green EQE(\%)} = P2(\text{Green})/E(\text{Blue}) \times 100$$

In the equations, E (Blue), P1 (Red), and P2 (Grenn) each represent the following.

E (Blue): Represents the total of "illuminance×wavelength/hc" in the spectrum between 380 and 490 nm.

P1 (Red): Represents the total of "illuminance×wavelength/hc" in the spectrum between 590 and 780 nm.

P2 (Green): Represents the total of "illuminance×wavelength/hc" in the spectrum between 500 and 650 nm.

Each of these values corresponds to the number of photons observed. h represents the Planck constant, and c represents the speed of light.

The red ink compositions of Examples 1 to 5 were graded for their effectiveness in improving the external quantum efficiency in accordance with the following criteria. The results are presented in Tables 2 and 3.

A: 20% or more

B: 15% or more and less than 20%

C: Less than 15%

The green ink compositions of Examples 6 to 10 were graded for their effectiveness in improving the external quantum efficiency in accordance with the following criteria. The results are presented in Table 4.

A: 15% or more

B: 10% or more and less than 15%

C: Less than 5%

[Evaluation of the Quantum Yield (QY) of the Ink Compositions]

The quantum yield (QY) of the ink compositions of Examples 1 to 10 was measured using Hamamatsu Photonics K.K.'s Quantaurus-QY absolute quantum yield spectrometer in its solution sample mode. Specifically, a sample for measurement was prepared by adding 4000 μl of PGMEA (propylene glycol monomethyl ether acetate) and then 12 μl of the ink composition of Example 1 to the dedicated cell. Measurement samples for Examples 2 to 10 were adjusted in the same way except that the ink composition of Example 1 was replaced with those of Examples 2 to 10, respectively. Using the measurement samples for Examples 1 to 10, the quantum yield (QY) of the ink compositions of Examples 1 to 10 was measured.

The quantum yield (QY) of the ink compositions of Examples 1 to 5 (red ink compositions) was graded on the basis of the measured quantum yield (QY). The criteria were as follows. The results are presented in Tables 2 and 3.
  A: 60% or more
  B: 50% or more and less than 60%
  C: Less than 50%

The quantum yield (QY) of the ink compositions of Examples 6 to 10 (green ink compositions) was graded on the basis of the measured quantum yield (QY). The criteria were as follows. The results are presented in Table 4.
  A: 50% or more
  B: 40% or more and less than 50%
  C: Less than 40%

In Tables 2 to 4, the First monomer indicates the ethylenic unsaturated monomer contained in the light-emitting nanocrystal dispersion, and the Second monomer indicates the ethylenic unsaturated monomer contained in the light-diffusing particle liquid dispersion. In these tables, "red-luminescent nanocrystal particle dispersion" means "red light-emitting nanocrystal dispersion," "green-luminescent nanocrystal particle dispersion" means "green light-emitting nanocrystal dispersion," and "light-scattering particle dispersion" means "light-diffusing particle liquid dispersion."

2.2 Preparation and Testing of Ink Compositions 12 to 15, Active Energy-Curable Ink Compositions Production of Inkjet Inks Reference Example 1 (Example Adjustment of Mill Base 1, Containing Red Light-Emitting Quantum Dots)

Ten thousand parts by mass of a solution containing InP/ZnS quantum dots (SIGMA-ALDRICH "Product Number 776785-5 mg/mL"; solids content, 50 parts by mass in toluene (solids content, 0.5% by mass), 45 parts by mass of phenoxyethyl acrylate, and 5 parts by mass of an acrylic polymeric dispersion having an amine value of 40 mg KOH (BASF "EFKA-PX4701") were stirred and mixed for 1 hour

TABLE 2

|  |  | Example 1 | Example 2 | Example 3 | Example 4 | Example 5 |
|---|---|---|---|---|---|---|
| Red-luminescent nanocrystal particle dispersion | | 1 | 1 | 2 | 2 | 3 |
| Light-scattering particle dispersion | | 1 | 2 | 1 | 3 | 4 |
| First monomer | Monofunctional | EOEOA | EOEOA | — | — | — |
| | Bifunctional | — | — | HDDMA | HDDMA | DPGDA |
| | Trifunctional | — | — | — | — | — |
| Second monomer | Monofunctional | — | — | — | — | — |
| | Bifunctional | DPGDA | — | DPGDA | — | HDDMA |
| | Trifunctional | — | TMETA | — | GTA | — |
| HSP distance [MPa$^{0.5}$] | | 0.9 | 2.0 | 0.4 | 2.1 | 0.4 |
| Testing | EQE | A | A | A | A | A |
| | Ejection stability | B | A | A | A | A |
| | Curability | A | A | A | A | A |
| | QY | A | A | A | A | A |

TABLE 3

|  |  | Example 6 | Example 7 | Example 8 | Example 9 | Example 10 |
|---|---|---|---|---|---|---|
| Green-luminescent nanocrystal particle dispersion | | 1 | 1 | 2 | 2 | 3 |
| Light-scattering particle dispersion | | 1 | 2 | 1 | 3 | 4 |
| First monomer | Monofunctional | EOEOA | EOEOA | — | — | — |
| | Bifunctional | — | — | HDDMA | HDDMA | DPGDA |
| | Trifunctional | — | — | — | — | — |
| Second monomer | Monofunctional | — | — | — | — | — |
| | Bifunctional | DPGDA | — | DPGDA | — | HDDMA |
| | Trifunctional | — | TMETA | — | GTA | — |
| HSP distance [MPa$^{0.5}$] | | 0.9 | 2.0 | 0.4 | 2.1 | 0.4 |
| Testing | EQE | A | A | A | A | A |
| | Ejection stability | A | A | A | A | A |
| | Curability | A | A | A | A | A |
| | QY | A | A | A | A | A | using a mixer. The system was then evacuated to remove toluene. The solution was processed in a bead mill for 4 hours, giving a mill base.

Reference Example 2 (Example Adjustment of Mill Base 2, Containing Green Light-Emitting Quantum Dots)

Ten thousand parts by mass of a solution containing InP/ZnS quantum dots (SIGMA-ALDRICH "Product Number 776793-5 mg/mL"; solids content, 50 parts by mass in toluene (solids content, 0.5% by mass), 45 parts by mass of phenoxyethyl acrylate, and 5 parts by mass of an acrylic polymeric dispersion having an amine value of 40 mg KOH (BASF "EFKA-PX4701") were stirred and mixed for 1 hour using a mixer. The system was then evacuated to remove toluene. The solution was processed in a bead mill for 4 hours, giving a mill base.

Reference Example 3 (Example Adjustment of Mill Base 3, Containing Light-Diffusing Particles)

Sixty parts by mass of light-diffusing particles (Ishihara Sangyo Kaisha's titanium oxide "TTO-55 (D)"), 34 parts by mass of dipropylene glycol diacrylate, and 6 parts by mass of an acrylic polymeric dispersion having an amine value of 40 mg KOH (BASF "EFKA-PX4701") were stirred and mixed for 1 hour using a mixer. The solution was processed in a bead mill for 4 hours, giving a mill base.

Example 11 (Adjustment of a Red Light-Emitting Quantum Dot Ink)

Thirty parts by mass of dipropylene glycol diacrylate was combined with 3 parts by mass of polymerization initiator 1 (BASF "Irgacure 819"), 4 parts by mass of polymerization initiator 2 (BASF "Irgacure TPO"), 3 parts by mass of a polymerization initiator (Lambson "DETX"), and 0.3 parts by mass of a surface tension modifier (EO-modified polysiloxane, BYK-Chemie "BYK-378", and the photoinitiators were dissolved at 60° C. The resulting solution was thoroughly mixed with 60 parts by mass of mill base 1, obtained in Reference Example 1. The mixture was filtered through a 4.5-μm membrane filter. In this way, ink composition 12, for jet printers and containing 30% by mass red light-emitting quantum dots, was prepared.

Example 12 (Adjustment of a Green Light-Emitting Quantum Dot Ink)

Thirty parts by mass of dipropylene glycol diacrylate was combined with 3 parts by mass of polymerization initiator 1 (BASF "Irgacure 819"), 4 parts by mass of polymerization initiator 2 (BASF "Irgacure TPO"), 3 parts by mass of a polymerization initiator (Lambson "DETX"), and 0.3 parts by mass of a surface tension modifier (EO-modified polysiloxane, BYK-Chemie "BYK-378", and the photoinitiators were dissolved at 60° C. The resulting solution was thoroughly mixed with 60 parts by mass of mill base 2, obtained in Reference Example 2. The mixture was filtered through a 4.5-μm membrane filter. In this way, ink composition 13, for jet printers and containing 30% by mass green light-emitting quantum dots, was prepared.

Example 13 (Adjustment of a Red Light-Emitting Quantum Dot Ink Containing Light-Diffusing Particles)

Three parts by mass of polymerization initiator 1 (BASF "Irgacure 819"), 4 parts by mass of polymerization initiator 2 (BASF "Irgacure TPO"), 3 parts by mass of a polymerization initiator (Lambson "DETX"), and 0.3 parts by mass of a surface tension modifier (EO-modified polysiloxane, BYK-Chemie "BYK-378" were thoroughly mixed with 60 parts by mass of mill base 1, obtained in Reference Example 1, and 40 parts by mass of mill base 3, obtained in Reference Example 3. The mixture was filtered through a 4.5-μm membrane filter. In this way, ink composition 14, for jet printers and containing 30% by mass red light-emitting quantum dots and 18% by mass light-diffusing particles, was prepared.

Example 14 (Adjustment of a Green Light-Emitting Quantum Dot Ink Containing Light-Diffusing Particles)

Three parts by mass of polymerization initiator 1 (BASF "Irgacure 819"), 4 parts by mass of polymerization initiator 2 (BASF "Irgacure TPO"), 3 parts by mass of a polymerization initiator (Lambson "DETX"), and 0.3 parts by mass of a surface tension modifier (EO-modified polysiloxane, BYK-Chemie "BYK-378" were thoroughly mixed with 60 parts by mass of mill base 2, obtained in Reference Example 2, and 40 parts by mass of mill base 3, obtained in Reference Example 3. The mixture was filtered through a 4.5-μm membrane filter. In this way, ink composition 15, for jet printers and containing 30% by mass green light-emitting quantum dots and 18% by mass light-diffusing particles, was prepared.

Comparative Example 1 (Example Adjustment of Mill Base 4, Containing Red Light-Emitting Quantum Dots and for Comparative Purposes)

Ten thousand parts by mass of a solution containing InP/ZnS quantum dots (SIGMA-ALDRICH "Product Number 776785-5 mg/mL"; solids content, 50 parts by mass in toluene (solids content, 0.5% by mass), 45 parts by mass of phenoxyethyl acrylate, and 5 parts by mass of a polymeric dispersant having no amino groups (BYK-Chemie "DISPER BYK-102") were stirred and mixed for 1 hour using a mixer. The system was then evacuated to remove toluene. The solution was processed in a bead mill for 4 hours, giving a mill base. The resulting mill base was nonfluidic and therefore had no practical use. The adjustment of the ink was therefore abandoned at this point.

Comparative Example 2 (Example Adjustment of Mill Base 5, Containing Green Light-Emitting Quantum Dots and for Comparative Purposes)

Ten thousand parts by mass of a solution containing InP/ZnS quantum dots (SIGMA-ALDRICH "Product Number 776793-5 mg/mL"; solids content, 50 parts by mass in toluene (solids content, 0.5% by mass), 45 parts by mass of phenoxyethyl acrylate, and 5 parts by mass of a polymeric dispersant having no amino groups (BYK-Chemie "DISPER BYK-102") were stirred and mixed for 1 hour using a mixer. The system was then evacuated to remove toluene. The solution was processed in a bead mill for 4 hours, giving a mill base. The resulting mill base was nonfluidic and therefore had no practical use. The adjustment of the ink was therefore abandoned at this point.

2.3 Preparation and Testing of Ink Compositions 16 and 17, Thermosetting Ink Compositions <Preparation of a Solvent>

As a solvent, 1,4-butanediol diacetate (trade name, 1,4-BDDA; Daicel Corporation) was prepared.

<Preparation of Light-Diffusing Particles>

As light-diffusing particles, titanium oxide (trade name, MPT141; Ishihara Sangyo Kaisha; average particle diameter (volume-average diameter), 100 nm) was prepared.

<Preparation of Polymeric Dispersants>

As polymeric dispersants, the following polymeric dispersants 1 to 10 were prepared.

Polymeric dispersant 1: DISPER BYK-2164 (amine value, 14 mg KOH/g; acid value, 0 mg KOH/g; name of BYK's product; "DISPER BYK" is a registered trademark)

Polymeric dispersant 2: AJISPER PB821 (amine value, 10 mg KOH/g; acid value, 17 mg KOH/g; name of Ajinomoto Fine-Techno Co., Inc.'s product; "AJISPER" is a registered trademark)

Polymeric dispersant 3: AJISPER PB881 (amine value, 17 mg KOH/g; acid value, 17 mg KOH/g; name of Ajinomoto Fine-Techno Co., Inc.'s product; "AJISPER" is a registered trademark)

Polymeric dispersant 4: DISPER BYK-2155 (amine value, 48 mg KOH/g; acid value, 0 mg KOH/g; name of BYK's product; "DISPER BYK" is a registered trademark)

Polymeric dispersant 5: Solsperse 33000 (amine value, 43.2±6.8 mg KOH/g; acid value, 26±2 mg KOH/g; name of Lubrizol's product; "Solsperse" is a registered trademark)

Polymeric dispersant 6: Solsperse 39000 (amine value, 29.5±4.8 mg KOH/g; acid value, 16.5±2 mg KOH/g; name of Lubrizol's product; "Solsperse" is a registered trademark)

Polymeric dispersant 7: Solsperse 71000 (amine value, 77.4±8.1 mg KOH/g; acid value, 0 mg KOH/g; name of Lubrizol's product; "Solsperse" is a registered trademark)

Polymeric dispersant 8: DISPER BYK-111 (amine value, 0 mg KOH/g; acid value, 129 mg KOH/g; name of BYK's product; "DISPER BYK" is a registered trademark)

Polymeric dispersant 9: DISPER BYK-118 (amine value, 0 mg KOH/g; acid value, 36 mg KOH/g; name of BYK's product; "DISPER BYK" is a registered trademark)

Polymeric dispersant 10: DISPER BYK-2009 (amine value, 4 mg KOH/g; acid value, 0 mg KOH/g; name of BYK's product; "DISPER BYK" is a registered trademark)

<Preparation of a Thermosetting Resin>

As a thermosetting resin, an epoxy-containing acrylic resin (trade name, FINEDIC A-254; DIC Corporation; "FINEDIC" is a registered trademark) was prepared.

<Preparation of a Curing Agent>

As an acid anhydride curing agent, 1-methylcyclohexane-4,5-dicarboxylic anhydride (reagent, Tokyo Chemical Industry Co., Ltd.) was prepared.

<Preparation of a Curing Catalyst>

As a curing catalyst, dimethylbenzylamine (reagent, Tokyo Chemical Industry Co., Ltd.) was prepared.

<Preparation of Light-Diffusing Particle Liquid Dispersions>

In a container filled with nitrogen gas, 2.4 g of titanium oxide, 0.4 g of polymeric dispersant 1, and solvent 1 were mixed. The resulting mixture was dispersed by shaking it with zirconia beads (diameter: 1.25 mm) for 2 hours using a paint shaker, and then the zirconia beads were removed using a polyester mesh filter. In this way, light-diffusing particle liquid dispersion 6 (nonvolatile content: 44% by mass) was obtained. Light-diffusing particle liquid dispersions 7 to 15 were obtained in the same way except that polymeric dispersant 1 was replaced with polymeric dispersants 2 to 10.

<Preparation of a Thermosetting Resin Solution>

Thermosetting resin solution 1 (nonvolatile content: 30% by mass) was obtained by dissolving 0.28 g of the thermosetting resin, 0.09 g of the curing agent, and 0.004 g of the curing catalyst in solvent 1.

<Nanocrystal Particle Dispersions for the Thermosetting Inks>

A red light-emitting nanocrystal dispersion (TR1) and the aforementioned green light-emitting nanocrystal dispersion (TG1) were obtained in the same way as red light-emitting nanocrystal dispersion 1 and green light-emitting nanocrystal dispersion 1 but using 1,4-BDDA in place of EOEOA. These dispersions were adjusted so that the solids concentration of each dispersant would be 30%.

Example 15

(1) Preparation of Ink Composition 16 (Inkjet Ink)

Ink composition 16 was obtained by mixing 2.25 g of the red light-emitting nanocrystal dispersion (TR1), 0.75 g of light-diffusing particle liquid dispersion 1, and 1.25 g of thermosetting resin solution 1 and filtering the mixture through a filter having a pore size of 5 μm. The average diameter (volume-average diameter MV) of the light-diffusing particles in the ink composition was 0.26 μm. In this Example, the average diameter (volume-average diameter MV) of the light-diffusing particles in the ink composition was measured using a dynamic light-scattering Nanotrac particle size analyzer (Nikkiso Co., Ltd., trade name "Nanotrac"). Likewise, ink composition 17 was obtained using the green light-emitting nanocrystal dispersion (TG1).

(2) Testing

Light-diffusing particle liquid dispersions 6 to 15 were assessed for the dispersibility of the light-diffusing particles via visual inspection of the dispersions. Light-diffusing particle liquid dispersions 6 to 14 were fluidic, demonstrating that the titanium oxide had been dispersed well. Light-diffusing particle liquid dispersion 15 formed a gel as a sign of poor dispersion.

[Luminescence Properties Testing]

The luminescence properties of ink composition 16 were tested as follows. That is, a sample for the testing of quantum dot luminescence properties (QD luminescence properties) was prepared by adding 5 mL of the solvent to 50 μL of ink composition 16. As a QD luminescence attribute, the intensity of QD luminescence was measured using a spectrofluorometer (JASCO Corporation, trade name "FP8600"). A cell with a 10-mm light path was used for measurement, and the detection sensitivity was set to "very low." The value at the top of the spectral peak was taken as the intensity of luminescence. The criteria for compatibility grading were as follows. The results are presented in Table 1.

a: The intensity of luminescence is 250 (arb. u) or more
b: The intensity of luminescence is less than 250 (arb. u)

Examples 16 to 21 and Comparative Examples 3 to 5

Ink compositions of Examples 16 to 21 and Comparative Examples 3 to 5 were obtained as in Example 15 except that light-diffusing particle liquid dispersion 6 was replaced with a light-diffusing particle liquid dispersion made with the polymeric dispersant specified in the table below. The average particle diameters (volume-average diameters MV) of light-diffusing particles in the ink compositions of Examples 2 to 7 were 0.275 μm, 0.266 μm, 0.227 μm, 0.246 μm, 0.295 μm, and 0.265 μm respectively, and those in the ink compositions of Comparative Examples 3 and 4 were 0.210 μm and 0.281 μm, respectively. The luminescence properties of the ink compositions obtained in Examples 16 to 21 and Comparative Examples 3 to 5 were tested as in Example 15. The results are presented in the table below. *: Light-emitting nanocrystals aggregated.

Example 23 [Making of Light Conversion Layer 2]

A black matrix pattern with a line width of 20 μm and a film thickness of 1.2 μm was photolithographically formed on a 0.7-mm thick 10 cm×10 cm glass substrate (Asahi Glass Co., Ltd.).

To the planned sections for pixels, divided by the black matrix, of the substrate, the red-producing ink inkjet obtained in Example 13 and the green-producing ink inkjet obtained in Example 14 were applied dropwise by inkjetting. The diameter of drops was 30 μm.

TABLE 4

| | | | Example 15 | Example 16 | Example 17 | Example 18 | Example 19 | Example 20 | Example 21 | Comparative Example 3 | Comparative Example 4 | Comparative Example 5 |
|---|---|---|---|---|---|---|---|---|---|---|---|---|
| Ink composition (g) | Light-emitting nanocrystals | | | | | | | 0.675 | | | | |
| | Titanium oxide | | | | | | | 0.3 | | | | |
| | Polymeric dispersant | Polymeric dispersant 1 | 0.03 | | | | | | | | | |
| | | Polymeric dispersant 2 | | 0.018 | | | | | | | | |
| | | Polymeric dispersant 3 | | | 0.018 | | | | | | | |
| | | Polymeric dispersant 4 | | | | 0.018 | | | | | | |
| | | Polymeric dispersant 5 | | | | | 0.018 | | | | | |
| | | Polymeric dispersant 6 | | | | | | 0.018 | | | | |
| | | Polymeric dispersant 7 | | | | | | | 0.04 | | | |
| | | Polymeric dispersant 8 | | | | | | | | 0.018 | | |
| | | Polymeric dispersant 9 | | | | | | | | | 0.023 | |
| | | Polymeric dispersant 10 | | | | | | | | | | 0.018 |
| | Thermosetting resin | | | | | | | 0.28 | | | | |
| | Curing agent | | | | | | | 0.09 | | | | |
| | Curing catalyst | | | | | | | 0.004 | | | | |
| | Solvent | | 2.87 | 2.88 | 2.88 | 2.88 | 2.88 | 2.88 | 2.88 | 2.88 | 2.88 | 2.86 |
| Testing | Luminescence properties | Measured intensity | 365 | 311 | 290 | 305 | 370 | 373 | 308 | * | * | * |
| | | Grade | a | a | a | a | a | a | a | b | b | b |

3. Production of Light Conversion Layers

Example 22 [Making of Light Conversion Layer 1]

A black matrix pattern with a line width of 20 μm and a film thickness of 1.2 μm was photolithographically formed on a 0.7-mm thick 10 cm×10 cm glass substrate (Asahi Glass Co., Ltd.).

To the planned sections for pixels, divided by the black matrix, of the substrate, the red-producing ink inkjet obtained in Example 11 and the green-producing ink inkjet obtained in Example 12 were applied dropwise by inkjetting. The diameter of drops was 30 μm.

To the planned sections for blue pixels, a colorless transparent ink was applied dropwise.

The ink coatings were then cured by ultraviolet irradiation using a conveyor UV system under the conditions of a 120-W/cm metal halide lamp and 0.5 J/cm². In this way, a light conversion layer according to the present invention was obtained as a layer formed by red-producing, green-producing, and transparent clear layers in stripes.

To the planned sections for blue pixels, a colorless transparent ink was applied dropwise. The ink coatings were then cured by ultraviolet irradiation using a conveyor UV system under the conditions of a 120-W/cm metal halide lamp and 0.5 J/cm. In this way, a light conversion layer according to the present invention was obtained as a layer formed by red-producing, green-producing, and transparent clear layers in stripes.

Example 24 [Making of Light Conversion Layer 3]

The chromium metal was sputtered on an alkali-free glass substrate (Nippon Electric Glass's "OA-10G"), and the chromium layer was patterned by photolithography. The pattern was coated with photoresist SU-8 (Nippon Kayaku Co., Ltd.), exposed to light, developed, and post-baked to form a pattern of SU-8 on the chromium pattern.

The created wall pattern was designed with openings corresponding to 100 μm×300 μm subpixels, a line width of 20 μm, and a thickness of 8 μm. Light conversion layer 6 was made using this BM substrate.

On a solid pattern created in the same way, the angle of contact of the solvent used for the inks (1,4-BDDA) was measured to be 450, demonstrating repellency to the solvent.

Ink compositions 1 and 9 were ejected toward openings using an inkjet printer (FUJIFILM Dimatix, trade name "DMP-2850"). Light-scattering ink composition UVScB was prepared in the same way as ink composition 1, a red light-emitting ink composition, except that the light-emitting nanocrystal liquid dispersion was replaced with the monomer used in ink composition 1, and this ink composition (blue pixel units) was ejected toward openings.

The head unit, from which inks are ejected, of the inkjet printer has 16 nozzles, and the volume of ink composition per nozzle per ejection was set to 10 pL.

The black matrix (hereinafter also referred to as BM) was placed on the platen (substrate table) of DMP-2850, and the substrate was placed with the black matrix pattern thereon parallel with the direction of scanning of the head. With the substrate in its right position, the inks were ejected toward the openings in the BM at a velocity of 6 m/sec.

The inks were ejected, and films formed, until the thickness of the films as the cured form of the inks was 80% or more of the wall height of the black matrix. The thickness of the films as the cured form of the inks, formed by applying the inks to the openings in the BM and curing the coatings, was measured using an optical interference film-thickness meter (Vert Scan).

The drying and curing of the inks were as follows.

For photopolymerizable inks, the printed substrate was put into a tightly closed nitrogen-filled container (purge box) having an optically transparent window, and the inks were cured by irradiation with UV light using an ultraviolet device.

In this way, pixel units that convert blue light into red light and pixel units that convert blue light into green light were formed on the BM substrate. Pixel units that transmit blue light (without color conversion) were also formed on the BM substrate, using a liquid dispersion that contained no luminescent nanocrystals and instead contained a light-scattering agent.

Through these operations, light conversion layer 3, a patterned layer including multiple types of pixel units, was obtained.

Example 25 [Making of Light Conversion Layer 4]

The chromium metal was sputtered on an alkali-free glass substrate (Nippon Electric Glass's "OA-10G"), and the chromium layer was patterned by photolithography. The pattern was coated with photoresist SU-8 (Nippon Kayaku Co., Ltd.), exposed to light, developed, and post-baked to form a pattern of SU-8 on the chromium pattern.

The created wall pattern was designed with openings corresponding to 100 μm×300 μm subpixels, a line width of 20 μm, and a thickness of 8 μm. Light conversion layer 6 was made using this BM substrate.

On a solid pattern created in the same way, the angle of contact of the solvent used for the inks (1,4-BDDA) was measured to be 450, demonstrating repellency to the solvent.

Ink compositions 16 and 17 were ejected toward openings using an inkjet printer (FUJIFILM Dimatix, trade name "DMP-2850"). Light-scattering ink composition TScB (blue pixel units) was prepared in the same way as ink composition 16, an ink composition containing red light-emitting nanocrystals, except that the light-emitting nanocrystal liquid dispersion was replaced with 1,4-BDDA, and this ink composition was ejected toward openings. The head unit, from which inks are ejected, of the inkjet printer has 16 nozzles, and the volume of ink composition per nozzle per ejection was set to 10 pL.

The black matrix (hereinafter also referred to as BM) was placed on the platen (substrate table) of DMP-2850, and the substrate was placed with the black matrix pattern thereon parallel with the direction of scanning of the head. With the substrate in its right position, the inks were ejected toward the openings in the BM at a velocity of 6 m/sec.

The inks were ejected, and films formed, until the thickness of the films as the cured form of the inks was 80% or more of the wall height of the black matrix. The thickness of the films as the cured form of the inks, formed by applying the inks to the openings in the BM and curing the coatings, was measured using an optical interference film-thickness meter (Vert Scan).

The drying and curing of the inks were as follows.

Thermosetting inks contain solvent. Thus, the inks were dried at reduced pressure and then cured by heating at 100° C. for 3 minutes and then at 150° C. for 30 minutes in a nitrogen atmosphere in the glove box.

In this way, pixel units that convert blue light into red light and pixel units that convert blue light into green light were formed on the BM substrate. Pixel units that transmit blue light (without color conversion) were also formed on the BM substrate, using a liquid dispersion that contained no luminescent nanocrystals and instead contained a light-scattering agent.

Through these operations, light conversion layer 4, a patterned layer including multiple types of pixel units, was obtained.

4. Fabrication of Display Elements

Examples 26, 27, and 28 (Making of Liquid Crystal Display Elements)

Liquid crystal display elements according to the present invention were made using light conversion layer 1, obtained in Example 22, light conversion layer 3, obtained in Example 24, and light conversion layer 4, obtained in Example 25.

In Examples 26 to 28, compounds are expressed using the following abbreviations. n represents a natural number.

(Side Chains)

| | | |
|---|---|---|
| -n | —$C_nH_{2n+1}$ | A linear Cn alkyl group |
| n- | $C_nH_{2n+1}$— | A linear Cn alkyl group |
| —On | —$OC_nH_{2n+1}$ | A linear Cn alkoxyl group |
| nO— | $C_nH_{2n+1}O$— | A linear Cn alkoxyl group |
| —V | —CH=$CH_2$ | |
| V— | $CH_2$=CH— | |
| —V1 | —CH=CH—$CH_3$ | |
| 1V— | $CH_3$—CH=CH— | |
| -2V | —$CH_2$—$CH_2$—CH=$CH_3$ | |
| V2- | $CH_2$=CH—$CH_2$—$CH_2$— | |
| -2V1 | —$CH_2$—$CH_2$—CH=CH—$CH_3$ | |
| 1V2- | $CH_3$—CH=CH—$CH_2$—$CH_2$ | |

(Linking Groups)

| | |
|---|---|
| -n- | —$C_nH_{2n}$— |
| -nO— | —$C_nH_{2n}$—O— |
| —On- | —O—$C_nH_{2n}$— |
| —COO— | —C(=O)—O— |
| —OCO— | —O—C(=O)— |
| —CF2O— | —$CF_2$—O— |
| —OCF2— | —O—$CF_2$— |

(Ring Structures)

[Chem. 63]

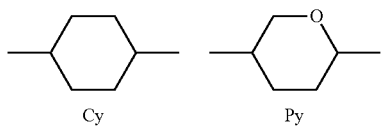
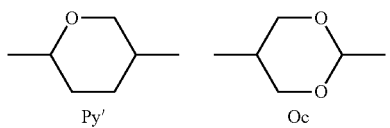
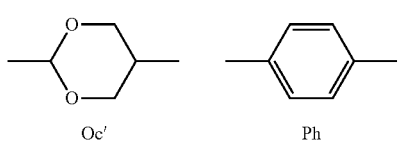
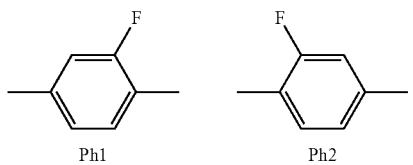
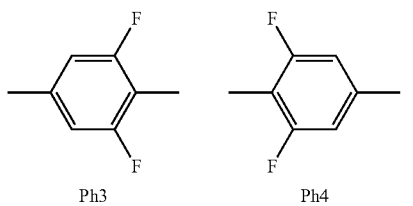
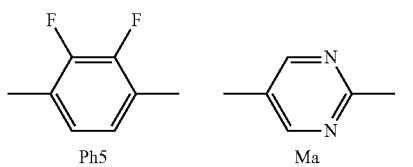
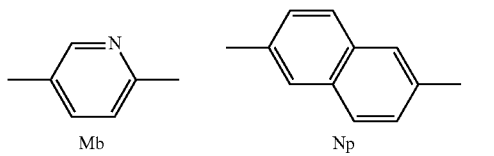
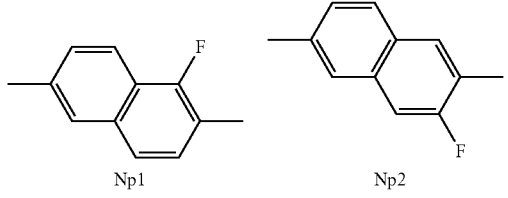

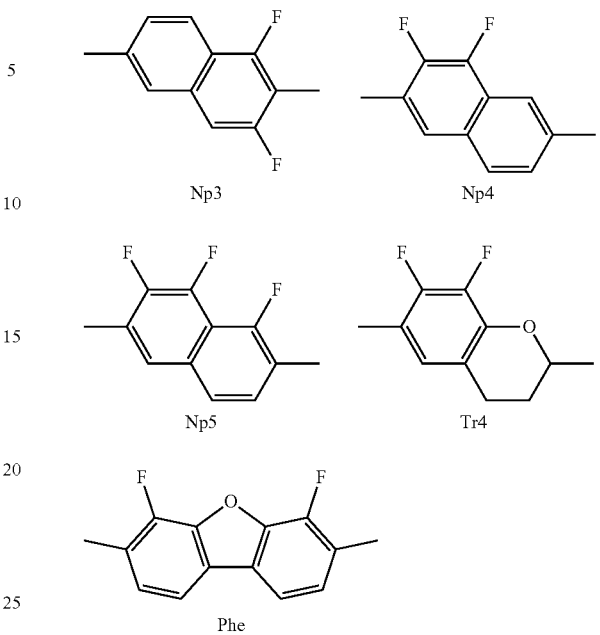

In the Examples, the following characteristics were measured.

$T_{NI}$: Nematic-isotropic liquid phase transition temperature (° C.)

Δn: Refractive index anisotropy at 20° C.

Δε: Dielectric constant anisotropy at 20° C.

η: Viscosity at 20° C. (mPa·s)

$γ_1$: Rotational viscosity at 20° C. (mPa·s)

$K_{11}$: Elastic modulus $K_{11}$ at 20° C. (pN)

$K_{33}$: Elastic modulus $K_{33}$ at 20° C. (pN)

$K_{AVG}$: Average of $K_{11}$ and $K_{33}$ ($K_{AVG}=(K_{11}+K_{33})/2$) (pN) VHR measurement (voltage holding ratio (%) at 333 K under the conditions of a frequency of 60 Hz and an applied voltage of 1 V)

Lightfastness testing with an LED having its primary emission peak at 450 nm:

The VHR was measured before and after 1-week exposure to light using a 20000-cd/m² visible-light LED light source having its primary emission peak at 450 nm.

Lightfastness testing with an LED having the primary emission peak at 385 nm:

The VHR was measured before and after irradiation with a monochrome LED having its peak at 385 nm at 130 J for 60 seconds.

(Production of Electrode Substrates Having an in-Cell Polarizing Layer)

An aqueous solution of Kuraray's "POVAL 103" (solids concentration, 4% by mass) was applied to light conversion layer 1, the coating was dried, and the dried layer was rubbed.

To the rubbed surface, a liquid coating for polarizing layers was applied. The liquid coating was composed of 0.03 parts by mass of Megaface F-554 (DIC Corporation), 1 part by mass of the azo dye represented by formula (az-1) below, 1 part by mass of the azo dye represented by formula (az-2) below,

[Chem. 64]

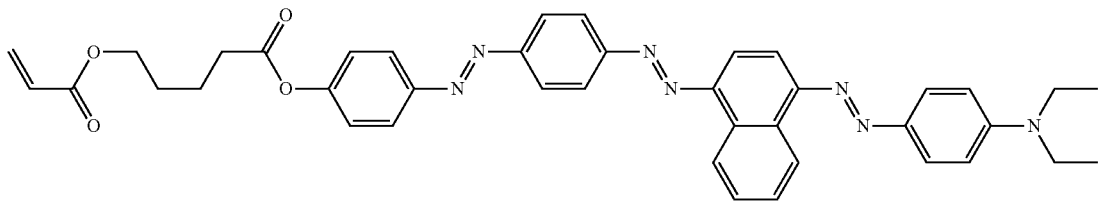

(az-1)

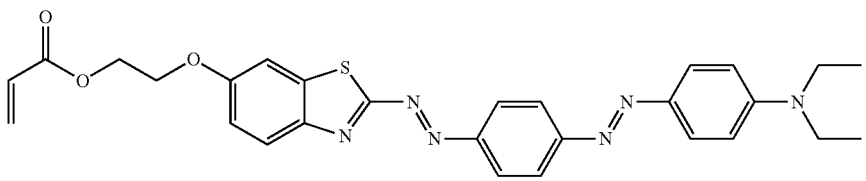

(az-2)

98 parts by mass of chloroform, 2 parts by mass of ethylene oxide-modified trimethylolpropane triacrylate (V #360, Osaka Organic Chemical), 2 parts by mass of dipentaerythritol hexaacrylate (KAYARAD DPHA, Nippon Kayaku), 0.06 parts by mass of Irgacure 907 (Ciba Specialty Chemicals), and KAYACURE DETX (Nippon Kayaku). The applied coating was dried to make a substrate having a polarizing layer and light conversion layer 1. Then a layer of ITO was deposited by sputtering. In this way, opposite substrate 1, an opposite substrate having light conversion layer 1 (=second (electrode) substrate 1), was prepared.

Then opposite substrate 3, an opposite substrate having light conversion layer 3 (=second (electrode) substrate 2), was prepared by forming a polarizing layer using light conversion layer 3 and depositing a layer of ITO in the same way. Likewise, opposite substrate 4, an opposite substrate having light conversion layer 4 (=second (electrode) substrate 2), was prepared by forming a polarizing layer using light conversion layer 4 and depositing a layer of ITO in the same way.

(VA Liquid Crystal Panels 1)

A polyimide vertical alignment layer was formed on the ITO of opposite substrate 1 and on a transparent electrode on a first substrate. Then the first substrate, with the transparent electrode and polyimide vertical alignment layer thereon, and opposite substrate 1, with the polyimide vertical alignment layer thereof, were arranged so that their respective alignment layers faced each other and that the directions of alignment of the alignment layers were antiparallel (1800), and bonded together along their edges using a sealant with a constant gap (4 µm) between the two substrates.

Then the cell gap, defined by the surface of the alignment layers and the sealant, was filled with one of the liquid crystal compositions below (example formulations 1 to 9) by vacuum filling. A plate polarizer was bonded to the first substrate to complete a VA liquid crystal panel 1. Liquid crystal panels fabricated in this way were used as test elements. The VHR of the test elements was measured, and the display quality of the test elements under UV was evaluated.

The results are presented in Tables 1 to 9 below.

TABLE 1

| | | Example formulation 1 | Example formulation 2 | Example formulation 3 | Example formulation 4 |
|---|---|---|---|---|---|
| VHR results 450-nm LED | Baseline | 99.0 | 98.5 | 98.6 | 98.2 |
| | 14 hours | 97.3 | 97.2 | 98.4 | 96.2 |
| | Decrease | 1.0 | 1.0 | 1.0 | 1.0 |
| VHR results 385-nm LED | Baseline | 99.3 | 99.2 | 99.5 | 99.0 |
| | 60 seconds | 97.3 | 92.5 | 98.2 | 96.8 |
| | Decrease | 1.0 | 0.9 | 1.0 | 1.0 |
| Characteristics (25° C.) | Tni | 76 | 76 | 74 | 74 |
| | Δn | 0.0930 | 0.0924 | 0.0931 | 0.0930 |
| | Δε | −2.63 | −2.82 | −2.77 | −2.69 |
| | γ1 | 87 | 89 | 101 | 84 |
| Formulation | 5-Ph—Ph-1 | 11 | 9 | 12 | 11 |
| | 3-Cy-Cy-V | | | | 7 |
| | 3-Cy-Cy-2 | 18 | 20 | 16 | 18 |
| | 3-Cy-Cy-4 | 9 | 9 | 9 | 4 |
| | 3-Cy-Cy-5 | 5 | 5 | 5 | 3 |
| | 3-Cy-Ph—O1 | | 4 | | |
| | 3-Cy-Cy-Ph-1 | 7 | 7 | 7 | 7 |
| | 3-Cy-Cy-Ph-3 | 4 | 4 | 4 | 4 |
| | 3-Cy-1O—Ph5—O1 | 6 | | | 6 |
| | 3-Cy-1O—Ph5—O2 | 8 | 8 | 8 | 8 |
| | 2-Cy-Cy-1O—Ph5—O2 | 6 | | | 6 |
| | 3-Cy-Cy-1O—Ph5—O2 | 8 | 10 | 11 | 8 |
| | 3-Cy-Ph—Ph5—O3 | 6 | 7 | 6 | 6 |

TABLE 1-continued

|  | Example formulation 1 | Example formulation 2 | Example formulation 3 | Example formulation 4 |
|---|---|---|---|---|
| 3-Cy-Ph—Ph5—O4 | 6 |  | 6 | 6 |
| 4-Cy-Ph—Ph5—O3 | 6 | 7 | 6 | 6 |
| 3-Cy-1O—Np5—O4 |  | 5 |  |  |
| 5-Cy-1O—Np5—O2 |  | 5 |  |  |
| 3-Cy-1O-Tr4-5 |  |  | 5 |  |
| 5-Cy-1O-Tr4-5 |  |  | 5 |  |

TABLE 2

|  |  | Example formulation 5 | Example formulation 6 |
|---|---|---|---|
| VHR results 450-nm LED | Baseline | 99.1 | 99.4 |
|  | 14 hours | 97.9 | 96.7 |
|  | Decrease | 1.0 | 1.0 |
| VHR results 385-nm LED | Baseline | 99.6 | 99.7 |
|  | 60 seconds | 99.0 | 98.2 |
|  | Decrease | 1.0 | 1.0 |
| Characteristics (25° C.) | Tni | 72.8 | 80.8 |
|  | Δn | 0.094 | 0.0914 |
|  | Δε | −2.58 | −2.49 |
|  | γ1 | 86 | 81 |
| Formulation | 5-Ph—Ph-1 | 4 |  |
|  | 3-Cy-Cy-V |  | 30 |
|  | 3-Cy-Cy-2 | 20 |  |
|  | 3-Cy-Ph—O1 | 16 | 11 |
|  | 3-Cy-Cy-Ph-1 | 7 | 7 |
|  | 3-Cy-Ph5—O4 | 7 | 6 |
|  | 5-Cy-Ph5—O2 | 6 | 6 |
|  | 3-Cy-Ph—Ph5—O2 | 10 | 10 |
|  | 3-Cy-Ph—Ph5—O3 | 10 | 10 |
|  | 2-Cy-Cy-Ph5—O2 | 10 | 10 |
|  | 2-Cy-Cy-Ph5—O3 | 10 | 10 |

TABLE 3

|  |  | Example formulation 7 |
|---|---|---|
| VHR results 450-nm LED | Baseline | 98.6 |
|  | 14 hours | 97.1 |
|  | Decrease | 1.0 |
| VHR results 385-nm LED | Baseline | 99.2 |
|  | 60 seconds | 97.2 |
|  | Decrease | 1.0 |
| Characteristics (25° C.) | Tni | 76.3 |
|  | Δn | 0.0929 |
|  | Δε | −2.75 |
|  | γ1 | 84 |
| Formulation | 3-Cy-Cy-2 | 20 |
|  | 3-Cy-Cy-4 | 8 |
|  | 3-Cy-Ph—O1 | 8 |
|  | 3-Ph—Ph5—O2 | 13 |
|  | 3-Cy-1O—Ph5—O2 | 6 |
|  | 2-Cy-Cy-1O—Ph5—O2 | 14 |
|  | 3-Cy-Cy-1O—Ph5—O2 | 10 |
|  | 3-Cy-Cy-Ph-1 | 8 |
|  | 3-Cy-Cy-Ph-3 | 3 |
|  | 3-Cy-Ph—Ph-2 | 10 |

TABLE 4

|  |  | Example formulation 8 |
|---|---|---|
| VHR results 450-nm LED | Baseline | 98.1 |
|  | 14 hours | 95.5 |
|  | Decrease | 1.0 |
| VHR results 385-nm LED | Baseline | 80.5 |
|  | 60 seconds | 83.1 |
|  | Decrease | 1.0 |
| Characteristics (25° C.) | Tni | 77 |
|  | Δn | 0.1064 |
|  | Δε | −2.65 |
|  | γ1 | 93 |
| Formulation | 3-Cy-Cy-V1 | 10 |
|  | V2-Cy-Cy-Ph-1 | 5 |
|  | 3-Cy-Ph—Ph-2 | 9 |
|  | 3-Cy-Cy-Ph-1 | 9 |
|  | 3-Cy-Cy-4 | 9 |
|  | 3-Cy-Cy-5 | 8 |
|  | 3-Cy-Cy-O1 | 2 |
|  | 3-Cy-Ph—O1 | 5 |
|  | 3-Cy-Ph5—O2 | 11 |
|  | 3-Ph—Ph5—O2 | 15 |
|  | 3-Cy-Cy-Ph5—O2 | 11 |
|  | 3-Cy-Ph—Ph5—O2 | 3 |
|  | 2O-Phe-O5 | 3 |

TABLE 5

|  |  | Example formulation 9 |
|---|---|---|
| VHR results 450-nm LED | Baseline | 99.4 |
|  | 14 hours | 99.0 |
|  | Decrease | 1.0 |
| VHR results 385-nm LED | Baseline | 99.4 |
|  | 60 seconds | 99.0 |
|  | Decrease | 1.0 |
| Characteristics (25° C.) | Tni | 75 |
|  | Δn | 0.0918 |
|  | Δε | −2.47 |
|  | γ1 | 81 |
| Formulation | 3-Cy-Cy-2 | 19 |
|  | 3-Cy-Cy-5 | 5 |
|  | 3-Cy-Cy-4 | 8 |
|  | 3-Cy-Ph—O1 | 8 |
|  | 5-Cy-Ph5—O2 | 7 |
|  | 3-Cy-Ph5—O2 | 7 |
|  | 3-Cy-Ph—Ph5—O2 | 5 |
|  | 3-Ph—Ph5—O2 | 5 |
|  | 2-Cy-Cy-Ph5—O2 | 11 |
|  | 3-Cy-Cy-Ph5—O2 | 11 |
|  | 3-Cy-Cy-Ph-1 | 7 |
|  | 3-Ph—Ph5—Ph-2 | 7 |

In Tables 1 to 5, the decrease for the primary emission peak at 450 nm is "the VHR after the 14-hour lightfastness testing/the baseline (=before the 14-hour lightfastness testing) VHR," and that for the primary emission peak at 385 nm is "the VHR after the 60-second lightfastness testing/the baseline (=before the 60-second lightfastness testing) VHR." Therefore, the closer to 1 the decrease is, the more resistant to blue light having its primary emission peak at 450 nm or light having its primary emission peak at 385 nm the display device is. The above experimental results suggest that these liquid crystal display elements are superior in lightfastness. It appears that in these liquid crystal display elements, the degradation of light-emitting nanocrystals is reduced or prevented, and the damage to the liquid crystal layer from partial, spot irradiation with a high-energy light beam is limited or eliminated.

As can be seen, the decrease in VHR following irradiation with light having its primary emission peak at 385 nm was smallest in the liquid crystal display element with example formulation 2. γ1, which relates to the quickness of the response of the liquid crystal display element, was the highest with example formulation 3. For the former, a possible cause is that the composition easily absorbs light because of the liquid crystal compound it contains, which has two or more rings including a condensed ring (naphthalene). For the latter, a possible cause is that the liquid crystal compound is highly viscous because it has two or more rings including a chromane ring.

[VA Liquid Crystal Panel A1]

VA liquid crystal panel A1 (with the liquid composition of example formulation 1) was fabricated in the same way as VA liquid crystal panels 1 except that opposite substrate 1, used in VA liquid crystal panels 1, was replaced with opposite substrate 4, which had light conversion layer 3. The VHR following 14-hour lightfastness testing was not lower than the baseline.

[VA Liquid Crystal Panel B1]

VA liquid crystal panel B1 was fabricated in the same way as VA liquid crystal panels 1 except that opposite substrate 1, used in VA liquid crystal panels 1, was replaced with opposite substrate 7, which had light conversion layer 4. The VHR following 14-hour lightfastness testing was not lower than the baseline.

[Retardation Properties]

Then VA liquid crystal panel 2, with a gap (3.5 μm) different from that in VA liquid crystal panels 1 (4 μm), and VA liquid crystal panel 3, with a gap (2.8 μm) different from that in VA liquid crystal panels 1 (4 μm), were fabricated with the liquid crystal composition specified as example formulation 1. The transmittance of these liquid crystal panels was simulated (using SHINTECH's LCDMaster). The results are presented below.

TABLE 10

| Re (retardation) | Relative transmittance of 450-nm light |
|---|---|
| 325 nm (VA liquid crystal panel 2) | 1.0 |
| 260 nm (VA liquid crystal panel 3) | 1.2 |

As can be seen from these results, changing the retardation from 325 nm to 260 nm improved the transmittance approximately by 20%.

The retardation (Re) is represented by equation (1) below.

$$Re = \Delta n \times d$$

(In equation (1), Δn represents the refractive index anisotropy at 589 nm, and d represents the cell thickness (μm) of the liquid crystal layer of the liquid crystal display element.).

With example formulations 2 to 9, too, the transmittance improved likewise. This suggests that the transmittance improves if the retardation (Re) is in the range of 220 to 300 nm.

For example formulation 8, a VA liquid crystal panel may be fabricated in the same way as with example formulation 8 but by adding 0.05 parts by mass the antioxidant represented by formula (III-22) below per 100 parts by mass of the liquid crystal composition of example formulation 8 and may be subjected to lightfastness testing with blue light having its primary emission peak at 450 nm and that with light having its primary emission peak at 385 nm.

[Chem. 65]

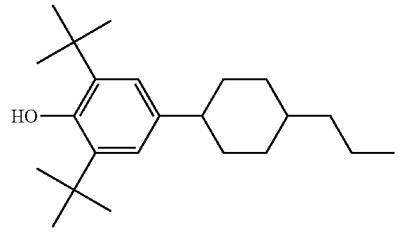

(III-22)

[PSVA Liquid Crystal Panel 1]

Polymerizable compound-containing liquid crystal composition 1 as a mixture of 0.3 parts by mass of the polymerizable compound below

[Chem. 66]

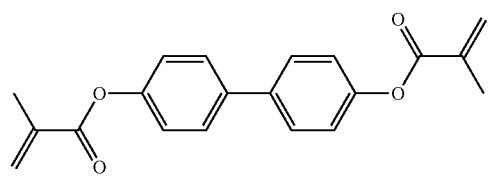

(XX-2)

and 99.7 parts by mass of example composition 5 was filled into a liquid crystal panel including a first substrate with fishbone ITO and opposite substrate 1 by vacuum filling. The cell gap was 4 μm, and the substrates were coated beforehand with a polyimide alignment film that would induce vertical alignment. The vertical alignment layers were formed from JSR's JALS2096.

The liquid crystal panel, with the polymerizable compound-containing liquid crystal composition therein, was then irradiated with ultraviolet radiation using a high-pressure mercury lamp. The frequency was 100 Hz, a voltage of 10 V was applied, and a filter that cuts out ultraviolet radiation with a wavelength of 325 nm or shorter was interposed. The liquid crystal panel was irradiated with ultraviolet radiation until an integrated power of 10 J/cm$^2$, with the irradiation adjusted so that the illuminance as measured under the conditions of a central wavelength of 365 nm would be 100 mW/cm$^2$. The liquid crystal panel was then further irradiated with ultraviolet radiation until an integrated power of 10 J/cm$^2$, this time with the irradiation adjusted using a fluorescent UV lamp so that the illuminance as measured under the conditions of a central wavelength of 313 nm would be 3 mW/cm$^2$. PSVA liquid crystal panel 1 obtained in this way was subjected to lightfastness testing with blue light having its primary emission peak at 450 nm and that with light having its primary emission peak at 385 nm in the same way as with example formulation 5. With any of the blue light having its primary emission peak at 450 nm and the light having its primary emission peak at 385 nm, no display defect was observed.

[PSVA Liquid Crystal Panel 2]

Polymerizable compound-containing liquid crystal composition 2 as a mixture of polymerizable compound (XX-5) below

[Chem. 67]

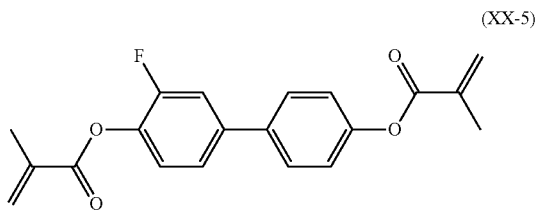

(XX-5)

[Chem. 68]

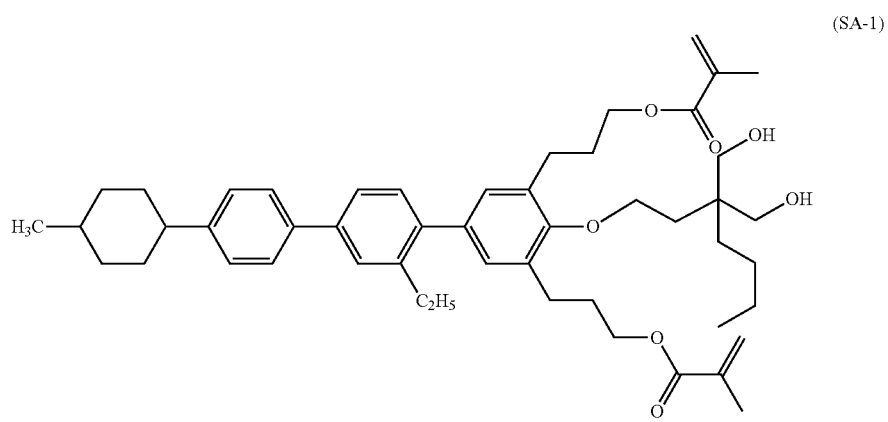

(SA-1)

and 99.7 parts by mass of example composition 1 was filled into a liquid crystal panel including a first substrate with fishbone ITO and opposite substrate 4 by vacuum filling. The cell gap was 4 μm, and the substrates were coated beforehand with a polyimide alignment film that would induce vertical alignment. The vertical alignment layers were formed from JSR's JALS2096.

The liquid crystal panel, with the polymerizable compound-containing liquid crystal composition therein, was then irradiated with ultraviolet radiation using a high-pressure mercury lamp. The frequency was 100 Hz, a voltage of 10 V was applied, and a filter that cuts out ultraviolet radiation with a wavelength of 325 nm or shorter was interposed. The liquid crystal panel was irradiated with ultraviolet radiation until an integrated power of 10 $J/cm^2$, with the irradiation adjusted so that the illuminance as measured under the conditions of a central wavelength of 365 nm would be 100 $mW/cm^2$. The liquid crystal panel was then further irradiated with ultraviolet radiation until an integrated power of 10 $J/cm^2$, this time with the irradiation adjusted using a fluorescent UV lamp so that the illuminance as measured under the conditions of a central wavelength of 313 nm would be 3 $mW/cm^2$. PSVA liquid crystal panel 2 obtained in this way was subjected to lightfastness testing with a blue LED having its primary emission peak at 450 nm and that with an LED having its primary emission peak at 385 nm in the same way as with example formulation 1. With any of the blue LED having its primary emission peak at 450 nm and the LED having its primary emission peak at 385 nm, no display defect was observed.

(Spontaneous-Alignment VA Liquid Crystal Panel 1)

A first substrate with a transparent electrode thereon and opposite substrate 4, a substrate with light conversion layer 4 and an in-cell polarizing layer on the surface thereof (aforementioned second transparent electrode substrate), were arranged so that their respective electrodes faced each other, and bonded together along their edges using a sealant with a constant gap (4 μm) between the two substrates. Then the cell gap, defined by the surface of the alignment layers and the sealant, was filled with a liquid crystal composition. The liquid crystal composition was a mixture of 2 parts by mass of the agent below for spontaneous alignment (formula (SA-1) below), 0.5 parts by mass of polymerizable compound (XX-2), and 99.7 parts by mass of example formulation 7 and was filled into a liquid crystal panel including a substrate that had ITO and had no alignment film by vacuum filling, with the cell gap being 4 μm.

The liquid crystal panel, with the polymerizable compound-containing liquid crystal composition therein, was then irradiated with ultraviolet radiation using a high-pressure mercury lamp. The frequency was 100 Hz, a voltage of 10 V was applied, and a filter that cuts out ultraviolet radiation with a wavelength of 325 nm or shorter was interposed. The liquid crystal panel was irradiated with ultraviolet radiation until an integrated power of 10 $J/cm^2$, with the irradiation adjusted so that the illuminance as measured under the conditions of a central wavelength of 365 nm would be 100 $mW/cm^2$. The liquid crystal panel was then further irradiated with ultraviolet radiation until an integrated power of 10 $J/cm^2$, this time with the irradiation adjusted using a fluorescent UV lamp so that the illuminance as measured under the conditions of a central wavelength of 313 nm would be 3 $mW/cm^2$. Spontaneous-alignment VA liquid crystal panel 1 obtained in this way was subjected to lightfastness testing with blue light having its primary emission peak at 450 nm and that with light having its primary emission peak at 385 nm in the same way as with example formulation 7. With any of the blue light having its primary emission peak at 450 nm and the light having its primary emission peak at 385 nm, the baseline VHR and the VHR after the lightfastness testing were comparable to those with example formulation 7.

(Spontaneous-Alignment VA Liquid Crystal Panel 2)

A first substrate with a transparent electrode thereon and opposite substrate 3, a substrate with light conversion layer 3 and an in-cell polarizing layer on the surface thereof (aforementioned second transparent electrode substrate), were arranged so that their respective electrodes faced each other, and bonded together along their edges using a sealant with a constant gap (4 μm) between the two substrates. Then the cell gap, defined by the surface of the alignment layers and the sealant, was filled with a liquid crystal composition. The liquid crystal composition was a mixture of 2 parts by mass of the agent below for spontaneous alignment (formula (SA-2) below), 0.5 parts by mass of polymerizable compound (XX-5), and 99.7 parts by mass of example composition 4

[Chem. 69]

(SA-2)

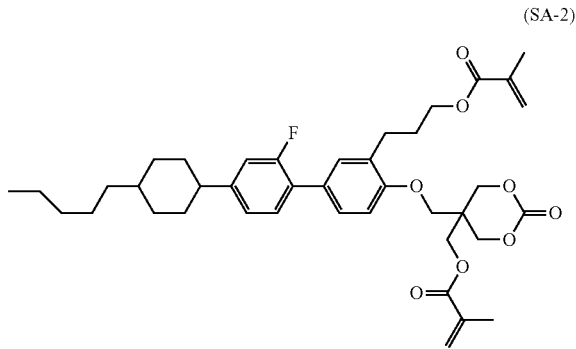

and was filled into a liquid crystal panel including a substrate that had ITO and had no alignment film by vacuum filling, with the cell gap being 3.5 μm.

The liquid crystal panel, with the polymerizable compound-containing liquid crystal composition therein, was then irradiated with ultraviolet radiation using a high-pressure mercury lamp. The frequency was 100 Hz, a voltage of 10 V was applied, and a filter that cuts out ultraviolet radiation with a wavelength of 325 nm or shorter was interposed. The liquid crystal panel was irradiated with ultraviolet radiation until an integrated power of 10 J/cm$^2$, with the irradiation adjusted so that the illuminance as measured under the conditions of a central wavelength of 365 nm would be 100 mW/cm$^2$. The liquid crystal panel was then further irradiated with ultraviolet radiation until an integrated power of 10 J/cm$^2$, this time with the irradiation adjusted using a fluorescent UV lamp so that the illuminance as measured under the conditions of a central wavelength of 313 nm would be 3 mW/cm$^2$. Spontaneous-alignment VA liquid crystal panel 2 obtained in this way was subjected to lightfastness testing with blue light having its primary emission peak at 450 nm and that with light having its primary emission peak at 385 nm in the same way as with example formulation 4. With any of the blue light having its primary emission peak at 450 nm and the light having its primary emission peak at 385 nm, the baseline VHR and the VHR after the lightfastness testing were comparable to those with example formulation 4.

(IPS Liquid Crystal Panel)

An alignment layer solution was formed on a pair of interdigital electrodes on a first substrate by spin coating, forming an alignment layer. The first substrate, with comb-shaped transparent electrodes and an alignment layer thereon, and a second substrate, with an alignment layer, the aforementioned in-cell polarizing layer, and light conversion layer 1 thereon and a planarizing film on light conversion layer 1, were arranged so that their respective alignment layers faced each other and that the directions in which the alignment layers were irradiated with linearly polarized light or horizontally rubbed were antiparallel (1800), and bonded together along their edges using a sealant with a constant gap (4 μm) between the two substrates using active radiation. Then the cell gap, defined by the surface of the alignment layers and the sealant, was filled with a liquid crystal composition specified above (liquid crystal composition 6) by vacuum filling. Then a pair of plate polarizers were bonded to the first and second substrates to complete an IPS liquid crystal panel.

(FFS Liquid Crystal Panel)

A flat-plate common electrode was formed on a first, transparent substrate. Then an insulating layer film was formed, and then a transparent comb-shaped electrode on this insulating layer film. On this transparent comb-shaped electrode, an alignment layer solution was formed by spin coating to form a first electrode substrate. An alignment layer was formed in the same way on a second substrate, with an alignment layer, the aforementioned in-cell polarizing layer, light conversion layer 1, and a planarizing film thereon. Then the first substrate, with a comb-shaped transparent electrode and an alignment layer thereon, and the second substrate, with an alignment layer, a polarizing layer and light conversion layer 1 thereon and a planarizing film on light conversion layer 1, were arranged so that their respective alignment layers faced each other and that the directions in which the alignment layers were irradiated with linearly polarized light or rubbed were antiparallel (1800), and bonded together along their edges using a sealant with a constant gap (4 μm) between the two substrates. Then the cell gap, defined by the surface of the alignment layers and the sealant, was filled with a liquid crystal composition specified above (liquid crystal composition 9) by dripping to complete an FFS liquid crystal panel.

(2) Fabrication of Backlight Units
(Fabrication of Backlight Unit 1)

Backlight unit 1 was fabricated by placing a blue LED light source along an edge of a light-guide plate, covering the plate with a reflector sheet except the lighting surface, and placing a diffuser sheet on the lighting side of the light-guide plate.

(Fabrication of Backlight Unit 2)

Backlight unit 2 was fabricated by arranging blue LEDs in an array on a lower reflector plate, which scatters and reflects light, placing a diffuser plate right thereabove on the lighting side, and placing a diffuser sheet on the diffuser plate on the lighting side.

(3) Fabrication of Liquid Crystal Display Elements and Measurement of their Color Gamut Backlight units 1 and 2 were each attached to VA liquid crystal panels 1, A1, B1, and 2, and the color gamut of the resulting liquid crystal display elements was measured. When the liquid crystal display elements, all having a light conversion layer, were compared with ordinary ones, having no light conversion layer, the former had a broader color gamut. In particular, those VA liquid crystal panels whose light change layer contained light-diffusing particles were highly efficient in light conversion efficiency and exhibited excellent color reproduction.

Likewise, backlight units 1 and 2 were attached to the IPS liquid crystal panel, and the color gamut of the resulting liquid crystal display elements was measured. When the liquid crystal display elements, both having a light conversion layer, were compared with ordinary ones, having no light conversion layer, the former had a broader color gamut.

Backlight units 1 and 2 were attached to the FFS liquid crystal panel, and the color gamut of the resulting liquid crystal display elements was measured. When the liquid crystal display elements, both having a light conversion layer, were compared with ordinary ones, having no light conversion layer, the former had a broader color gamut.

REFERENCE SIGNS LIST

10: Liquid crystal display element
100: Backlight unit (101, light source section; 102, light guide section; 103, light conversion section)
101: Light source section (L, light emitter (105, light-emitting diode; 110, light-source substrate), 112a and 112b, fixing members)
102: Light guide section (106, diffuser plate; 104, light guide plate)
103: Light source-light guide section
110: Light-source substrate
111: Transparent filling container
112a and 112b: Fixing members
NC: Light-emitting nanocrystals (compound semiconductor)
1 and 8: Polarizing layers
2 and 7: Transparent substrates
3: First electrode layer
3': Second electrode layer
4: Alignment layer
5: Liquid crystal layer
6: Color filter (with a pigment in the resin on a case by case basis)
9: Supporting substrate
11: Gate electrode
12: Gate insulating film
13: Semiconductor layer
14: Protective layer
16: Drain electrode
17: Source electrode
18: Passivation film
21: Pixel electrode
22: Common electrode
23 and 25: Insulating layers

The invention claimed is:

1. A dispersion comprising, as essential ingredients, light-emitting nanocrystals, a polymeric dispersant having an amine value of 5 mg KOH/g or more, and at least one stimulation-responsive curable material that cures in response to an external stimulus, wherein
a solubility of a coating film made from the dispersion in a 1% by mass aqueous solution of potassium hydroxide at 25° C. is 3% by mass or less.

2. The dispersion according to claim 1, wherein the polymeric dispersant has an acid value of 50 mg KOH/g or less.

3. The dispersion according to claim 1, wherein the polymeric dispersant has a weight-average molecular weight of 1000 or more.

4. The dispersion according to claim 1, further comprising at least one type of light-diffusing particles.

5. The dispersion according to claim 4, wherein the light-diffusing particles include at least one selected from the group consisting of titanium oxide, alumina, zirconium oxide, zinc oxide, calcium carbonate, barium sulfate, and silica.

6. The dispersion according to claim 1, wherein the stimulation-responsive curable material is at least one active radiation-curable monomer or thermosetting resin.

7. The dispersion according to claim 6, wherein the dispersion is an active radiation-curable dispersion that contains, as essential ingredients, the light-emitting nanocrystals, the polymeric dispersant having an amine value of 8 to 50 mg KOH/g, and the active radiation-curable monomer.

8. The dispersion according to claim 7, wherein the active radiation-curable monomer is a radically photopolymerizable compound.

9. The dispersion according to claim 7, further comprising, besides the light-emitting nanocrystals, the basic polymeric dispersant having an amine value of 8 to 50 mg KOH/g, and the active radiation-curable monomer, an active radiation-curable resin selected from the group consisting of urethane (meth)acrylate resins, polyester (meth)acrylate resins, and epoxy (meth)acrylate resins.

10. The dispersion according to claim 7, wherein the active radiation-curable monomer is a monofunctional (meth)acrylate and/or a multifunctional (meth)acrylate.

11. The dispersion according to claim 7, further comprising a polymerization initiator.

12. The dispersion according to claim 6, wherein the stimulation-responsive curable material is a thermosetting resin, the dispersion contains the light-emitting nanocrystals, the light-diffusing particles, the polymeric dispersant, and the thermosetting resin, and the amine value of the polymeric dispersant is 5 mg KOH/g or more.

13. The dispersion according to claim 1, wherein the stimulation-responsive curable material is insoluble in alkalis.

14. The dispersion according to claim 1, wherein the dispersion is not a dispersion containing a polymer soluble in alkalis.

15. The dispersion according to claim 1, wherein a percentage of the light-emitting nanocrystals in the dispersant is between 10% and 70% by mass.

16. The dispersion according to claim 1, wherein the light-emitting nanocrystals have a core that contains at least one or two or more first semiconductor materials; and
a shell that covers the core and contains a second semiconductor material that is the same as or different than in the core.

17. The dispersion according to claim 1, wherein the polymeric dispersant has a backbone polyether, polyester, polyalkylene imine, or polyolefin chain and a basic functional group in a resin structure thereof.

18. The dispersion according to claim 1, further comprising a solvent having a boiling point higher than or equal to 180° C.

19. A light conversion layer comprising a plurality of pixel units, wherein
the pixel units include at least one pixel unit that includes a cured form of a dispersion,
the dispersion comprises, as essential ingredients, light-emitting nanocrystals, a polymeric dispersant having an amine value of 5 mg KOH/g or more, and at least one stimulation-responsive curable material that cures in response to an external stimulus, and
a solubility of a coating film made from the dispersion in a 1% by mass aqueous solution of potassium hydroxide at 25° C. is 3% by mass or less.

20. The light conversion layer according to claim 19, further comprising a light shield between the pixel units, wherein
the pixel units include:
a first pixel unit that includes the cured form and contains, as the luminescent nanocrystal particles, light-emitting nanocrystals that absorb light with a wavelength between 420 and 480 nm and emit light that has a peak emission wavelength in a range of 605 to 665 nm; and
a second pixel unit that includes the cured form and contains, as the luminescent nanocrystal particles, light-emitting nanocrystals that absorb light with a wavelength between 420 and 480 nm and emit light that has a peak emission wavelength in a range of 500 to 560 nm.

* * * * *